US012688733B1

(12) United States Patent  
Henon et al.

(10) Patent No.: US 12,688,733 B1  
(45) Date of Patent: Jul. 21, 2026

(54) AUTOMATED RECOGNITION OF FACES THAT CHANGE OVER TIME

(71) Applicant: Wicket, LLC, Las Vegas, NV (US)

(72) Inventors: Yann Henon, Somerville, MA (US); Samson Timoner, Cambridge, MA (US); Gennady Livitz, Belmont, MA (US); Patrick Quinlan, Brooklyn, NY (US)

(73) Assignee: Wicket, LLC, Las Vegas, NV (US)

( * ) Notice: Subject to any disclaimer, the term of this patent is extended or adjusted under 35 U.S.C. 154(b) by 403 days.

(21) Appl. No.: 17/750,365

(22) Filed: May 22, 2022

(51) Int. Cl.
  *G06V 40/50* (2022.01)
  *G06F 21/32* (2013.01)
  (Continued)

(52) U.S. Cl.
  CPC .............. *G06V 40/50* (2022.01); *G06F 21/32* (2013.01); *G06V 10/761* (2022.01); *G06V 40/172* (2022.01)

(58) Field of Classification Search
  CPC ........ G06V 40/50; G06V 40/53; G06V 40/55; G06V 40/58; G06V 40/60
  See application file for complete search history.

(56) References Cited

U.S. PATENT DOCUMENTS 6,792,618 B1    9/2004  Bendinelli
7,403,920 B2    7/2008  Nishikiori
(Continued)

FOREIGN PATENT DOCUMENTS

CN    103955668    7/2014
CN    105868716    8/2016
(Continued)

OTHER PUBLICATIONS

Thomas et al, "Semantic Classification of 3D Point Clouds with Multiscale Spherical Neighborhoods," published at arXiv:1808. 00495, submitted Aug. 1, 2018.
(Continued)

*Primary Examiner* — Ruiping Li
(74) *Attorney, Agent, or Firm* — David J. Powsner; Davis Malm D'Agostine PC

(57)                ABSTRACT

Nodes of systems according to the invention perform facial recognition on persons imaged by their respective camera(s) to permit or deny access to resources secured. Recognition is performed using images of faces of known persons stored in the central KP database. Each node maintains a local database with images, vectors or other representations downloaded from the central database for at least some of those facial images. If a node determines that an image acquired by it of a known individual is a candidate for inclusion in the central database based on the quality of the image and of a face depicted in it and on the similarity between that faces and ones in the local database, it can upload it to the server for further consideration. The server can, in turn, determine whether a candidate ought to, in fact, be placed in the central database based on whether that image represents a "life change" in the respective known person, such as aging, weight gain/loss, changes or addition of eyewear, changes in facial hair, and so forth. If so, the central database is updated by way of addition of the candidate image and at least that portion of the database is redistributed to the nodes for use in further recognition activities.

17 Claims, 7 Drawing Sheets

(51) Int. Cl.
　　*G06V 10/74*　　　(2022.01)
　　*G06V 40/16*　　　(2022.01)

(56)　　　　References Cited

U.S. PATENT DOCUMENTS

| | | | |
|---|---|---|---|
| 8,154,615 | B2 | 4/2012 | Fedorovskaya |
| 8,448,056 | B2 | 5/2013 | Pulsipher |
| 9,412,180 | B2 | 8/2016 | Ono |
| 9,672,535 | B2 | 6/2017 | Higgins |
| 9,691,074 | B2 | 6/2017 | Fan |
| 10,635,918 | B1 * | 4/2020 | Kim ..................... G06F 18/217 |
| 11,010,597 | B1 * | 5/2021 | Timoner .................. G07C 9/37 |
| 11,132,532 | B1 * | 9/2021 | Livitz .................... G06V 20/52 |
| 11,151,390 | B1 | 10/2021 | Henon et al. |
| 11,495,052 | B1 | 11/2022 | Timoner |
| 11,544,965 | B1 | 1/2023 | Livitz |
| 12,020,505 | B1 | 6/2024 | Livitz |
| 2005/0207622 | A1 * | 9/2005 | Haupt ................. G06V 40/172 |
| | | | 382/118 |
| 2006/0044446 | A1 | 3/2006 | Porter et al. |
| 2007/0230799 | A1 | 10/2007 | Shniberg |
| 2009/0080715 | A1 | 3/2009 | van Beek |
| 2013/0159350 | A1 | 6/2013 | Sankar |
| 2013/0236072 | A1 | 9/2013 | Sun |
| 2014/0044348 | A1 | 2/2014 | Chen |
| 2014/0337066 | A1 | 11/2014 | Kephart |
| 2016/0063316 | A1 | 3/2016 | Lee et al. |
| 2016/0086015 | A1 | 3/2016 | Irmatov |
| 2016/0171346 | A1 | 6/2016 | Han |
| 2016/0179191 | A1 | 6/2016 | Kim |
| 2016/0350334 | A1 | 12/2016 | Bataller et al. |
| 2016/0350587 | A1 | 12/2016 | Bataller |
| 2016/0379050 | A1 | 12/2016 | Tian |
| 2017/0061245 | A1 | 3/2017 | Cheng |
| 2017/0124385 | A1 | 5/2017 | Ganong |
| 2017/0300744 | A1 | 10/2017 | Ju |
| 2018/0027272 | A1 | 1/2018 | Raj et al. |
| 2018/0032796 | A1 | 2/2018 | Kuharenko et al. |
| 2018/0307815 | A1 | 10/2018 | Samadani |
| 2019/0005310 | A1 | 1/2019 | Kim |
| 2019/0130167 | A1 | 5/2019 | Ng |
| 2019/0130513 | A1 | 5/2019 | Norimatsu |
| 2019/0208181 | A1 | 7/2019 | Rowell |
| 2020/0036528 | A1 | 1/2020 | Ortiz |
| 2020/0257889 | A1 | 8/2020 | Merkel |
| 2021/0049391 | A1 | 2/2021 | Zou |
| 2021/0150240 | A1 | 5/2021 | Yu |
| 2021/0272253 | A1 * | 9/2021 | Lin ..................... G06V 10/761 |
| 2022/0189110 | A1 | 6/2022 | Tang |
| 2022/0327879 | A1 | 10/2022 | Hayase |
| 2024/0404320 | A1 | 12/2024 | Livitz |

FOREIGN PATENT DOCUMENTS

| | | |
|---|---|---|
| CN | 110580454 | 12/2019 |
| CN | 111126246 | 5/2020 |
| CN | 111160233 | 5/2020 |
| KR | 20150031085 | 3/2015 |
| WO | WO 2020258119 | 12/2020 |

OTHER PUBLICATIONS

Timoner et al, U.S. Appl. No. 16/409,422, filed May 10, 2019.
Livitz et al, U.S. Appl. No. 16/678,681, filed Nov. 8, 2019
Livitz et al, U.S. Appl. No. 16/679,021, filed Nov. 8, 2019.
Henon et al, U.S. Appl. No. 16/880,467, filed May 21, 2020.
Timoner et al, U.S. Appl. No. 17/195,803, filed Mar. 9, 2021.
Livitz et al, U.S. Appl. No. 17/241,223, filed Apr. 27, 2021.
Livitz et al, U.S. Appl. No. 17/472,962, filed Sep. 13, 2021.
Henon et al, U.S. Appl. No. 17/734,091, filed May 1, 2022.
Timoner et al, U.S. Appl. No. 17/750,365, filed May 22, 2022.
Livitz et al, U.S. Appl. No. 18/146,420, filed Dec. 26, 2022.
Livitz, U.S. Appl. No. 18/521,403, filed Nov. 28, 2023.
Livitz et al, U.S. Appl. No. 18/731,304, filed Jun. 2, 2024.
Livitz et al, U.S. Appl. No. 63/016,957, filed Apr. 28, 2020.
Henon et al, U.S. Appl. No. 63/185,262, filed May 6, 2021.

* cited by examiner

AUTOMATED RECOGNITION OF FACES THAT CHANGE OVER TIME

BACKGROUND OF THE INVENTION

The invention relates to digital data processing, digital image analysis, facial recognition and computer-mediated security systems. The invention has application, by way of non-limiting example, in access control, including permitting or denying persons access to resources, such as gated entrances and locked rooms.

A problem for home- and business-owners alike is determining whom to permit to enter premises and whom to exclude. Security to control access to a premises or other resource can be done in a variety of ways including combination locks, keys, and electronic badges. For the methods mentioned, the combination, key, badge or other token necessary to gain entry can be surreptitiously shared, allowing access to persons who should not have it. Alternative systems for access control rely on biometric markers, e.g., physiological attributes of individual "key holders" that cannot be easily shared, e.g., fingerprints, voice prints, and so forth.

Facial recognition, the computer-based, automated process of identifying people from their images, has become an increasingly popular mechanism for biometric marker-based access control. This is, in part, because of the intuitive nature of the identification being performed and, in part, because it lends itself to being double-checked, whether by security guards present at the access point or by viewing video footage afterwards.

Unfortunately, the practicalities of implementing computer-based facial recognition can force designers to choose between approaches that are either overly fastidious or overly lax. The former are characterized by excessive false negatives, i.e., failures to recognize "known" individuals who are sporting new eye glasses, have grown facial hair, have gained/lost weight, or otherwise present differently than they had at training. The latter are algorithms are characterized by excessive false positives, confusing unknown individuals with known ones.

Further complicating design choices are implementations at high-traffic venues, such as office towers, sports arenas, entertainment spots, and the like, where the systems may be called upon to perform recognition on large numbers of individuals at multiple gates, doorways, and other access points throughout the venue. Here, the challenges of determining the sensitivity of recognition algorithms are further complicated by the costs and complexities of allocating processing, storage and networking resources between processing nodes "at the edge" (i.e., at or associated with access points where the cameras are disposed) and the server(s) that coordinate their operations.

An object of the invention is to provide improved systems, apparatus, and methods for digital data processing, digital image analysis, facial recognition, and computer mediated security for access control and other applications.

A further object is to provide such systems, apparatus, and methods as can recognize known individuals notwithstanding changes in appearance and, yet, distinguish them from unknown individuals.

Still another object of the invention is to provide such systems, apparatus, and methods as can be applied to optimize use of processing, storage and networking resources in distributed implementations, e.g., at office towers, sports arenas, entertainment spots and other high-traffic venues.

Yet still another object of the invention is to provide such systems, apparatus, and methods as can be implemented at low cost.

SUMMARY OF THE INVENTION

The foregoing are among the objects obtained by the invention which provides, in some aspects, a system for access control that comprises one or more nodes, each of which includes a camera and an associated processing device. The node(s) perform facial recognition on persons imaged by their respective camera(s) and, based thereon, generate messaging and/or control signals to permit or deny access to resources secured by the node(s). The node(s), which are coupled to a server that includes a central store of facial images of known individuals, include respective local stores representing at least some of those facial images in the central store.

In addition to performing facial recognition using the images so represented in that local store, that is, using the images or representations (e.g., vectors) downloaded from the server, each node determines whether images acquired by its camera of known such individuals is a candidate for inclusion in the central store and, if so, uploads at least selected such images to the server for that purpose. Each node makes that determination based on numerical (or other characterizations) of the quality of its camera-acquired images and of the faces depicted in them, as well as on the similarity between those faces and ones already represented in the local store. Once determined as being such a candidate, such an image of a known individual is selected for actual inclusion in the central store, by any of the node that acquired it and the server, e.g., based on whether that image depicts a permissible or expected change in that known person relative to images of him/her already in the central store. If so, the central store is "updated" by way of addition of the candidate image and at least that portion of the store (i.e., the new image or representations thereof) is redistributed to respective ones of the nodes A for use in further recognition.

Related aspects of the invention provide a system for access control, e.g., as described above, in which a permissible or expected change is, without limitation, aging and/or the passage of time since a previous collection of images of the candidate for the central store, weight gain/loss, changes or addition of eyewear, facial decorations (tattoos, nose-rings or other jewelry), changes in facial hair.

Further related aspects of the invention provide a system for access control, e.g., as described above, in which following selection of a candidate image for actual inclusion in the central store the server downloads to one or more nodes information (e.g., images, vectors and/or other values) representing facial images in the central store including that selected image.

Still other aspects of the invention provide a system, e.g., as described above, wherein the nodes are situated in a vicinity of the respective resource that is secured by that node, and wherein the server is disposed remotely from at least one of the nodes. Related aspects of the invention provide such system wherein the candidate image is selected for actual inclusion in the central store by the server.

Other aspects of the invention provide a system, e.g., as described above, wherein at least one said node determines whether images acquired by its camera of known individuals are candidates for inclusion in the central store based on scores of any of the uniformity of lighting of the image, contrast of the image, blur of the image, intensity of the image, pose of a face depicted in the image, whether eyes of the individual depicted in the image are open, distance (in pixels) between the eyes of the individual depicted in the image, whether the individual's face is obstructed, apparent distance from individual depicted in the image to a camera that acquired the image, and signal to noise ratio in image.

Related aspects of the invention provide a system, e.g., as described above, wherein a node that has determined that an image acquired by its camera of known individuals is a candidate for inclusion in the central store uploads that image to the server along with any of (I) scores of qualities of that image, (ii) an identifier associated with a matching entry for that image in the local store and/or of the known individual represented thereby, and/or (iii) a measure of similarity between the face in the image and that of the matching entry in the local store.

Other aspects of the invention provide a system, e.g., as described above, wherein the server selects a candidate image for actual inclusion in the central store based on a measure of the quality of the candidate image, a measure of the similarity of the face shown in the candidate image with that of a said facial image of a said known individual in the central store, and a measure of the extent to which the candidate image depicts a said permissible or expected change in that known individual relative to a said image of him/her in the central store.

Still other aspects of the invention provide a system, e.g., as described above, wherein the server selects a said candidate image for actual inclusion in the central store based on a weighted function of said measures.

Yet another aspect of the invention provides a system, e.g., as described above, wherein the central store is updated to include a said candidate image of a known individual that is selected for inclusion therein, and wherein at least a representation of facial images of that known individual is downloaded to one or more of the nodes.

Still yet another aspect of the invention provides a system, e.g., as described above, wherein the server downloads to the nodes at least a representation (e.g., an embedding vector) of a candidate image that is added to the central store.

Other aspects of the invention provide methods corresponding to the operations of the systems described above.

These and other aspects of the invention are evident in the description, drawings and claims hereof.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
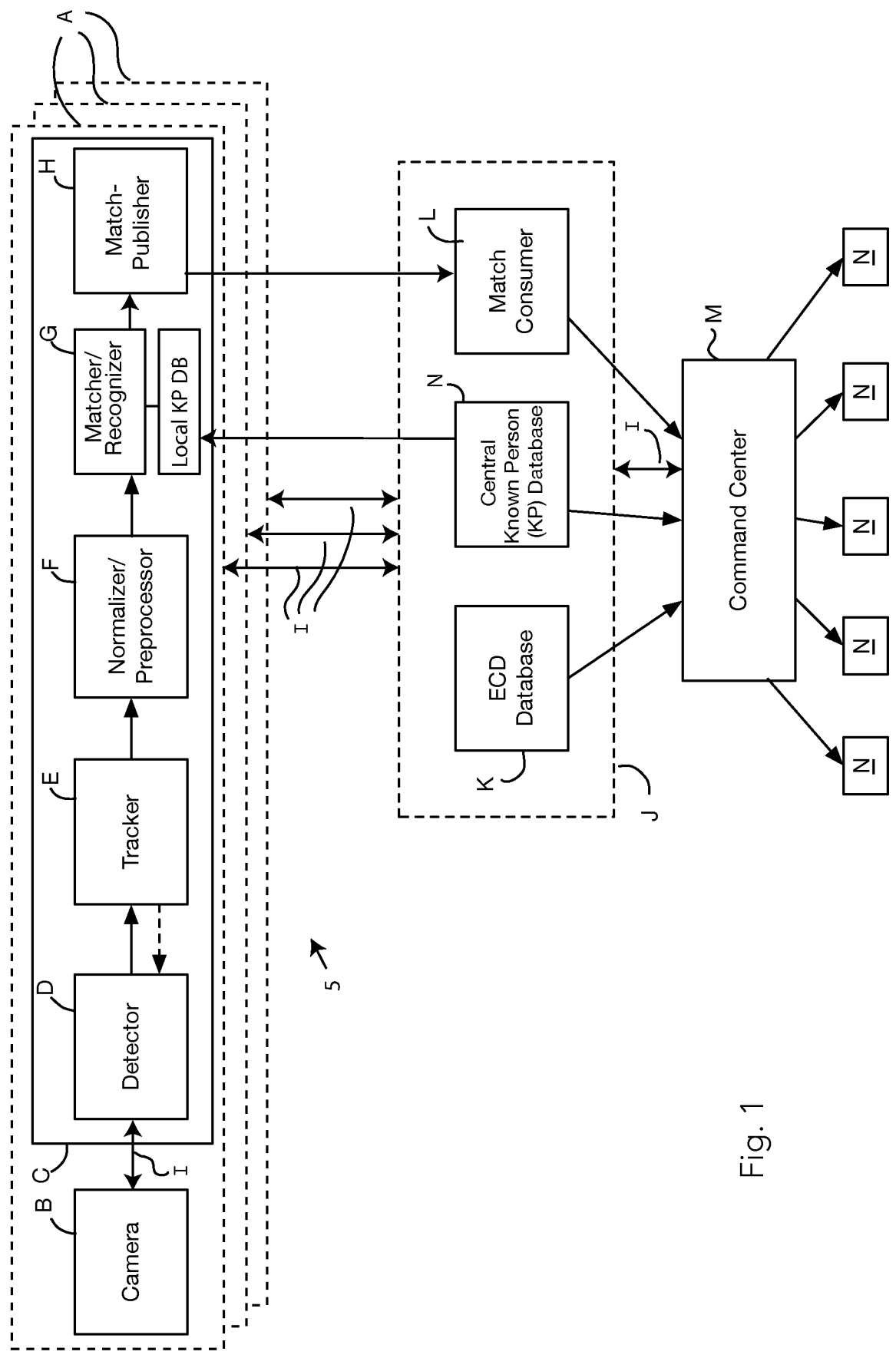
FIG. 1 depicts a system and method for access control in accordance with the present invention.

FIG. 1 depicts a system and method 5 according to one practice of the invention for access control that comprises a plurality of nodes A, each including one or more cameras B and an associated edge processing device C, that are coupled for communication with a server J via network I. Nodes A perform facial recognition on persons imaged by their respective camera(s) B and, based thereon, generate messaging and control locks and other security mechanisms (e.g., as discussed below in connection with elements 30-34 of FIG. 5) and/or otherwise permit or deny access to doors, turnstiles, gated entrances, locked rooms, or other resources secured by those respective nodes A.

Recognition is performed by the nodes A with respect to faces of "known" persons, i.e., persons whose faces are known to the system 5, e.g., employees, pre-registered visitors, ticketed attendees, or others, whose faces are known to the system 5. In the illustrated embodiment, server J maintains a central database (or "store") N of those individuals based on images of their faces acquired by human resource departments, registration centers, ticketing offices, and so forth, e.g., in the process of qualifying them for access to an office tower, sports area, entertainment spot, or other resource. Each node A, in turn, maintains a local database (or "store") 26A of information (e.g., images, vectors or other representations) downloaded from the central database N representing at least some of those facial images in the central database.

In addition to receiving images (and/or vector or other representations thereof) downloaded from the central database N for purposes of matching with persons imaged by their respective cameras, each node can determine whether images acquired by it of known such individuals should be considered for possible inclusion in the central database N, along with or instead of images already maintained in that database N for those individuals. The nodes A can make such determinations based on numerical (or other characterizations) of the quality of those images and of the faces depicted in them and on the similarity between those faces and ones already represented in the local KP database 26A.

An additional determination of whether, in fact, to include such a candidate image in the central database N can be made by the respective node A and/or by server J itself based, for example, on whether that image represents a "life change" in the respective image—i.e., a permissible or expected change in the individual's appearance and not, for example, an error in the recognition process. Such life changes include, by way of example, aging, weight gain/loss, changes or addition of eyewear, changes in facial hair. If so, the central database is "updated" by way of addition of the candidate image and at least that image (or respective portion of the central KP database) is redistributed to respective ones of the nodes A for use in further recognition.

Architecture of a Node A

The architecture of a node A according to one practice of the invention is shown in FIG. 1. The node A includes a camera B that is coupled to an edge computing device (ECD) C which is, in turn, coupled to a server J. Each node A and its constituent camera B and its respective ECD C are typically collocated, at or in the vicinity of a door, turnstile, gated entrance, locked room, or other resource secured by that node A. And, though the server may be co-located with multiple nodes A, in most embodiments, the server is disposed remotely from at least one if not all of the nodes A. Although multiple nodes A are shown in the drawing, it will be appreciated that some practices of the invention employ only one such node.

Each edge computing device C can be situated in a vicinity of the respective camera(s) B to which it is coupled. In such instances, coupling can be attained by direct connection (i.e., from the camera(s) to port(s) of the device C) or by network connection, wired, wireless or otherwise. Alternatively, one or more devices C can be located remotely from its respective camera(s) B and coupled via a suitable network or other connection, all as is within the ken of those skilled in the art in view of the teachings hereof.

Each camera B comprises a conventional video or still image capture device of the type available in the marketplace suitable for acquiring image of persons and other things as adapted in accord with the teachings hereof. In the illustrated embodiment, camera B is a conventional security camera, though, in other embodiments it may be a special purpose camera of conventional or proprietary construction. Thus, for example, in some embodiments, camera B is constructed and operated identically to camera 12 of FIG. 5, discussed below. And, although only one camera B per node A is shown in the drawing, in other embodiments multiple cameras may be provided.

Each camera B is connected to an edge computing device (ECD) C, which may be personal computer, workstation or other computing device, of general- or special-purpose, of the type known in the art as adapted in accord with the teachings hereof, and a further appreciation of which may be attained by reference to the discussion of element 36 of FIG. 5, below. The programming of such general- or special-purpose device to effect the operations attributable the ECD and components thereof shown and described here is within the ken of those skilled in the art in view of the teachings hereof. In some embodiments, one such device C is coupled to each camera B, as shown in the drawing, for purposes of processing a video stream generated by it; although, in other embodiments, a device C may be coupled to and service multiple such cameras B in such fashion.

The output of each camera B of FIG. 1 is processed by a video processing pipeline for facial detection running on the respective ECD and comprising a plurality of software modules (alternatively, referred to as "steps"), here, in the embodiment of FIG. 1, Detector D, Tracker E, Normalizer/Preprocessor F, Matcher/Recognizer G, and MatchPublisher H coupled for communications and/or executing in sequence as shown in the drawing and/or described below. Other embodiments may vary in regard to how that video processing is done, as will be further appreciated by the discussion of the video processing software modules executing on processor 36 in connection with FIG. 5.

Detector D serves to capture video per convention in the art as adapted in accord with the teachings hereof. For example, it can capture an h.264 video stream from a network camera transmitted using the real time stream protocol (RTSP). It can also buffer frames in a manner to make a threaded program be able to access them without creating errors. Other embodiments may, of course, vary in the aforesaid regards. A further appreciation of the features and operations of Detector D, including image acquisition via camera B, may be attained by reference to the source code and embedded comments for the module the VideoStreamDataSource, below.

Illustrated detector D is also tasked with detecting faces in each image. To this end, the detector D takes each frame of the video stream from the respective camera B and, with algorithms it is loaded with (one preferred example is an MTCNN algorithm), detects all faces in the frame, marking each face, giving each face a unique ID (also called faceID), and isolating the face image from the rest of the frame. In other embodiments, it may also yield facial landmarks, such as the tip of the nose, right and left corner of the mouth, and the centers of the two eyes. Other embodiments may vary in the aforesaid regards. A further appreciation of the features and operations of Detector D in these regards may be attained by reference to the source code and embedded comments for the classes FaceDetector and FaceDetectorMtcnn, below. Note that in some embodiments, a body detector, also called a person detector, may be used instead of, or in addition to, a face detector to aid the tracker to continue tracking a person when a face is not visible to the camera.

As noted, each ECD C maintains a local listing (or store or database), referred to here as a local KP database 26A, of the one or more known persons (KPs). The ECD C takes the continuous stream of video coming from the camera connected to the ECD C, starts processing that stream and matches it against that local KP database 26A, referred to below and elsewhere herein as the local KP database 26A, reporting matches to a module executing on server J referred to here as the MatchConsumer L.

Figure 3:
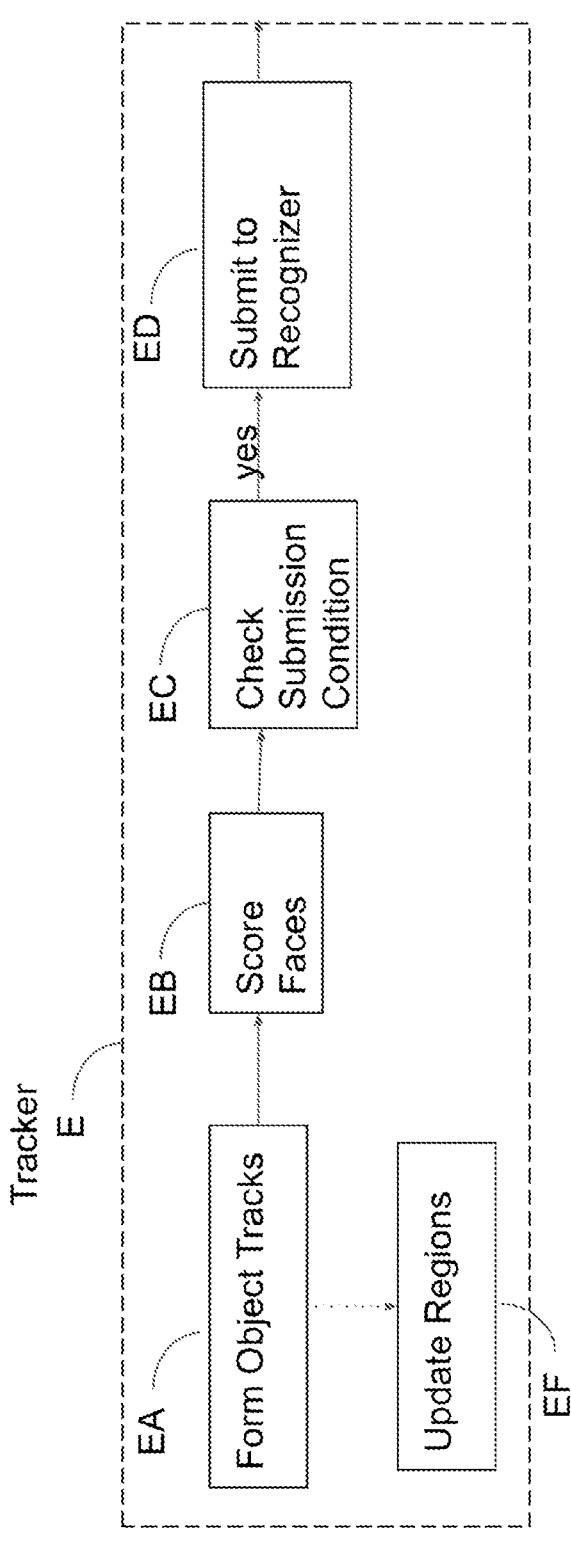
FIG. 3 shows a schematic view of tracker logic in the system and method of FIG. 1.

The tracker E tracks each face from frame to frame in the video stream. The purpose of this feature is if people are walking or moving around the tracker needs to recognize that the face is either the same face or new entrant into the frame (which is left for the detector to mark with a unique ID). The result is a track, which is an array of cropped images of faces to be interpreted by the Recognizer Module G, as well as other information such as the timestamps, and/or facial landmarks. Other embodiments may vary in the aforesaid regards. A further appreciation of the features and operations of tracker E may be attained by reference to the source code and embedded comments for the modules FaceTracker and MultiFaceTracker below. Further details on the operation of a Tracker of the illustrated embodiment is shown in FIG. 3 and described below.

The VideoPreprocessor (below) orchestrates the operation and co-operation of Detector D and Tracker E. It takes in a video source, finds faces, tracks the faces, and produces a group of tracks.

The Normalizer (also called a Preprocessor) F preprocesses the facial image (or, often, simple "face" in the discussion below and elsewhere herein) for the algorithm that will process it into a vector, including resolution, color encoding (e.g. Blue Green Red: BGR), and the range of the pixels (e.g. 0 . . . 1 or 0 . . . 255). By way of example, it starts by resizing each image to a constant preselected pixel width and height, such as 160 pixels×160 pixels, though other sizes are also contemplated, so distant faces which may be only a few pixels wide and high will be normalized with image processing to the preselected size (e.g., 160×160 pixels) and larger faces, such as those close to the camera are reduced to the preselected size (160×160 pixels) as well. Other embodiments may vary in the aforesaid regards. A further appreciation of the features and operations of normalizer F may be attained by reference to the source code and embedded comments for ResNet50_128D_FaceEmbedder (an instance of the FaceEmbedder) below. In the embodiment below, the ResNet50_128D_FaceEmbedder subtracts off a value (91.4953, 103.8827, 131.0912)—though other embodiments may vary in one or more of these regards—to prepare the face for the embedding algorithm, which takes the face and produces a vector.

Recognizer G takes each preprocessed image, produced by the normalizer, and compares this normalized image against each KP entry in the local KP database 26A. If there are multiple KP images for each individual, each KP image is compared and a confidence score is calculated and entered in the confidence listing—close to 100% confidence suggests the detector found 100% match of the preselected size image with the KP image and 0% means a definite non-match. The confidence level is the mechanism which suggests a close match or a poor match of fans/visitors with the KP listing. Other embodiments may vary in these regards.

A preferred instantiation of the Recognizer G uses the FaceEmbedder module (detailed in the source code listings and embedded comments below) to convert each face to a vector, and then a Classifier (detailed in the source code listings and embedded comments below) to find the similarity between the image and each entry in the local KP database 26A. The CosineSimilarityClassifier (detailed in the source code listings and embedded comments below) uses the cosine metric between vectors, and can be used between vectors downloaded from the server J and contained in the local KP database 26A and vectors from images acquired by camera B of the respective node A. If the similarity is high enough, a match is reported. The confidence can be reported as a scaled number based on the cosine (or other) similarity value.

In some embodiments, the node A actuates security mechanisms and/or generate messages to the security personnel and/or others (e.g., the person imaged by camera B) depending on the Recognizer's success in finding a match. An example of such an embodiment is shown in FIG. 5 and discussed below. In other embodiments, e.g., as described in paragraphs that follow, the node A "publishes" potential matches to the server J to generate notifications, e.g., to devices P.

The MatchPublisher H, which not only tabulates all the confidence levels, but also prepares to publish the matches to the server J, described below, above a certain threshold level that can be set, e.g., prior to the system operation. For instance, in one embodiment of the invention a strict system may be set with a low confidence level such as 55%, but a very strict matching system may choose to only evaluate matches with confidence levels of 95% or better.

MatchPublisher H keeps the image and the faceID for all matches above the confidence levels; the rest of the matches and associated data are preferably deleted to preserve storage capacity in the ECD C and also to preserve the privacy of the people in the crowd that pose no security threat. An instantiation of the MatchPublisher is the AlertingIdentifier (detailed in the source code listings and embedded comments below). The alerting identifier uses a FaceSequenceMatcher (detailed in the source code listings and embedded comments below) to decide if the track (or sequence) of faces matches with a KP in the database 26A. The FaceSequenceMacher can compute the similarity of every image in the sequence with a KP in that database 26A, and compute an average similarity, and then check the threshold to decide if there is a match. If indeed there is a match, the largest similarity face and score is reported to the server J.

In practice, various methods are used to increase the effectiveness of the MatchPublisher. A first is to not send repeated alerts. For the instantiation of the AlertingIdentifier: it checks to see if a match has been made within a time interval. If so, it does not repeat the alert. A second is the concept of the special watch list. If the system makes an error, and an alert is sent to devices (P) incorrectly, then it is like to repeat the same error when the same person is seen later. To avoid repeated errors, a face (embedding vector) that is consistently incorrectly matched, can be recorded and effectively added as a special KP. When subsequent examples of the same person are matched, and match the special KP, they can be ignored. A simple way to implement this functionality is to have the server J message the ECD C to add the person who is in error as a KP. Subsequent images of that person are likely to match to him or herself. When the server receives an alert for that special KP, the server can simply ignore it. Thus, repeated incorrect alerts can be avoided.

The ECD C of the illustrated embodiment is connected to it server J, either on the same LAN or in the Cloud via a network I, which may comprise the Internet and/or one or more other networks of the type known in the art suitable for transmission of images and/or other information of the type described herein. In some cases there may be more than one server J on the LAN, in the Cloud, or a mixture to maintain redundancy and speed. Conversely, as noted above, in some embodiments, the server J may be coextensive with one or more of the nodes A; this includes embodiments where there is only a single node A (in which embodiments the central KP database and local KP DB may be one and the same).

Server J of the illustrated embodiment comprises a digital data processor, e.g., of the type described below in connection with element 36 of FIG. 5, adapted in accord with the teachings hereof to provide the functions and perform the operations described below and elsewhere herein.

Illustrated server J fulfills a number of functions. First, it holds the central database N (or "KP Database" or "Central KP Database") of facial images of known persons, which images are ingested prior to system operation or are added to the database N during system operation, and a copy of which images (or vector or other representations thereof) are disseminated to each ECD C.

The central KP database or at least portions thereof is downloaded to the local KP database 26A of each ECD C and, to this end, in some embodiments, the images themselves are sent to the respective ECDs and, in other embodiments, embedding vectors or other numeric or other representations generated from each image are sent in addition or instead. In the latter instance (i.e., where embedding vectors or other representations are sent instead of images), this can be beneficial to keep the images of KP contained on a server (e.g., for security and/or privacy purposes) and/or to reduce resource consumption during dissemination.

Such embedding vectors can be generated, e.g., using the FaceEmbedder as discussed below and, more particularly, by using FaceEmbedder, e.g., Resnet34, to generate a vector of facial features (embeddings) for each facial image in the database N. Before generating an embedding from such an image, the image can be preprocessed as discussed below in connection with operation of the Normalizer F. Other embodiments may use other techniques to generate embeddings that represent the faces in the database N and/or to generate other representations of those faces for use in the manner of embeddings, i.e., for comparison with faces in images acquired by the nodes A, 10 of individuals present at an access point and/or seeking access to an office tower, sports area, entertainment spot, or other resource.

More generally, in embodiments where a goal is to minimize compute and storage resources required by the nodes A, 10, the number of vectors downloaded to the local KP databases 26A can be minimized, e.g., by maintaining only one vector for each individual in the central KP database (and regardless, for example, of the number of images in that database for that individual). In other embodiments, multiple such vectors can be stored in the central KP database N—e.g., one for each image in that database—but only one (or a limited number) downloaded to the local KP databases 26A of the nodes A, 10, e.g., depending on their respective processing and storage resources. In still other embodiments, variable numbers of vectors are downloaded to the local KP databases 26A for each KP, e.g., to optimize the error rate by the respective node A, 10 during facial recognition (e.g., given that some KP's images may require more vectors at recognition time to ensure accuracy of recognition).

The use of embedding (or other vectors) instead or (or in addition to) KP images creates a challenge for when the algorithm to produce embeddings is updated and new vectors are generated and transmitted to each node A, 10. To solve this issue, the ECD C are updated first with the new algorithms, and then the embedding vectors are re-downloaded. If there is sufficient space, the embeddings vectors or other image representations, for a new algorithm can be downloaded before switching algorithms so as to minimize system downtime. The algorithm's identification or label is specified with those vectors. An instantiation of such a label is the EmbedderNames (detailed in the source code listings and embedded comments below).

The server J is aware of all the ECDs C and stores their identities, IP (or other communication) addresses, resource capacity (e.g., processor, camera, storage) and status in a database K. It may also be aware of their physical location. When commissioning a camera (B) and an ECD (C) associated with it, the location and perhaps desired confidence levels of detection can preferably be noted in the database K, as well.

In some embodiments, the server can feed alerts, e.g., to command center M for display on devices P indicating the presence and locations of KPs that constitute threats. Such alerts can be in the form of audio alarms, visual signals or otherwise, as is within the ken of those skilled in the art in view of the teachings hereof. Alternatively, or in addition the server can send to the command center M (and, in turn, to devices P) a version of the video stream modified to highlight—e.g., via arrows, circles, or other graphical devices, and/or via increased brightness, contrast or other video techniques known in in the art, those threats. The feeding of such alerts and modification of such video streams is within the ken of those skilled in the art in view of the teachings hereof.

The server (J) can keep the aggregate of all the matches of KP by running a MatchConsumer (L) module which listens to the MatchProducer module in each of the ECD (C). Since people and KP may be moving around, the server (J) can feed a central or distributed display system which may be in a control center or command center (M). In addition, in some embodiments, relevant match information may also be passed to security personnel and their handheld devices P near each camera B. The display and the handheld devices may show the location, the face from the crowd that was matched with the KP listing and the confidence level of the match.

An additional step occurs during the adding of KPs. Some images may be rejected because they are blurry. Other images may have low quality that may not be so easily detectable. One method to find these images is to compare against the embedding vectors of other KPs. Images that are too similar are rejected. An instantiation of this method is found in the detect_duplicates function of the Classifier method below.

Configurable Confidence Score: The Recognizer G's use of confidence scores to determine when the quality of the image of a tracked face improves enough (becoming less occluded, for instance) to be re-scrutinized by the recognition module, thereby improving the accuracy of the system, makes the system very reliable and usable for this purpose.

In addition, each camera/ECD pair may be assigned a different confidence threshold which might be necessary due to ambient lighting conditions or position of the camera (which may not always be optimal due to external factors). To achieve this ability, Server (K) communicates to ECD (C), updated thresholds.

Figure 2:
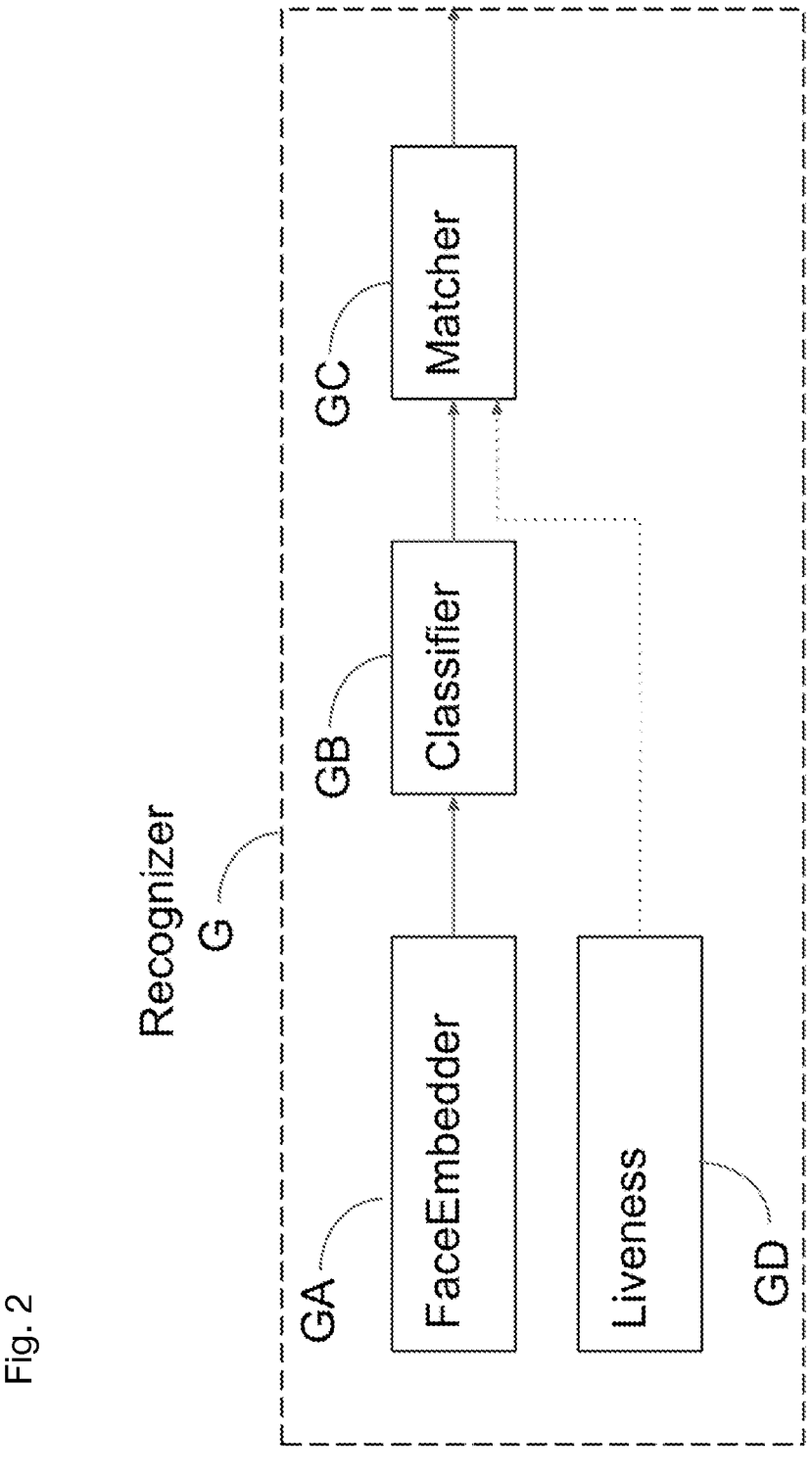
FIG. 2 shows a schematic view of recognizer logic in the system and method of FIG. 1.

FIG. 2 shows a schematic view of an implementation according to one practice of the invention of the Recognizer G from FIG. 1. It is also labeled G in this figure.

Illustrated Recognizer G uses the FaceEmbedder module GA (detailed in the source code listings and embedded comments below) to convert each face to a vector, and then a Classifier GB (detailed in the source code listings and embedded comments below) to find the similarity between the image and each POI. The CosineSimilarityClassifier (detailed in the source code listings and embedded comments below) uses the cosine metric between vectors, and can be used between vectors from POI images and vectors from collected images. If the similarity is high enough, a match is reported by the GC Matcher. In alternate embodiments, the Recognizer may use a support vector machine, or simple neural network, or other machine learning mechanism to classify vectors as belonging to a POI.

The confidence can be reported as a scaled number based on the similarity. An additional inter-POI-confidence can be reported based on the comparison of the similarity between the CosineSimilarity of the vectors from the collected images and vectors from POI images from different subjects in the POI. For example, the ratio of the top two subjects in the POI may be computed and additionally thresholded by the Matcher.

Also in FIG. 2 is optional liveness detection GD. This is provided to insure that pictures and other non-animate depictions do not trigger a match with faces of live individuals that are being tracked. The implementation of liveness detection is within the knowledge of those skilled in the art in view of the teachings hereof. Algorithms that check for liveness may also be used as input to the Matcher GC.

FIG. 3 is a schematic view of an implementation according to one practice of the invention of Tracker, 1E from FIG. 1. In EA, an object handed in by the Detector D is tracked in a conventional manner known in the art as adapted in accord with the teachings hereof. To this end, in some embodiments a KCF tracker is used because of its speed. In other embodiments, a Kalman filter is used to predict where an object is going based on the apparent velocity of the object as depicted in the video stream (and as detected in accord with the teachings hereof and as modified in a manner within the ken of those skilled in the art). The result is object tracks which consist of cropped faces in time as described in FIG. 1. As the tracks are formed, the score for each cropped face is computed in step EB. In some embodiments, the score consists of the interocular distance in pixels, and the pose of the face, consistent of 2 angles in degrees. Modern face recognizers are more accurate for higher resolution images up to a minimum pixel width, and for faces that are closest to looking straight at the camera. In step EC, the illustrated system determines if it is time to submit the track to the Recognizer. One creates a submission condition. In the illustrated embodiment, submission conditions check if the scores has stopped increasing, or if the track has existed for more than a certain amount of time. If the check for the submission condition is confirmed, the track of faces is submitted to the Recognizer G in step ED. Other embodiments may vary in these regards in the spirit of the invention.

Note that in the illustrated implementation, the tracker continues to track. It is an optimization not to submit the same person again to the recognizer. Note also the tracker has two failure modes. It can combine the tracks of two different people. It can also lose a track. Losing a track is not too difficult a problem as the Matcher GC in FIG. 2, can look at recent submissions and see if the person being submitted has already been submitted recently. It is equivalent of a temporary POI list. If two tracks are merged, that can create a problem for the Recognizer. The Recognizer then receives a list of crops that consist of at least 2 different people. This problem can be dealt with in two ways. First, the problem can be ameliorated. Trackers can be augmented with feature data such Linear Binary Patterns (LBP) around landmarks such as the ears, eyes, nose and mouth. The tracker can therefore be strengthened to only track objects which continue to have similar features, making it less likely that mistakes are made. Similarly, trackers can try to disambiguate tracks based on their motion and position. Second, one can run a clustering algorithm in the Recognizer. If the embeddings form two separate clusters, the Recognizer can effectively determine that it has two different faces. Note that taking into account the time values associated with the collected faces is valuable as one would expect the clusters would occur sequentially in time.

Figure 4:
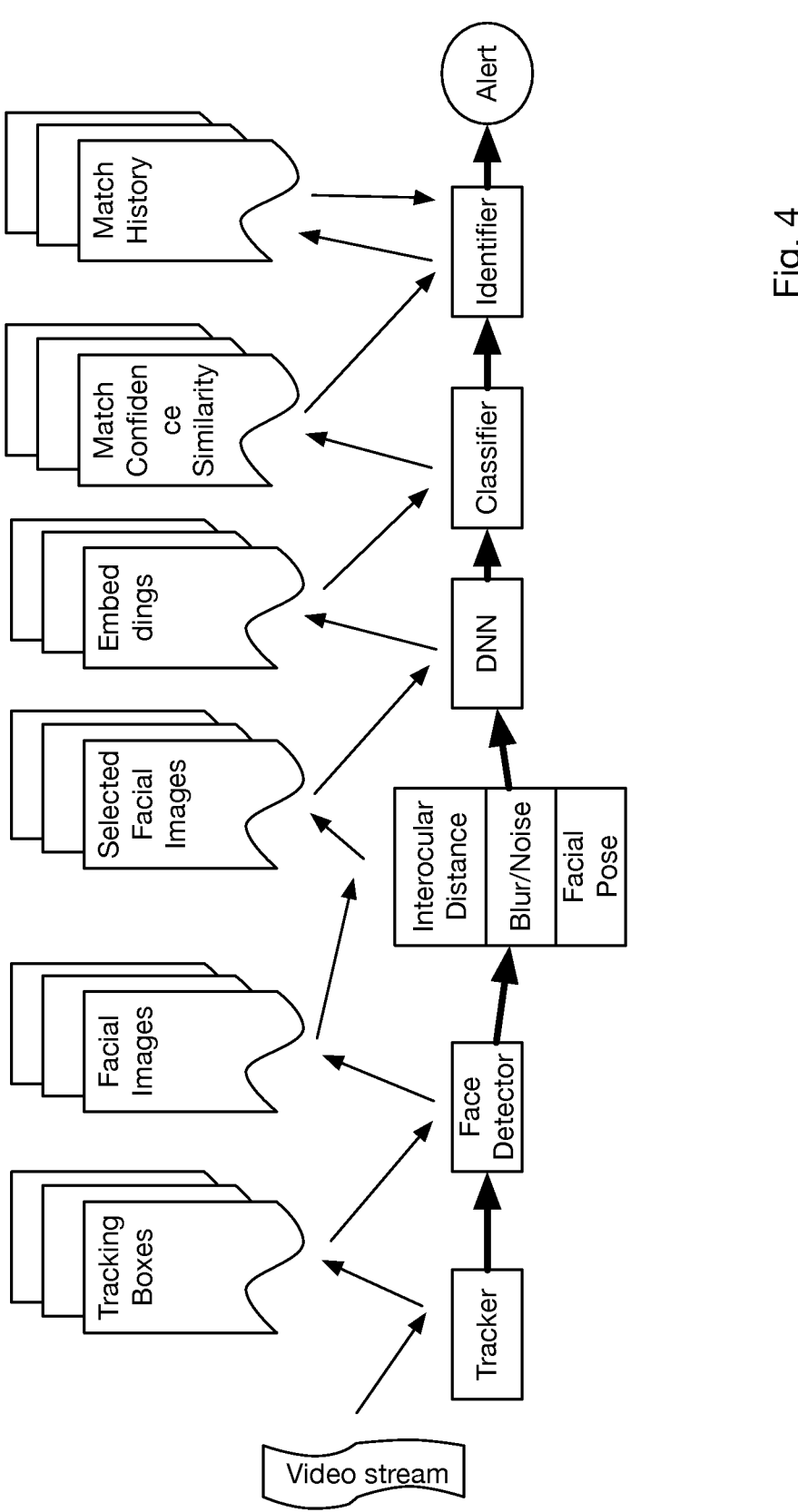
FIG. 4 shows an alternative schematic view of the system and method of FIGS. 1-3.

The tracker can also be used to make a compute optimization in the object detector D in FIG. 1. Rather than have the object detector try to detect objects in the entire image, the object detector can be focused on the regions where tracks are located, or where new tracks are likely to appear. A simple way to do the optimization is to look for objects in the entire image, and then use the tracker for a few frames to predict new locations, and then look for objects in the entire image again, and repeat the cycle. A different optimization is to collect tracks over time and map out the parts of the image that have faces. After enough time has passed, the object detector can look only in the used regions, rather than then the entire image, and occasionally look through the entire the entire image just to be sure. FIG. 4 is an alternative depiction of the invention, with changes in nomenclature with respect to FIG. 1, item C. The videoStream comes from the camera B in FIG. 1. The Face Detector (D in FIG. 1) detects faces. A preferred implementation is the MTCNN face detector, which uses deep learning networks to identify individual faces, and is a typical tool known to people with skill in the art of face detection. Each face is tracked by the Tracker (E in FIG. 1) over multiple frames thereby providing a temporal continuity. There are many trackers that will do; one example is a particle filter tracker, another is a KCF tracker. The Tracker forms tracking boxes, which are the cropped faces that come from a single person walking in view of a camera.

Each face in each frame is scored with respect to the amount of blur, noise, facial pose frontality, interocular distances as well as other sizes, and other factors (EB in FIG. 3). These factors are weighted to produce ultimate face score, which is used to select best faces from each tracking sequence thereby maximizing the probability of accurate facial identification. An example blur score is best on running high-spatial frequency digital filters over the image and normalizing by the intensity and area. The higher the score, the less blurry the image. One can estimate a maximum blur by looking at many images which are not blurry. The pose can be measured as the pitch in degrees from facing the camera. The interocular distance can be measured in pixels. An overall score would simply be a normalized sum of these metrics: score=pose/(90 degrees)−blur/(maximum blur)+interocular distance/(100 pixels). The top score images are selected, which can be updated as the track continues (Part of Tracker E in FIG. 3).

Interocular distances that are too small yield very poor results, and interocular distances above a certain level yield no improvement. Therefore, in some embodiments, the score of a detected face is set to a constant value, such as 0, below a certain interocular distance, and then goes up linearly until a maximum interocular distance, at which point the score is set to 1. Note that the measure of interocular distance effectively includes a measure of the yaw-angle, because large yaw angles relative to the camera produce a small interocular distances. It is also a measure of the size of the face as small faces, which are harder to recognize, yield small interocular distances. In other embodiment, one can use width or height as the score, converted to a linear function truncated by a lower and higher threshold. Similarly, another way to compute score is to (i) truncate measurements of each of noise and blur to an expected and to normalizing the resultant values to lie between zero and one. The overall score can then be the product of the three scores, to wit, blur, noise and interocular distance. It will be appreciated that noise is often reasonably constant across within a camera, so that often noise is not computed.

The selected faces are sent to a DNN which is an instantiation of a FaceEmbedder (GA in FIG. 2) such as Resnet34, a neural net, which produces a 256-dimensional vector of facial features (embeddings) for each face. The embeddings vectors for each face are used to compute cosine distances (similarity measures) in the Classifier (GB in FIG. 2) with each embedding vector previously produced for each photo to be identified with (watchlist or list of POIs). Due to cosine nature of similarity computation similarity measure falls between −1 and 1, "1" to be the closest resemblance. Each item in the watchlist is associated with a unique person id and has a unique photo_id These similarity measures are sorted to identify the two closest neighbors. The cosine similarities for the two closest neighbors are normalized to produce confidence measure in the range between 0 and 1, this is the inter-POI score. This is a per-frame portion of the classifier. The results of identification for each photo can include, the closest match person id, measure of similarity, confidence level. The Match Confidence/Similarity (GC in FIG. 2) can identify an individual as described above. The Identifier and Match History can be part of the Recognizer (FIG. 1, element G) or the MatchPublisher (FIG. 1, element H). The preferred instantiation is in the Recognizer (FIG. 1, element G).

One can do temporal adjustment of thresholds by processing more and more images over time. Out of multiple photos submitted for identification, the one with highest similarity level is selected and stored in the match history maintained for each person_id along with the timestamp. The match model analyzes the match history to check if the identification activity for a given person id within a critical time (about 2 min) for a single episode exposure to the camera is sufficient to issue an alert (positive identification). The alert is issued if the average activity for a given person id over the critical time exceeds the thresholds for similarity and confidence. The similarity thresholds can be non-linearly adjusted (reduced) over the number of positive identifications within critical time period using the following formula:

$$Tadjusted = Tbase - Tstep\frac{1 - r(n - 1)}{1 - r}$$

Where Tadjusted is the threshold reduced from the original Tbase level over n positive identification within critical time period. Tstep and r are the parameters controlling the steepness of threshold adjustment. This formula is used for both the confidence and similarity thresholds. Once the alert is issued the match history and the thresholds for a given person_id are reset.

Using the Tracker (FIG. 1 E) to Optimize the Recognizer (FIG. 1 G)

Tracking a face on the video allows a method to associate a single person with multiple video frames. The number of times the embedder is run can thus be reduced. Instead of running the embedder on every frame, it can be run on a single frame or a small number of frames for each person. The embedder is often computationally expensive, so that reducing the number of calls to the embedder is valuable for efficiency.

Ideally one merely needs one facial image to make positive identification. Selection of a facial image from this sequence can increase the probability of accurate identification would depend on it. The invention includes a number of factors which allow one to maximize the accuracy of identification including but not limited to: Interocular distance; Pose of the face, including how close to straight at the camera; Blurriness of facial image; and Noisiness of facial image. These factors contribute to the facial image quality score, ultimately determining the image to be submitted for identification.

A preferred score for resolution goes from 0 to 1. The score is 0 below a minimum face width (or alternatively interocular distance). The score grows linearly to a 1.0 at a maximum interocular distance. Similarly, a score for pose of the face based on the yaw angle which is 1.0 below. (We find that most captured faces have a small enough roll and pitch so as not to be worth computing as part of the score.) One way to compute the overall score is to take the product of the scores.

Submitting multiple selected frames from a tracking sequence further increases the probability of accurate positive identification. A preferred way to handle multiple input images is to pre-process all of them individually (FIG. 1F), and then feed them all through the Embedder (GA in FIG. 2). Processing multiple images can be done very efficiently on a graphics processor (GPU), or a CPU with many cores. The classifier (GB in FIG. 2) can then also process the images individually. The Matcher (GC in FIG. 2) can run a number of algorithms based on the outputs of the classifier for each image.

In a preferred instantiation, the matcher considers the cosine similarity score for each image and the top POI match, as well as the inter-POI-confidence. If the inter-POI confidence is too low, that face-crop is ignored.

Because the tracker makes errors and sometimes merges tracks of different people, it is possible that two people walking are part of a track. For the security application, it is unlikely that multiple POIs will be present together and be part of a confused track. And, there is a likelihood that another camera will see the same person later on. Thus, a preferred approach is that using the detected faces in a track, the Recognizer recognizes only one person. Of the remaining matches, if the cosine similarity score is high enough for any one POI, and no other POI, then that match is approved.

As mentioned previously, clustering algorithms can also be used to separate out embeddings of two different people in the same track, in which case each cluster of embeddings can be treated separately.

Otherwise, the threshold of cosine similarity score can be lowered linearly from that higher threshold to a lower threshold based on the number of images available, as long as all the images vote for the same person. As an example, if top POI match is the same for five images, and they all have a score above the lowered threshold, then a match is found. Furthermore, there can be made an effective 1-match, 2-match, 3-match, etc. threshold. Is the example, if three of the five images are above the 3-match threshold, then a match is made.

Theory of Using Multiple Images to Increase the Probability of Positive Identification Given a sample x from a rate, we have 2 hypotheses: Hypothesis A: The image is of the person on the watchlist whose embedding is closest to Hypothesis B: The image is from anyone else, either on the watchlist or off. There are N people at the event, perhaps 50,000. There are M people whose embedding is reasonably close to the embeddings of A.

Theory with a single sample: Given a sample embedding x. Assume the measured numbers are:

$p(x|A)=0.4, p(x|B)=0.1$ $p(A|x)=p(x|A)p(A)/p(x)$ $p(A)=1/N$ $p(x|A)=0.4$ $p(x)=p(x|A)p(A)+p(x|B)p(B)=0.4/N+0.1*N/(N-1)$ $p(A|x)=0.4/(0.4+0.1*(N-1))\cdot$ $p(B|x)=0.1*(N-1)/(0.4+0.1*(N-1))$ Note that if N is large, the tail of the probability distribution is strengthened by N−1. In practice, we typically only care about the M people whose embeddings are close to the embedding of A. In practice, M is proportional to N, with a small coefficient. So, the above theory should really have (M−1) in it, not (N−1). If p(A|x) is much larger than p(B|x), the false positive rate is essentially 0, and we have very high confidence that hypothesis A is correct. If p(B|x) is much larger than p(A|x), the false negative rate is essentially 0, and we have very high confidence that hypothesis B is correct. Note that we are really working with probability densities above, but in practice one uses histograms. Measured histograms of distances within a class and across a class show a broadly peeked functions which can be approximated by a Gaussian distribution Theory with multiple samples: Given a sample embedding x, y.

$p(A|x,y)=p(x,y|A)p(A)/p(x,y)$

If we assume the samples are independent given the hypothesis. (In fact, they are highly correlated)

$p(A|x,y)=p(x|A)*p(y|A)p(A)/[p(x|A)*p(y|A)p(A)+p(x|B)*p(y|B)*p(B)]$ $p(B|x,y)=p(x|B)*p(y|A)p(B)/[p(x|A)*p(y|A)p(A)+p(x|B)*p(y|B)*p(B)]$

Let's examine three situations:

(1) Two samples that are about the same in probability:

$$p(x|A)=0.4, p(x|B)=0.1, p(y|A)=0.4, p(y|B)=0.1 \qquad (a)$$

$$p(x,y|A)=0.4*0.4/[0.4*0.4+0.1*0.1*(N-1)] \qquad (b)$$

$$p(x,y|B)=0.1*0.1*(N-1)/[0.4*0.4+0.1*0.1*(N-1)] \qquad (c)$$

(d) For two samples, it becomes exponentially more likely that A is the hypothesis.

(2) p(x|A) high, p(y|A) in the middle.

$$p(x|A)=0.9, p(x|B)=0.01, p(y|A)=0.4, p(y|B)=0.1, \qquad (a)$$

$$p(x,y|A)=0.4*0.9/[0.4*0.4+0.1*0.1*(N-1)] \qquad (b)$$

$$p(x,y|B)=0.1*0.01*(N-1)/[0.4*0.9+0.1*0.01*(N-1)] \qquad (c)$$

(d) In this case, the probability of B is super-tiny, and we can ignore it.

(3) p(x|A) high, p(y|B) in the middle.

(a) This is the same as (2) above.

If the samples x, y, are independent conditioned on the hypothesis:

More samples are exponentially better. One gets exponential improvements in the false positive and false negative rates.

If any one sample is very high or low probability: The false positive and false negative rates are already sufficiently low to not require additional samples.

The results are independent of the number of people in the watchlist. If the watchlist grows, the match doesn't change. If the number of people at the event grows, the math changes.

In practice, the samples are not independent conditioned on the hypothesis. But, in practice it is not a bad approximation as the embedder maps images to a region in a high-dimensional space, and with deep learning embedders, small perturbations in the input image can have random effects.

The implied algorithm Choices:

Any match that is sufficiently high or low probability, make a decision.

Measure the probability distributions within subjects and across subjects to estimate P(x|A) and p(x|B) based on the distance between embeddings. This should just be a histogram/look-up table.

Use those distributions to estimate false positive and false negatives rates for a given sample. That is a measure of confidence.

If desired, P(x|A) can be measured independents for each member of the watchlist.

One can do the same analysis using KNN classifier with K=2 to members of the watchlist.

In practice, the histogram/look up tables can be estimates, and replaced by a linear function, which is the preferred implementation.

Integrating Classifier Output Over Immediate Past for Making Identification Decisions Successive positive identifications reduce the probability of false positive, therefore our system reduces the thresholds for similarity and confidence over multiple identifications thereby making positive identification more probable. The threshold reduction is non-linearly dependent of a particular id being identified over a critical time window.

It's noteworthy that the thresholds used in the classifier in a single frame can be reduced based on using multiple frames and aggregating together and selecting the optimal frames to use. Thus the sampling discussed in the past section can be made to be optimal, looking for images that are most likely to give good answers, while reducing compute to fit within limitations. The compute reduction comes because not all images need to be investigated.

Alternative Architecture of a Node

Figure 5:
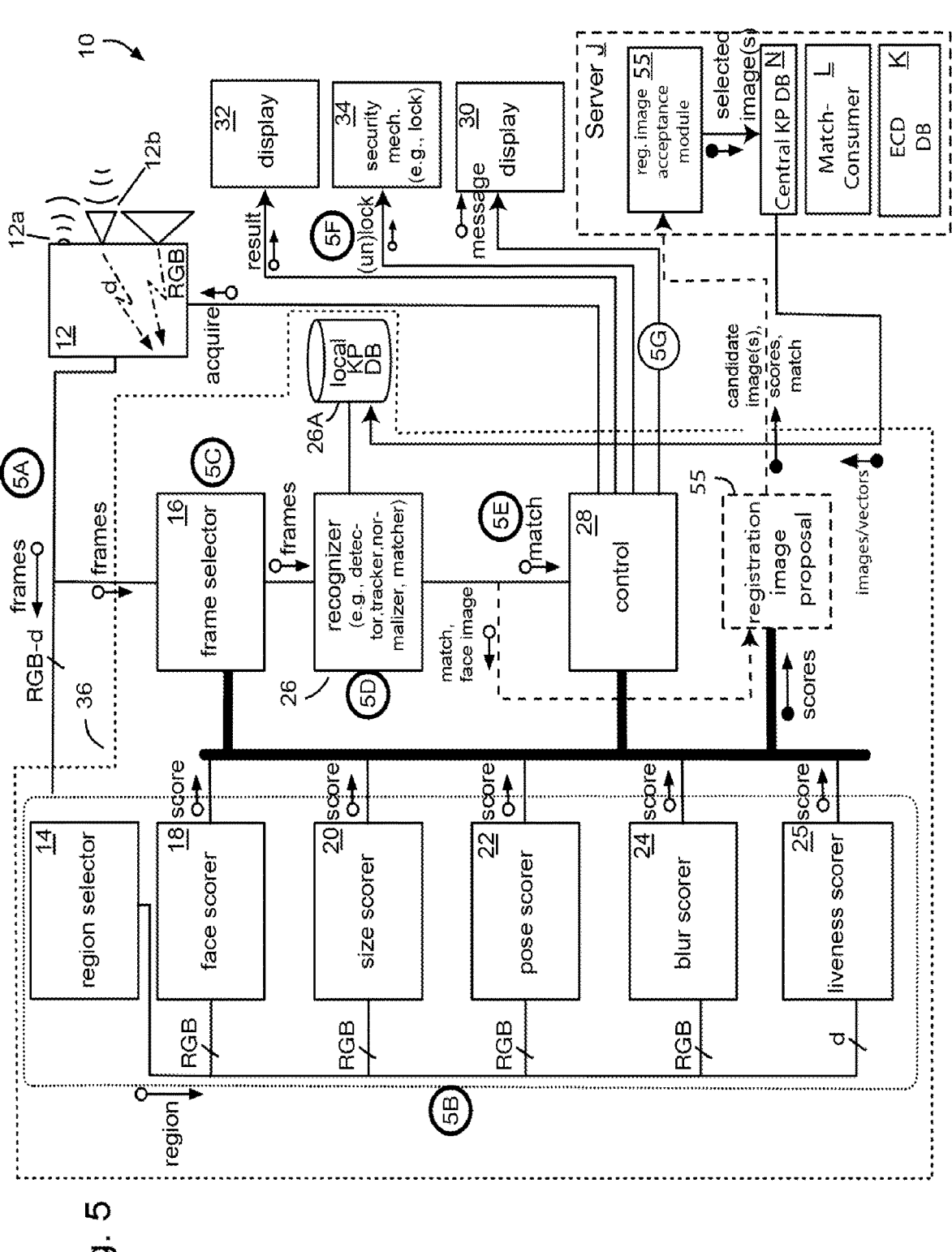
FIG. 5 depicts a system and method for access control according to the further embodiments invention.

FIG. 5 depicts a system, apparatus and method according to further practices of the invention for access control using face recognition. The system 10 of FIG. 5 can serve as a node A in the system 5 of FIG. 1. Moreover, the system 10 can constitute such a node in a single-node system 5.

Illustrated system 10 includes an RGBD camera 12 that is coupled to a frame selector 16 which, in turn, is coupled to a face scorer 18, a size scorer 20, a pose scorer 22, a blur scorer 24 and a liveness scorer 25. The scorers are coupled to a frame selector 26 and to a control 28 that is, in turn, coupled to a security mechanism 34 and one or more displays, here, displays 30, 32. The frame selector 16 is also coupled to a face recognizer 26, which too is coupled to control 28. An optional region selector 14 is interposed between the camera 12 and the scorers 18-25, as shown.

In the illustrated embodiment, elements 14-28 are implemented in software that executes on a digital data processor 36, which can be a workstation, desktop, laptop, micro, embedded or other general- or special-purpose computing device of the type that is (i) commercially available in the marketplace or otherwise known in the art, as adapted in accord with the teachings hereof, and (ii) that may incorporate one or more graphics processing units (GPU) or other hardware and/or software suited to image processing and/or deep neural networks, including by way of non-limiting example, the TPU (Google Inc, Mountain View, CA) or CoreML (Apple Inc., Cupertino CA) or the Movidius chip (Intel Inc. Santa Clara, CA), again, all as adapted in accord with the teachings hereof.

Other embodiments may vary in one or more of these regards. Thus, for example, elements 14-28 may execute in distributed fashion across multiple devices be they general-purpose computers, special-purpose logic, or otherwise, as is within the ken of those skilled in the art in view of the teachings hereof.

Coupling between such multiple devices, in embodiments that utilize them, can be via local area network (LAN), Internet, and/or other communications media (wireless or wired) of the type commercially available in the marketplace or otherwise known in the art, as adapted in accord with the teachings hereof. This is likewise true of coupling between the RGBD camera 12 and digital data processor 36, as well as between it and displays 30, 32 and security mechanism 34.

Capturing Candidate Individual Images

Device 12 is an RGBD camera or other image acquisition device (hereinafter, "RGBD camera" or, simply, "camera") that generates (i) a stream of video images (hereinafter, "video stream" or "video frames" in the text, and "RGB" in the drawing) of a field of view, e.g., showing a person—hereinafter referred to as the "candidate" individual—nearing and/or near a resource or access point such as a door or turnstile, gated entrance, locked room, or so forth (the terms "resource" and "access point" are used interchangeably throughout this document, except where otherwise evident in context), and (ii) a corresponding stream of depth images ("depth stream," "depth frames" or "depth image stream" in the text, and "d" in the drawing) of that field of view. See reference numeral (A) in the figure, hereinafter (like its brethren) "Step (5A)."

In the illustrated embodiment, camera 12 is a conventional depth camera of the type commercially available in the marketplace (e.g., in the guise of so-called Kinect-style cameras) or otherwise known in the art, as adapted in accord with the teachings hereof, though, in other embodiments other image acquisition devices suitable for acquiring video and/or depth frames of a scene may be used instead (e.g., stereo cameras with associated distance-determining functionality). And, although, the video images and depth images generated by camera 12 of the illustrated embodiment are generated by a single device, in practice multiple devices may be used instead or in addition.

Per convention, the video images comprise pixels defining the light intensity and color at each point in the field of view, though, in some embodiments gray scale or other "color" spectra are employed; regardless, for sake of simplicity, the notation RGB is used herein throughout. The depth images, on the other hand, capture the distance of each of those points from the camera, i.e., "distance pixels" in the discussion that follows. It may, depending upon capabilities of the camera utilized, capture the infrared (or heat) intensity of each of those points. In the illustrated embodiment, the camera 12 incorporates an infrared transmitter 12*a* to facilitate distance determination per convention in the art; though, alternatives for facilitating such determination (sound, laser, and so forth) within the ken of those skilled in the art may be used instead or in addition.

The corresponding frames of the video and depth streams may be synchronized in time with one another and their fields of view aligned in space, that is not a requirement of the invention so long as there is sufficient concurrence in time and alignment in space to permit mapping features (e.g., a face) shown on one with that in the other, all as is within the ken of those skilled in the art in view of the teachings hereof.

Although in the illustrated embodiment, the RGBD camera 12 captures both video images and depth images, in some embodiments camera 12 generates only depth images. In such embodiments, processing of video images is handled, if at all, by separate apparatus (not shown) per the methodologies discussed below for the processing of such images. Alternatively put, some embodiments provide for the capture and processing of depth images only in accord with the methodologies discussed herein.

In embodiments in which the candidate individual is expected to walk toward the access point, the camera 12 is preferably selected, disposed and/or aimed to (i) maximize depth resolution when the candidate is poised for recognition and/or to enter, use or otherwise access the access point, and (ii) minimize the effect of blur on acquisition of images of the individual. To this end and consistent with the discussion above, although, only one device 12 is shown in the drawing, it is within the ken of those skilled in the art to use multiple such devices (e.g., at different vantage points) in view of the teachings hereof—e.g., thereby providing for the generation of video frames from one vantage point (e.g., with more fulsome images of the candidate individual's face, regardless of pose, obstructions or otherwise) and providing for the generation of depth frames from another vantage point. Moreover, although shown independently, here, in some embodiments, camera 12 may be co-housed with displays 30, 32, control 28 and/or digital data processor 36, all as is within the ken of those skilled in the art in view of the teachings hereof.

In some embodiments, device 12 can comprise a conventional video or still image capture device of the type available in the marketplace suitable for acquiring image of persons and other things as adapted in accord with the teachings hereof. Thus, as with camera B (FIG. 1), device 12 can be a conventional security camera. Such embodiments need not incorporate a depth image-based liveness scorer 25 nor utilize the processing steps associated therewith in the discussion that follows. More generally, it will be appreciated that while some embodiments of the system 10 include a full complement of scorers 18-25 as shown in the drawing and described below, other embodiments may lack one or more of those scorers and/or may include other scorers providing other measures of the quality of the acquired frames and faces depicted therein instead or in addition, all as is within the ken of those skilled in the art in view of the teachings that follow.

Frame Selection

Scorers 18-24 of the illustrated embodiment generate scores for each of the frames in the video stream received from the RGBD camera 12, and liveness scorer 25 generates a score from the depth stream. See Step (5B). In the illustrated embodiment scorers 18-25 operate in parallel with one another and, indeed, can operate synchronously, e.g., so that the scores generated by them are concurrently available to frame selector 16 for purposes of composite score generation, as discussed below. In some embodiments, liveness scorer 25 is not invoked in Step (5B), but rather is invoked in Step (5F), once controller 28 has determined there is a match between a face in a video image, but before granting access via security mechanism 34. As those skilled in the art will appreciate, invoking the scorer 25 in Step (5F) rather than step 5B has the potential advantage of reducing compute required. Although a discussion of scorers 18-25 follows, it will be appreciated that not all such scorers may be included in embodiments of the invention and, in fact, that other scorers known in the art providing other measures of the quality of the acquired frames and faces depicted therein may be included instead or in addition. For example, some embodiments utilize, in addition to the liveness scorer 25, only pose and size detectors, since they can in some instances be sufficient for adequate frame selection, and eschew blur detection, again, all by way of example.

The scores generated by the scorers 18-25 are indicative of characteristics of respective frames of the respective streams and/or, more particularly, of the video image or depth image, as the case may be, of the candidate individual's face depicted in those images.

To speed and focus operation of the scorers 18-25, region selector 14 is employed in the video stream pathway from camera 12, as shown. In this optional step, the selector 14 crops the incoming frames, limiting the portions on which the scorers 18-25 operate to an area of interest (e.g., that of an individual in a designated area near the access point) in the camera 12 field of view, which can be determined empirically or otherwise, e.g., during system setup. This has the benefit of eliminating from the frames faces or other elements that may slow operation of the scorers 18-25, in addition to facilitating identifying images of the candidate individual. To this end, it will be appreciated that the scoring of frames by elements 18-25 in the discussion that follows amounts to the scoring of regions of interest within those frames and, in practice, to the scoring of the quality of the image of a candidate individuals face.

Face Scorer

To this end, face scorer 18 of the illustrated embodiment comprises a conventional face detector of the type commercially available in the marketplace and/or otherwise known in the art, as adapted in accord with the teachings hereof. The scorer 18 of the illustrated embodiment—which may be, for example, an MTCNN face detector—generates a score indicative of a number of individuals in the frame or a region thereof (hereinafter, for simplicity, a "frame"). In other embodiments, the score may be a value indicating whether one (and only one) individual is imaged in the frame, or otherwise.

Size Scorer

Illustrated size scorer 20 can, likewise, comprise a conventional face detector of the type commercially available in the marketplace and/or otherwise known in the art, as adapted in accord with the teachings hereof. The scorer 20 of the illustrated embodiment (which, too, may be an MTCNN face detector, or otherwise) generates a score indicative of a measure or other characteristic of a face (presumably, for example, that of the candidate individual) in the frame. This is preferably, for example, an interocular distance, though it can be a face width and height, or otherwise. And, though that score can reflect such dimension (or dimensions) in pixels or otherwise, in some embodiments, it is a closeness of that/those dimension(s) to the maximal effectiveness range of the recognizer 26. Such a range can be determined empirically, e.g., through testing of sample images, or otherwise, as is within the ken of those skilled in the art in view of the teachings hereof.

If multiple faces are imaged in the frame (e.g., the candidate individual and others), element 20 can generate as the score an array, linked list or other collection reflecting the dimension(s) of each respective face in the image (along with an ID of that face, e.g., returned by the face detector that makes up the scorer 20 or otherwise) for use by the frame selector 16 and/or recognizer 26 in discriminating among face(s) in the image to be analyzed and those to be ignored (e.g., as representing persons distant from the camera 12).

Pose Scorer

Pose scorer 22 can, likewise, comprise a conventional face detector of the type commercially available in the marketplace and/or otherwise known in the art, as adapted in accord with the teachings hereof. It generates a score indicative of the pose of the head of the individual (presumably, for example, that of the candidate individual) in the frame. In the illustrated embodiment, that score can comprise the angle of the head in each of three dimensions, e.g., as determined from the relative positions of facial landmarks returned by the face detector that makes up the scorer 22 or otherwise. In other embodiments, the score is based on yaw and pitch for people looking down or looking to the side and ranges from 0.7 to 1.0, rather than 0.0 to 1.0

Alternatively, or in addition, the scorer 22 can comprise an enumeration (e.g., "acceptable," "poor," or otherwise, by way of non-limiting example) based on ranges of such angles that are suitable for face recognition by recognizer 26, or otherwise. In this latter regard, it will be appreciated that facial recognition algorithms are typically more effective with a person looking straight at the camera and, often, drop off steeply in effectiveness with faces in full profile, rather than fully frontal.

If multiple faces are imaged in the frame, element 22 can generate as the score an array, linked list or other collection reflecting the pose of each respective face in the image (along with an ID of that face, e.g., returned by the face detector that makes up the scorer 22 or otherwise) for use by the frame selector 16 and/or recognizer 26 in discriminating among face(s) in the image to be analyzed and/or those to be ignored.

Blur Scorer

Illustrated blur scorer 24 comprises conventional such functionality of such type known in the art suitable for generating a measure or other characterization of blur in an image. Scorer 24 of the illustrate embodiment generates that measure as the sum squares of a Laplacian digital filter computed across the face (presumably of the candidate individual) shown in the image and/or across the image itself. Other embodiments may use other measures of blur, instead or in addition. For example, in some embodiments the blur score ranges from zero to one. Regardless, the score generated by element 24 may be the absolute measure generated as a result of the aforesaid techniques or an enumeration based thereon (e.g., "acceptable", "poor", or otherwise, by way of non-limiting example) based on the degree of image clarity required for operation of recognizer 26.

Liveness Scorer

Figure 6:
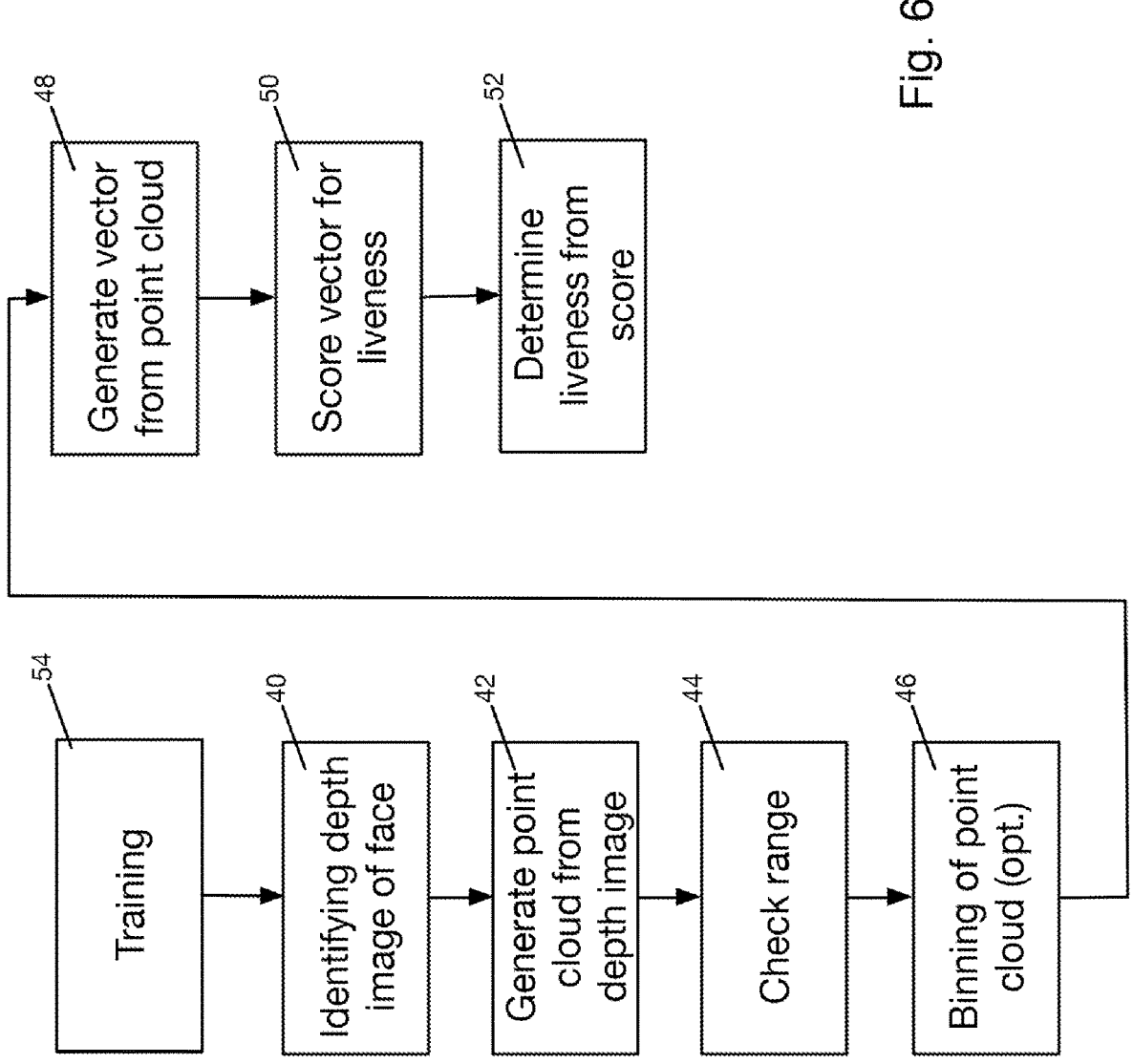
FIG. 6 depicts a method of liveness scoring in the system according of FIG. 5.

Illustrated liveness scorer 25 determines if a face imaged by camera 12 is that of a person who is present before the camera and is not a spoof, e.g., a still picture or a video image replayed on a tablet computer or smart phone. Scorer 25 makes that determination and generates a corresponding liveness score by executing the methodology shown in FIG. 6 and described below. The methodology can be practiced on every depth image generated by camera 12, e.g., in connection with Step (5B), above; though, in some embodiments, it is practiced in connection with Step (5F), e.g., once a face in a video stream captured by camera 12 has been recognized as a match against database 26A or other store of images. Regardless, in the discussion that follows, a depth frame currently being processed is referred to as the "current" frame. And, although in the illustrated embodiment, the methodology below is practiced on a single depth image at a time, the current frame can be a composite of multiple such images (e.g., suitably registered for facial alignment), the fabrication of which composite is within the ken of those skilled in the art.

Identifying Depth Images of Faces

In step 40, the scorer 25 identifies, within the current depth frame, respective regions (or "crops") that include each face of actual or potential interest, along with a margin typically of 0%-25%, depending on the embodiment, that includes some background, e.g., in juxtaposition with edges of the face. This can be accomplished, for example, (i) applying a face detector (e.g., of the type commercially available in the marketplace and/or otherwise known in the art, as adapted in accord with the teachings hereof) to the "depth" pixels in the depth frame to locate each such face (or head), (ii) mapping to the depth frame a face recognized by the controller in the corresponding video frame (e.g., in Step (5F)), or (iii) effecting either (i) or (ii) in connection with a tracker, e.g., based on Kalman filters and predicted rectangle overlaps, or otherwise of the type commercially available in the marketplace and/or known in the art (as adapted in accord with the teachings hereof), to track a face of actual or potential interest across multiple frames, e.g., until a robust depth image of it appears among the frames and the respective region or crop within which it lies is identified.

Operation of the scorer 25 in this latter regard is advantageous in that it obviates a requirement that the depth images be acquired under ideal conditions (e.g., so that faces within them are represented at high signal-to-noise ratios) and/or that the camera 12 be of particularly high quality. Rather, since the depth images of most practical applications are likely to be noisy, embodiments operating in this regard can take advantage of many depth frames to improve scoring of a single such frame. Moreover, it is not necessary for the face detector to analyze the current depth frame in entirety to distinguish from background.

Other techniques for identifying respective regions or crops of faces ("depth images of faces") within the current depth frame are within the ken of those skilled in the art in view of the teachings hereof. The discussion that follows addresses scoring the liveness of the face within one of those regions or crops, hereinafter sometimes referred to as the "depth image of a face" a "face depth image," or the like. References to scoring the liveness of the current frame will likewise be understood to mean scoring the depth image of a face, unless otherwise evident in context.

Converting a Depth Image of Face to Point Cloud

In step 42, the scorer 25 generates a point cloud from the face depth image—that is, a dataset of 3-vectors, i.e., x, y, and z values, representing locations of points on the surface of the face relative, e.g., to the camera 12. In some embodiments, the dataset comprises 4-vectors which, in addition to representing the x, y, and z coordinates of the surface points, represent their infrared (or heat) intensity. That additional data can facilitate identifying spoofs involving statues or other 3-D models, as well as those where one person tries to substitute from another by wearing a mask.

Generation of a point-cloud from the face depth image can be accomplished in any conventional manner known in the art as adapted in accord with the teachings hereof. Thus, for example, horizontal (x) and vertical (y) coordinates of each point in the point cloud can be computed from pixel coordinates in the face depth image using the intrinsic parameters of the camera 12, such as, for example, the focal length. One simple way to do the conversion is using the pinhole model of a camera. For example, the horizontal distance becomes the distance from the center of the camera 12 in pixels, divided by the focal length multiplied by the depth. Other techniques of determining the x- and y-coordinates corresponding to pixels in the face depth image are within the ken of those skilled in the art in view of the teachings hereof. The z-coordinates for those respective pixels are provided in the depth image itself, e.g., as values of those pixels. They can be stored directly to the point cloud along with the x- and y-coordinates of the corresponding pixels, as can infrared (or heat) intensity values for those pixels, if so provided in the depth stream.

Range Checking

In step 44, the scorer 25 determines the depth range of the point cloud—that is, whether a sufficient number of the points in it are within the working range of the camera 12. In this regard, those skilled in the art will appreciate that the depth sensor 12b of the camera 12 typically has an operational range within which it can capture viable depth measurements: it won't work well if a face being imaged by the camera 12 is too close or too far from the camera. Different depth sensors fail in different ways. For example, sensors 12b in the nature of Apple's TrueDepth camera return noise-like depth data, missing data, or data of near constant depth, for imaged points that are too far from the camera. It returns no depth data at all for points that are too close. And, in the case of sunlight, it often has missing data.

In step 44, the range checker iterates through the point cloud to generate a statistical or other measure of the depth ranges of points in it. This can be, by way of non-limiting example, a mean, a mean and standard deviation, or other such measure of depths in the point cloud. In some embodiments, that measure contributes to the overall score of liveness generated by the scorer 25. It can, instead or in addition, govern whether liveness processing of the depth frame currently being processed will continue at all; for example, the scorer 25 can cease processing on point clouds with little or no viable depth data.

Implementation of range checking, in step 44, can be done in a variety of ways. For example, depending on the properties of the sensor 12b, the scorer 25 can count the number of points in the depth cloud for which there is no data—e.g., indicating that the face being imaged was too close. Conversely, or in addition, it can check if the face was too far by taking an average of depth values within the current depth frame sans margins around the crop that represent background. Utilization of such counts and/or averages in generating a statistical or other measure of liveness is within the ken of those skilled in the art in view of the teachings hereof.

In another method, the scorer 25 uses information from the video frame corresponding to the current depth frame to gauge the interocular distance (that is, eye-to-eye distance) of the face and compares that distance with expectations in view of the distances represented in the point cloud. For a spoof, the interocular distance may cause an incorrect computation of the distance. For example, a picture of a face on a mobile phone screen held closely to the camera 12 may appear to the RGB camera to be the correct size, but is actually much smaller than the face itself. In such a case, the interocular distances in the video frame would be small in comparison to what would be expected of an actual face that close to the camera 12. Utilization of such distances in generating a statistical or other measure of liveness is within the ken of those skilled in the art in view of the teachings hereof.

As those skilled in the art will appreciate, the depth sensor 12b and image sensor 12c of camera 12 typically are of different operational ranges: often face recognition from the video stream generated by sensor 12c can be done further back from the camera 12; whereas liveness detection from the depth stream generated by sensor 12b is typically done closer. For this reason, the illustrated embodiment does not utilize the liveness score generated by element 25 as a gating function for face recognition; though, other embodiments may vary in this regard.

Binning the Point Cloud

In step 46, the scorer 25 bins the point cloud. This step, which is optional, has the benefit of reducing the number of points processed in subsequent steps of the method of scorer 25 and, therefore, can reduce processor and other resource consumption required by them—as well as the time required to execute those steps. The degree of binning and determination of whether it is done at all is within the ken of those skilled in the art, typically, as a function of the requirements and capabilities of any given implementation.

Binning of the point cloud can be done in any manner known in the art, e.g., by forming a 3D voxel grid with a predefined voxel size, assigning each point in the point cloud to a respective voxel based on proximity, and averaging the depth (and, if present, the intensity) values of all points assigned to a given voxel. Other techniques for binning may be used instead and/or in addition.

The resulting voxel grid can be substituted for the point cloud in the discussion of subsequent processing steps that follows.

Processing the Point Cloud

In steps 48-50, the scorer 25 processes the point cloud to determine the liveness of the face shown in the current depth frame and, in step 52, determines whether or not that face is a spoof.

In some embodiments, the methodology below is applied not to the entirety of the current depth frame but, rather, to one or more (potentially overlapping) regions of that frame, e.g., representing regions around the eyes, regions around the lips, quadrants of the face or otherwise, all as is within the ken of those skilled in the art in view of the teachings hereof. An advantage of this approach is that it permits the methodology to be applied to regions of the face which tend to more aptly characterize liveness (e.g., depth variations in the region of the eyes and lips, for example). In order to achieve adequate alignment for such an approach, embodiments can use a similarity transform (a scale and a translation) using the visible image, and the landmark of the centers of the eyes, corners of the mouth and the nose. Moreover, during training of the boosting or other machine learning algorithm (as discussed below), small variations of pose can be added to prevent alignment errors from skewing the score generated in step 50 and leading to false rejections in step 52.

In step 48, the scorer 25 converts the point cloud into a vector that is based on geometric characteristics of neighborhoods of points in the point cloud- and, in some embodiments (e.g., as illustrated and discussed elsewhere herein), of geometric characteristics of eigenvalues of neighborhoods of points in the point cloud. The geometric characteristics utilized in the illustrated embodiment are sphericity, linearity, planarity, and local surface variation; though, other embodiments may use a greater or lesser number of such geometric characteristics and may use other geometric characteristics of the eigenvalues instead or in addition.

Each neighborhood includes a point in the point cloud and the N points nearest (in distance) thereto in that cloud. In the illustrated embodiment the neighborhood of points surrounding each point in the cloud can be used for this purpose, though, other embodiments may vary in this regard (e.g., using every other point, every third point, and so on, and/or basing the determination of on the value of N, discussed below). Nearness can be computed in the conventional Euclidean sense (e.g., as the square root of the sum of the squares of differences in the respective x-, y- and z-coordinates), or otherwise, as is within the ken of those skilled in the art in view of the teachings hereof. N, which can range from 8-32, or more (or less), is dependent on implementation and/or on the number of points within the point cloud being processed in step 48 and on the speed-wise and resource-wise requirements and capabilities of any given implementation. Thus, for example, in one embodiment, N is selected so that neighborhoods include points within one (1) millimeter of one another.

From each neighborhood, scorer 25 of the illustrated embodiment generates an N×3 array, where N is defined as above and "3" refers to the x-, y- and z-coordinates of the respective points in the neighborhood. The scorer then determines the eigenvalues of the covariance matrix of the N×3 array and sorts those eigenvalues largest to smaller. In the discussion herein, those eigenvalues are represented by $\lambda 1$, $\lambda 2$, $\lambda 3$ where $\lambda 1 > \lambda 2 > \lambda 3$. The scorer 25 of the illustrated embodiment computes from those eigenvalues the following four geometric characteristics (though, as noted above, other embodiments may compute and/or utilize a greater or lesser number of geometric characteristics, instead or in addition, all as is within the ken of those skilled in the art in view of the teachings hereof:

Sphericity=$\lambda 3/\lambda 1$

Linearity=$(\lambda 1-\lambda 2)/\lambda 1$

Planarity=$(\lambda 2-\lambda 3)/\lambda 1$.

Local surface variation=$\lambda 3/(\lambda 1+\lambda 2+\lambda 3)$

The scorer 25 generates a histogram from the geometric characteristics computed from the of the neighborhoods. Thus, for example, a histogram is generated from all of the sphericity values, a histogram is generated from all of the linearity values, and so forth. Binning for the histogram can be set at sixteen (16) or such other value as might be selected by those skilled in the art in view of the teachings hereof, with each bin representing a respective range of values for the respective geometric characteristic, the bins being of equal delta (i.e., difference between high and low values defining the respective range), and representing a number of neighborhoods whose respective geometric characteristic falls within that respective range; though, in other embodiments, such a histogram might be constructed differently (e.g., with unequal deltas or otherwise), all as is within the ken of those skilled in the art in view of the teachings hereof.

The scorer then generates a vector by concatenating histograms and, more precisely, by concatenating the counts in each of the bins of one histogram (e.g., for sphericity), with the counts in each of the bins of another histogram (e.g., for linearity), and so forth. In an embodiment of the type illustrated here, in which four geometric characteristics are computed for each neighborhood and in which the histograms have 16 bins each, the resulting vector has 64 elements (16×4), though, other embodiments may vary in this regard. As those skilled in the art will appreciate, that vector is based on geometric characteristics of eigenvalues of point-wise neighborhoods within the point cloud (as discussed above) and, thereby, characterizes accordingly the current depth frame and surface contours of the face represented therein. The vector essentially becomes a measure of how that surface varies and, thereby, permits it to be distinguished from depth images of faces shown on paper or a digital display.

The aforesaid vector can include additional elements, as well. For example, in embodiments in which the point cloud contains intensity values for each point (in addition to depth values), the scorer 25 in step 48 appends to each vector generated as described above counts from bins of a histogram generated by binning those intensity values (or, alternatively, for example, intensity variation values). This has the advantage of making the vector not only characterize surface contours of the face represented in the current depth frame but, also, warm and cool regions of that image—thereby allowing the system 10 to distinguish persons wearing masks or 3d-printed heads.

And, by way of further example, in the illustrated embodiment, a vector generated based on geometric characteristics of eigenvalues of neighborhoods within the point cloud as described above can have prepended or appended to it a value representing a number of points in the original point cloud (e.g., as determined in step 42) and a value represent a number of points following binning step 46. Other embodiments may vary in these regards. These may also include measurements of local point density, residuals of fits of surfaces to local neighborhoods, and coefficients or parameters of fits to local neighborhoods.

In other embodiments, the point cloud can be processed by means of a neural network. For example, if the point cloud is N×3 array, each entry N can be processed by a multilayer perceptron (MLP), consisting of L layers, resulting in an N×M array, where M is the number of outputs in the perceptron which can be determined through experimentation as is within the ken of those skilled in the art. The input to the perceptron is the N×3 array of points in the 3 dimensional Euclidean coordinates. A normalization scheme may be employed on the array, such as normalizing the array to have zero mean and unit standard deviation. Because the points are unordered, a symmetric function, one that does not depend on order, is used to reduce this N×M array to a 1×M array. Symmetric functions included the sum function and the maximum function. This method converts the variable size unordered set of points to a fixed length array of size M. The array of size M can then be processed most easily by means of another multiplayer perceptron. Other learning methods (e.g. support vector machine, etc.) within the ken of those skilled in the art can be used to predict the probability of spoof. Both the eigenvalue-based method and the multilayer perceptron based on individual points in the point cloud have the advantage that they handle missing data in the depth sensor straightforwardly. In each of these cases, if data is not available, it simply is not processed. Compared to the approach described using a machine learning classifier (such as SVMs, Boosting, decision trees) trained on the hand-crafted features, this neural network approach requires vastly more training data).

In step 50, the scorer 25 generates a liveness score by applying a vector generated in step 48 to a boosting algorithm (or other machine learning algorithm within the ken of those skilled in the art in view of the teachings hereof, e.g., a support vector machine, a perceptron or otherwise, alone or in combination with a boosting algorithm) trained as described below. In some embodiments, that score is the final output of the scorer 25 and is utilized by the controller 28, e.g., in combination with output of the recognizer 26 (as described below) to determine whether a matched face is of sufficient liveness to be accepted as an image of a face of a recognized person—as opposed to a spoof of such person.

In other embodiments, the data acquired from the depth sensor can be processed as a two-dimensional array, of size W×H by means of a convolutional neural network, with each entry in the W×H array measuring depth, or a W×H×2 array measuring depth and intensity, thus not performing steps 42, 44 and 46. This approach then is essentially like the use of a convolutional neural network to process RGB frames from a camera.

In this representation, missing data from the depth sensor, which can be caused by multiple reasons including excessive sunlight, must be represented by a special value such as 0 or −1. This method has the drawback that the features computed by the convolutional neural network would then be affected by this special value. In contrast, in the point cloud representation, missing values from the depth sensor are discarded and do not appear in the point cloud.

Convolutional neural networks are neither depth-nor translation-invariant. By contrast, adequately designed features on point clouds can encode both translation and rotation invariance.

Compared to machine learning classifiers (such as SVMs, Boosting, decision trees) trained on hand-crafted features, neural networks require vastly more training data). Compared to the approach described using a machine learning classifier trained on the hand-crafted features, or a multilayer perceptron based on local neighborhoods, this neural network approach requires vastly more training data).

In other embodiments, the scorer outputs an "accept" or "reject" signal. See step 52. This depends on whether the score generated by the boosting algorithm (or other machine learning tool) is above a threshold that may be determined empirically or otherwise. In the illustrated embodiment, that threshold is to optimize a utility function, e.g., by allowing a small number of spoofs in exchange for not rejecting actual people.

Since depth sensors 12b tend to be noisy, using more depth frames decreases the likelihood of error in our liveness scoring and spoof detection. To that end, the scorer 25 of some embodiments performs steps 40-52 on at least several, e.g., five (5), depth frames, before generating an accept/reject signal—or, in embodiments where the scorer 25 output is generated in step 50 (not 52), that output is an average (computed with or without outlier values) and, preferably, a weighted average, of the scores generated in step 50 for those several depth frames.

Those skilled in the art will appreciate that other statistical measures of the multiple scores can be used instead or in addition. The weighting can be based on a quality of the respective score, e.g., the number of points in the original point cloud from which the score was generated, the depth of range of that point cloud and/or other factors within the ken of those skilled in the art in view of the teachings hereof. Although the collection and treatment of liveness scores from multiple depth frames is attributed above to the scorer 25, in some embodiments, decisions regarding whether to accept or reject the liveness of a depth stream and/or to compute averages or other measures of multiple liveness scores generated from such a stream falls within the province of the controller 28, discussed below.

The aforesaid boosting (or other machine vision learning) algorithm can be trained, e.g., in step 54 that precedes, in time, run-time operation of steps 40-52, in the conventional manner known in the art as adapted in accord with the teachings hereof. Thus, for example, training vectors generated as described in connection with step 48 from training depth (and video) frames obtained under known circumstances—that include both instances of legitimate persons presenting themselves before the camera 12 and spoofs of same and that include a multitude of acquisition conditions, including motion, variations in depth, lighting, etc.—can be applied in supervised fashion to the algorithm-in-training, with one fraction of those vectors used for training and the other for testing, all as per convention in the art as adapted in accord with the teachings hereof.

In embodiments that employ only a liveness scorer 25 and none of the other scorers 18-24, training can proceed as described above, albeit, with depth frames acquired by imaging each person approved for access, to be prevented from access or otherwise. In these embodiments, the depth frames and their processing in accord with steps 40-52 provides for both liveness detection and face recognition—that is, the liveness score represents not only that (i.e., the liveness of the face shown in the current depth frame) but, also, whether the face matches that of a known individual. Moreover, faces represented in the frames of the depth stream can be tracked across multiple frames, all as is within the ken of those skilled in the art in view of the teachings hereof.

Other Scorers

In addition to the scorers discussed above, embodiments of the invention can utilize a scorer that returns a measure of specularity of lights on faces in the video face, ranging from 0.0 to 1.0. Still other embodiments may use additional scorers within the ken of those skilled in the art in view of the teachings hereof. This may be instead of or in addition to those discussed above.

Frame Selector

In some embodiments, once scored by elements 18-24, frame selector 16 winnows frames received from the RGBD camera 12 so that only a subset are invoked for processing by face recognizer 26 and for liveness scoring, which can be more computationally-intensive steps. To that end, selector 16 selects a subset of the frames generated by camera 12 for application to and matching by face recognizer 26 and, then, to scorer 25. See Steps I and (F). In the illustrated embodiment, such winnowing/selection is based on the scores of each respective frame generated by scorers 18-24. In other embodiments, liveness scorer 25 operates in parallel with scorers 18-24 and their combined outputs are weighed together by selector 16 in determining frame selection, e.g., for application to recognizer 26.

Throughout the discussion in this section, the term "frame" refers to a corresponding pair of image and depth frames generated by camera 12, unless otherwise evident in context. Of course, in embodiments that utilize only image frames, the term "frame" refers to those. Thus, for example, the selection of a video frame by selector 16 based on scores generated by (video) scorers 18-24 contemplates selection of the corresponding depth frame for subsequent processing by scorer 25.

Illustrated frame selector 16 generates, from the individual face, size, pose, blur and/or liveness scores generated in step (B), a composite score for each of the frames for which those scores were generated and, based on those composite scores, selects the corresponding frame for processing by the face recognizer 26 (and, in some embodiments, liveness scorer 25). In embodiments in which multiple such scores are generated in step (B), the composite score can be the multiplicative product of the individual scores for that frame. In embodiments in which only one such score (e.g., a liveness score) is generated for a frame, that score is the composite score. In other embodiments, the composite score can be computed by binning each individual score, assigning values to the respective bins, summing or multiplying those values, and normalizing the result. In still other embodiments, other methods of compositing the individual frame scores can be used (ignoring the blur score, for example), all as is within the ken of those skilled in the art in view of the teachings hereof. As discussed below and otherwise evident to those skilled in the art in view of the teachings hereof, the composite score can be used to determine messaging (if any) to the individual/candidate, e.g., requesting that he/she reposition himself/herself, etc., to permit better image acquisition and recognition.

Frame selector 16 selects frames until a suitable plurality of them, M, having a threshold minimum composite score of k1 are identified in the illustrated embodiment, M has a value of seven, although, other embodiments may vary in this regard. In some embodiments, if a count, N (e.g., three or such other number as is implementation dependent), of the frames exceed a second, higher threshold, k2, the frame selector 16 can also deem a suitable number of frames to have been acquired, where k1>k2 and N<M.

In practice, achieving such a suitable plurality can sometimes take too long given the operational constraints placed on the implementation, the patience of the candidate individuals, and so forth. Accordingly, in some embodiments, the frame selector 16 applies the designated number of frames to the face recognizer 26 for recognition, e.g., if a watchdog or other timer (not shown) reflects that a designated time interval (e.g., 1 second, in the illustrated embodiment, although some embodiments may vary in this regard) has passed since the candidate user has presented him/herself for recognition—even if not all of those frames achieve the threshold minimum composite score. In such instances, the frame selector 16 can signal controller 28 of the shortcoming so that it may message display 32 or otherwise.

When the composite scores of the frames are too low, the controller 28 can also send messages to a display 30—which, too, can be an LED, LCD or other display of the type commercially available in the marketplace or otherwise known in the art—directing the candidate individual to take an action that will improve the scores of newly acquired frames. See step (G). To this end, the controller 28 can, for example, message the candidate individual via display 30 to adjust their position so that they appear bigger to the camera, to modify the pose of their head, to separate him/herself from other individuals, to remove sunglasses, caps, scarves or other accessories tending to obstruct facial imaging. Such messaging can be explicit, e.g., the display of a textual message, or implicit, e.g., blinking a dot on the screen near the camera, generating an arrow on the screen pointing to the camera, and so forth.

The thresholds k1 and k2 can be determined empirically or otherwise in view of the specifics of the implementation, and can be pre-set (e.g., at the time of installation) and, optionally, adjusted by an operator on a periodic, sporadic or other basis, if at all. In the illustrated embodiment, in which the scores generated in step (B) are each between zero and one, an exemplary value for k1 can be 0.7 and an exemplary value of k2 can be 0.9, though, other embodiments may vary in these regards. Those skilled in the art will appreciate that still more (or less) than two thresholds can be employed as, more generally, can other mappings from composite score to number of frames. Such mappings can be determined empirically by analyzing many images or access attempts performed on a test system, or other means within the ken of those skilled in the art.

In some embodiments, k1 and/or k2 are adjusted in real-time by the controller 28 based, e.g., on feedback from an operator rejecting faces that the system 10 has approved for access, on equipment or environmental conditions resulting in excessively long delays in identifying selectable frames, and so forth, all as within the ken of those skilled in the art in view of the teachings hereof.

Face Recognition

In embodiments in which face recognition is not performed by scorer 25, face recognizer 26 matches faces in the video frames selected by selector 16 against a local KP database 26A or other store of images (collectively, referred to, here, without loss of generality as a "database") of designated individuals. These may be individuals approved for access, individuals to be prevented from access, or otherwise. A preferred such recognizer 26 comprises a video processing pipeline that detects faces in the selected video frames and generates distances or other such scores indicative of matches with entries in the local KP database 26A. And, though simply referred to as a "recognizer" in FIG. 5 and the accompanying text hereof, element 26 uses detection, tracking, normalization/preprocessing and matcher/recognizer functionality of the type described above, e.g., in connection with the Detector D, Tracker E, Normalizer/Preprocessor F, and Matcher/Recognizer G of FIGS. 1-4. In other embodiments, the recognizer 26 may be of any variety of technologies commercially available in the marketplace or otherwise known in the art, as adapted in accord with the teachings hereof, that can perform such matching, e.g., by using a convolutional neural network to convert each facial image to a vector, and comparing those vectors using a distance such as a cosine distance, or by other techniques within the ken of those skilled in the art as adapted in accord with the teachings hereof.

Referring to step I, recognizer 26 of the illustrated embodiment outputs those distances to controller 28, labeled, here, "match." Vectors that are closer than a distance threshold are a match. If a face from a frame matches multiple images from the database 26A, it can either be discarded, or the closer vector can be selected. As there are multiple images, more advanced matching algorithms can be used that utilize lower distance (or other matching) thresholds, such as taught herein, e.g., in the section entitled "Using the Tracker (FIG. 1 E) to optimize the Recognizer (FIG. 1 G)" and in the accompanying drawings.

Controller

Depending on the match scores and, specifically, whether they are above a distance threshold (or "low water mark") value that can be set empirically or otherwise by an operator, by automated operation of the controller 28 or otherwise, the controller 28 can actuate the security mechanism 34 as per convention in the art as adapted in accord with the teachings hereof. See Step (F). It can also send a message to the display 32—which can be an LED, LCD or other display of the type commercially available in the marketplace or otherwise known in the art—signaling a security guard or other operator that access was accepted or rejected, again as per convention in the art as adapted in accord with the teachings hereof. As noted above, Step (F) can include invoking the liveness scorer, e.g., once a face in a video stream captured by camera 12 has been recognized as a match against database 26A or other store of images.

The controller 28 of the illustrated embodiment returns results with a low error rate, when the composite scores for the frames applied to the recognizer 26 are above the threshold minimum composite score, k1. In instances (of the type described previously) when those composite scores are lower than that composite score threshold, the controller 28 may adjust the distance threshold (or low water mark minimum) so that positive matches are nearly always correct, though, negative matches can be suspect. In this circumstance, the controller 28 can message RGBD camera 12 to acquire more frames—though, in many embodiments, the camera, region selector, and scorers continue to run while the recognizer 26 is processing data so that if more frames are needed, they may be already collected.

A preferred controller 28 is implemented as a state machine, switching between several states as indicated, by way of non-limiting example along with respective state transitions, below:

1. Idle: Looking for the next face; waiting for a candidate to apply for access.
2. Tracking: Tracking a candidate in a region of interest near the access control point, but not yet submitted to the Recognizer
3. Identification In Progress: Selected Frames (16) from the frame selector have been submitted to the Recognizer (26). More frames are being collected to submit to the Recognizer if needed.
4. Waiting for tracking to end: The candidate has been rejected; waiting for them to leave the region of interest.
5. Waiting for Access Control (AC) Zone Cleared: The candidate has been accepted; waiting for them to leave the region of interest.

State Transitions:
(a) From Idle to Tracking: Detecting a new face in a selected frame, indicating a new candidate in the region of interest, and the face is not too large (See next transition).
(b) From Idle to Identification In Progress: Detecting a new face in a selected frame, indicating a new candidate, and detecting conditions for making final submission, e.g. the face is so large to indicate it is close to the access control point and thus a response is due quickly.
I From Tracking to Idle: The candidate has not been seen for sufficient number of frames to be considered lost, and not enough frames were collected for an initial submission of faces to the Recognizer (26).

(d) From Tracking to Identification In Progress: Detecting a face in a selected frame from an existing candidate, and either the (i) the composite score of the frames has stopped going up over a sufficient number of frames (5 is a reasonable number) or (ii) the timer expired or (iii) the face is large indicating it is close to the access control point and thus a response is due quickly.
I From Tracking and from Identification In Progress to Waiting For Tracking End Receiving Access Denied event from the Recognizer.
(f) From Tracking and from Identification In Progress to Waiting For Zone Cleared: Receiving Access Granted from the Recognizer.
(g) From Waiting For Tracking End to Idle: The face, and therefore the candidate, is not seen for a sufficient number of frames to be considered lost.
(h) From Waiting For Zone Cleared to Idle: The face, and therefore the candidate, is not seen for a sufficient number of frames to be considered lost. Or, the candidate's face is so large as to be close enough to the access control point to be able to be ignored.

In addition to tracking and transitioning the states, the controller 28 controls operation of the system 10 in stopping or continuing to request more frames as follows:
(i) If sufficient number of frames (N, M) have been collected of the appropriate qualities (k1,k2), Grant Access if appropriate. If not, if the quality scores are still improving or the distances from the recognizer are decreasing, and the timer has not timed out, request more frames.
(ii) If the distances found are so high/row that a match is highly unlikely with sufficient number of frames, Deny Access/Grant Access immediately.
(iii) If a timer expires, and the distances currently found are too low, Deny Access.

In some embodiments, the controller 28 uses the following methodology to control messaging to the displays 30, 32 and to decide whether to signal the frame selector 16 to obtain more image and/or depth frames from the scorers 18-25. This can be based on information provided by the scorers 18-24 via bus, network or other coupling (software or hardware), all as will be evident to those skilled in the art in view of the teachings hereof.

Controller Messaging:
If desirable to collect more frames, optionally show messaging on the display including:
Is the person too far?
If they are too far and not moving closer, show a message to move closer
Is the person too close?
Show a message to move farther back.
Is the person very blurry?
Tell the person to stand still.
Is the person looking to the side or up or down?
Tell the person to look at the camera Control of Frame Collection:
Collected at least N frames with minimum quality score above k2?
If yes:
If the composite scores aren't changing, done collecting frames.
If the composite scores are changing significantly
If out of time, done.
If not out of time, collect more frames.
If no, go to next step.

Otherwise: Collected at least M frames with a minimum quality score above k1?
  If yes, Are the frame quality scores improving:
    If yes:
      If not out of time, collect more frames.
      If out of time, done.
    If no:
      If the composite scores aren't changing, collecting frames is done.
      If the composite scores are changing significantly
        If out of time, done.
        If not out of time, collect more frames
  If did not collect at least M frames, go to the next step.
  Otherwise, at least M frames with a minimum quality score above k1 were not collected.
    If not out of time, collect more frames.
    If out of time, reject candidate access.
      Not enough good data was collected to verify the person, and that might be because of a spoof attempt (e.g., someone is shining a light on the sensor to try and break it.)

Controller 28 of the illustrated embodiment need not wait for the recognizer 26 to finish processing frames to put up a message on display 30. Instead, it can respond to scores received from scorers 18-25 to generate such messages. For example, if controller 28 receives a message from the scorer 18 indicating that there is more than one person in the region selected by selector 14, it can immediately generate a message via display 30 directing the candidate individual to separate himself from others. (In embodiments that permit group access, the results of the face scorer can be ignored in this regard, though, a standard, off-the-shelf tracker may be required as part of the scorer to group scores together for the same face and, in such instance, the recognizer 26 would attempt to recognize all people in the group and respond accordingly).

As noted above, the number of images collected by the frame-selector 16 can be varied under control of the controller 28. The first goal is to collect fewer frames, when possible, which minimizes the time required to access. The second goal is to collect more frames should it appear that more frames might succeed in creating a match.

In some embodiments, e.g., as discussed below, the controller 28 receives the output of the recognizer 26 for an initial (e.g., small) batch of frames, for example, only one or two frames. If the controller 28 determines there is a match, then liveness scorer 25 can be invoked and/or security mechanism 34 unlocked without waiting for further frames to be collected. If the controller 28 determines that after the initial batch of frames there is no match, more frames can be requested from the frame selector 16 to potentially achieve a match. There are numerous criteria for the controller 28 to stop requesting frames. By way of non-limiting example, those criteria include: when a match is found resulting in an acceptance, when the distances returned by the recognizer 26 are sufficiently extreme that they are unlikely to improve resulting in a rejection, when a certain number of frames is collected (e.g. 7), or when a certain amount of time has elapsed.

In some embodiments, a timer is employed to gauge the candidate's speed of approach to an access point. In such embodiments, it may be beneficial for the controller to stop requesting frames in order to insure that it can make the necessary computations to provide a result in time for the candidate, if approved, to enter the access point, e.g., without breaking stride. For this variation, by way of non-limiting example, the system 10 can estimate the candidate's distance from the access point (e.g., using interocular distance or head size or otherwise) and, potentially, speed of approach, and can cease requesting frames in time to decide whether to approve or reject the candidate just prior to his/her time of reaching the access point. Other mechanisms for determining when to cease acquiring frames can be used instead or in addition (e.g., calibrating the system empirically based on trial and error). An additional criterion for the controller 28 to stop requesting frames is based on the change over time of the scores from the scorers 18-25. If those scores have stopped increasing, then the distances from the recognizer 26 will generally also stop increasing. That is, if a match is not found by the controller 28 and the distance to a match is a sufficient far, and the scores from the scores 18-25 have stopped increasing, then a candidate individual can be rejected. Conversely, if the scores improve sufficiently within a certain amount of time, then the controller 28 may request more frames to see if a match is formed. Note that, as an optimization, the frame-selector may choose to ignore frames where scores from the scores 18-25 are insufficiently different from previous frames, so that only frames whose scores have increased sufficiently are processed. This type of selection yields computational savings.

The scores from the scorers capture the cause of the majority of the variations in the distances from the recognizer 26, but not all of those variations. The remaining variations can be treated as noise, which some distances being a bit smaller and some a bit larger. Using that information, an additional criterion for the controller 28 to stop requesting frames is based on the change over time of the distances from the recognizer 2). If the distances are large enough or small enough, the controller 28 can safely accept or reject. In an in-between range, the controller 28 can collect more images. The noisy distances can potentially yield a distance from the recognizer 26 that will yield a match.

In a slight variation, the frame selector 16 can accept all frames after an initial quality is met. By way of non-limiting example, the initial condition might be that the candidate individual is large enough in the frame, and the pose quality is high enough. The controller 28 receives the output of the recognizer. If the controller determines there is a match, then access may be granted via security mechanism 34. If the controller determines there is no match, rather than rejecting the individual, the controller controls the frame selector 16 and the recognizer 26 to process more frames. If the scores from the scores 18-25 do not improve after a certain number of frames, or a certain amount of time, the candidate individual is rejected.

In practice, a controller 28 uses multiple of the above criteria. By way of non-limiting example, if the scores from the scorers 18-24 are improving, or the distance from the recognizer 26 are becoming closer to a match, more frames may be collected.

In some embodiments, it was noted there are circumstances where using standard tracking algorithms to associate faces in frames to the same candidate individual. Tracking by tracking faces, typically done using face detection. It will be appreciated by those with skilled in the art that one can use other sorts of detectors, which without limitation includes a head detector, a body, or a body detector and a face detector together. A body detector may be particularly useful because a camera may not be able to see the face of a candidate individual at all times.

In many circumstances, the face recognition is completed before the liveness detector is completed. That may happen, for example, that the face recognition can use images farther away from the detector. But more generally, the requirements of face recognition and liveness are different. Here is an example of a controller that can be used after the recognition is complete, but the liveness detection is not. First, for messaging the user:

Controller Messaging after recognition is complete:

If more frames are needed, and the timer has not expired, we can optionally show messaging on the display including:

Does the person need to reposition? If so, message the person to reposition.

That includes but is not limited to: move closer, move farther away, move-left, move-right, move head down, move head up.

Is the person need to adjust their head pose (e.g. they are not looking at the camera), then message the person to adjust their pose.

Is the person very blurry? If so, tell the person to stand still.

Is the person in too much sunlight and data is being lost? If so, typically moving closer to the camera will improve the situation, and message the person to move closer to the camera.

Controller: Frame Collection (after Recognition is Complete):

The frame collection for liveness detection is nearly identical to the frame collection for facial recognition, though the counts of frames desired and the minimum quality scores are different:

Collected at least N frames with minimum quality score above k2, or at least M frames with a minimum quality score above k1?

If yes:

If the spoof scores aren't changing, done collecting frames.

If the spoof scores are changing significantly and run out of time, done.

If there is more time, collect more frames.

If no, go to next step.

If run out of time, reject access. (Not being able to obtain good quality data to verify the person is live, and that might be because of a spoof attempt (e.g., someone is shining a light on the sensor to try and break it.) In this case, the controller can message the use they may try again and fix the quality.

Updating Known Person Databases

Reliably performing face recognition can be challenging. One factor is that an individual can change over time. They may lose, or put on, weight which will change the appearance of their cheeks. They may age. They may grow a beard or switch to a new pair of glasses or add facial ornamentation, such as tattoos or jewelry such as nose rings. Another factor is that images initially acquired by a recognition system of an individual may not be of sufficient quality (e.g., due to lighting, blur, etc.) to permit accurate recognition.

These challenges are overcome by the systems and methods shown in FIGS. 1-7. In some embodiments, those systems include nodes that perform facial recognition on persons imaged by their respective camera(s) to permit or deny access to secured resources. Recognition is performed using images of faces of known persons (KP) stored in the central KP database. Each node maintains a local database with images, vectors or other representations downloaded from the central database for at least some of those facial images. If a node determines that an image acquired by it of a known individual is a candidate for inclusion in the central database based on the quality of the image and of a face depicted in it and on the similarity between that face and ones in the local database, it can upload it to the server for further consideration. The server can, in turn, determine whether a candidate image ought to, in fact, be placed in the central database, e.g., based on whether that image represents a "life change" in the respective known person, such as aging, weight gain/loss, changes or addition of eyewear, changes in facial hair, and so forth. If so, the central database is updated by way of addition of the candidate image and at least that portion of the database is redistributed to the nodes for use in further recognition activities.

Figure 7:
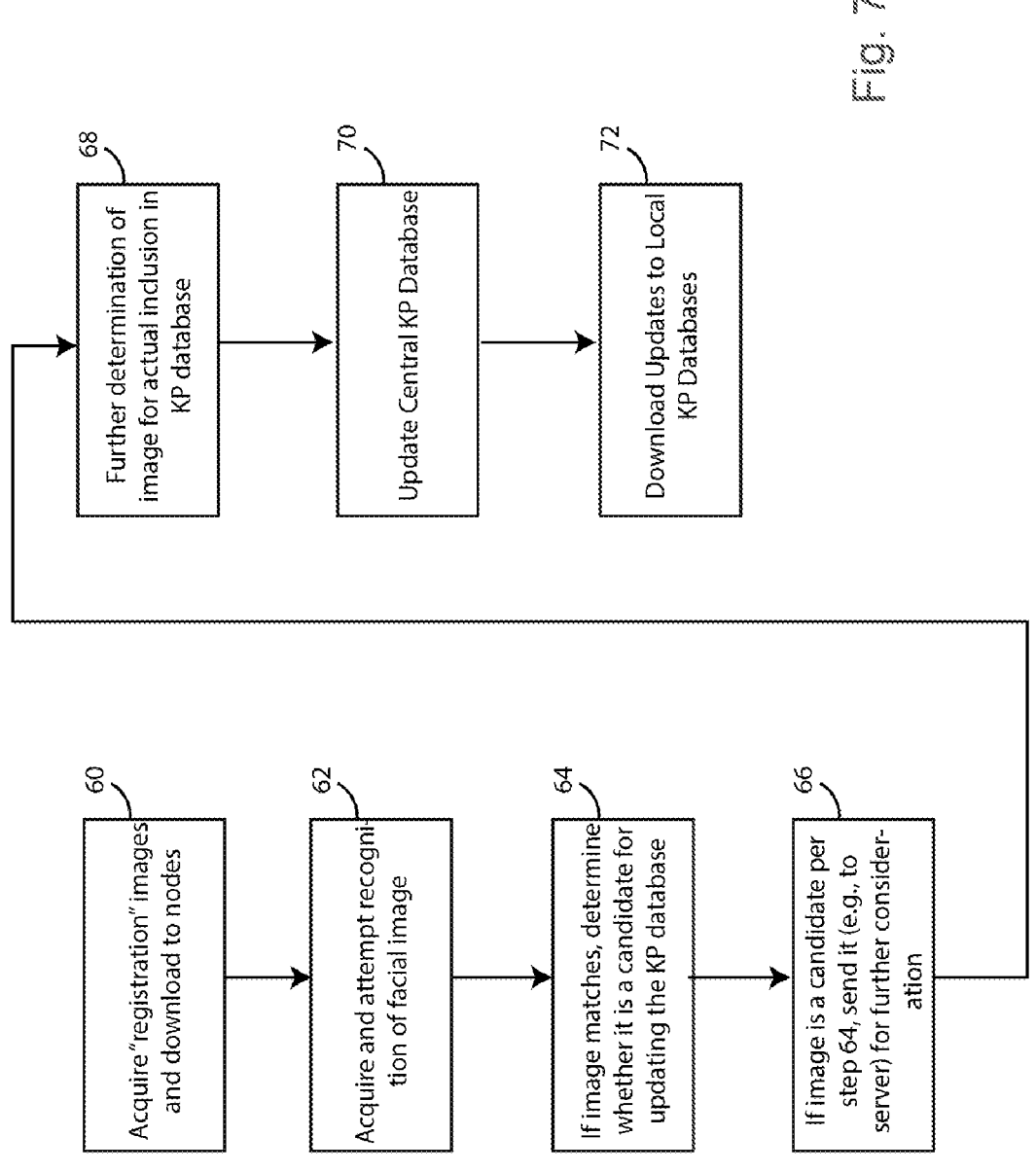
FIG. 7 depicts a method according to the invention of updating images for use in facial recognition.

Operation of the embodiments may be appreciated by reference to FIG. 7, which depicts a method of systems 5 (FIG. 1) and 10 (FIG. 5). Implementation of the steps shown in FIG. 7 and discussed below on digital data processors of ECDs C, server J and element 36 is within the ken of those skilled in the art in view of the teachings hereof.

Registration

In step 60, the central KP database N is loaded with initial (or "registration") images of individuals to be recognized at a later time, e.g., when they present themselves in the field of view of the camera B, 12 of a node A, 10, e.g., at an office tower, sports arena, entertainment spot, or other venue. These are referred to as "known persons," and the like, throughout this write-up. Loading of such images can be performed by server J and/or a node A, 10 that is in communications coupling with the server J and/or the central KP database itself, all is within the ken of those skilled in the art in view of the teachings hereof.

Acquisition of such registration-time (as opposed to run-time) images, which can be part of an employment hiring process, a sports or entertainment event ticketing process, or otherwise, is within the ken of those skilled in the art in view of the teachings hereof. During such "registration," one or more images of each individual's face is collected, e.g., by human resources personnel, venue ticket agents, and so forth, using image files uploaded by the individual to a website or other portal, still picture cameras, cell phone cameras and the like. The goal is to collect images of high quality in order to optimize face recognition that will subsequently be performed by the nodes A, 10. In some embodiments, metadata is collected and stored with each image, such as the date or quality or attributes of the image and/or the person depicted therein (e.g., age, locale, etc.). Quality metadata can include, for example, size, pose, blur and other scores determined at image capture or thereafter of the types discussed above in connection with elements 18-25, the generation of which scores is within the ken those skilled in the art in view of the teachings hereof.

In some embodiments, a node 10 of the type shown in FIG. 5 is employed for purposes of acquiring if not also scoring such images (whether acquired in real-time by camera 12 or submitted by the individual via an electronic "upload" or otherwise) at registration-time (albeit, without invoking its recognizer 26) and for purposes of generating and sending messages of the type discussed above in connection with step (G), e.g., directing the individual to adjust their position so that they appear bigger to the camera, to modify the pose of their head, to separate him/herself from other individuals, to remove sunglasses, caps, scarves or other accessories tending to obstruct facial imaging, when the when the scores of the acquired images are too low.

In these and/or other embodiments, encoding vectors or other representations of each image is stored to the central KP database and downloaded to the KP databases local to each node in addition to or in lieu of the image itself, e.g., as discussed above in connection with the functions served by server J.

Registration Image Proposal

At runtime, node A, 10 acquires and performs facial recognition on a runtime image of a candidate individual, e.g., as discussed above in connection with operation of FIGS. 1 and 5, above. See step 62. This includes generation of (i) cosine distances or other similarity measures as between the face of the candidate individual in the acquired image and those of the closest matches in the local KP database 26A and/or (ii) scores of the type generated by scorers 18-25 (or alternates thereto) during recognition. Such runtime acquisition and recognition can be triggered automatically, e.g., when the candidate individual comes into the field of view of a camera B, 12, upon invocation of a security guard, or otherwise, all as is within the ken of those skilled in the art in view of the teachings hereof. Depending on whether a match for that individual is found in the local KP database 26A, the security mechanisms 34 can be actuated and/or messaging generated by the node A, 10 and/or server J, as discussed above in connection with FIGS. 1 and 5.

Moreover, in instances where the candidate individual's facial image matches one in the local KP database 26A, e.g., as determined by controller 28 of FIG. 5 or Recognizer G of FIG. 1 and discussed above in connection therewith, that controller 28, MatchPublisher H or other functionality in the respective node A, 10 invokes registration image proposal software module 55 executing on the respective digital data processor to execute a step of determining whether that image is a potential candidate to update the matching individual's entries in the central KP database H and, if so, sending it to the server J for further consideration as such. See steps 64 and 66. Implementation of code for operation of the controller 28 and/or MatchPublisher H in this regard is within the ken of those skilled in the art in view of the teachings hereof.

In practice, because the node A, 10 typically acquires many images of a given face, this step has the effect of selecting a subset of those images (if any) to be evaluated, e.g., by server J, for actual inclusion in the central KP database. In some embodiments, it can be desirable to only select a subset of those images because transmitting potential update images from the node A, 10 to server J can be expensive in some embodiments, as can evaluating those images for actual inclusion in the central KP database, storing them to that database and downloading updates to the node(s) A for use in further facial recognition operations (step 62).

Quality Metrics

Determining whether an image acquired by a node A, 10 is a potential candidate to update the respective known person's entries in the central KP database H is, in the illustrated embodiment, based at least in part on the quality of the acquired image and the face depicted therein. By way of non-limiting example, factors used in the determination can include uniformity of lighting across the face shown in the image, scores for contrast, blur, intensity, pose (e.g., is the person looking straight forward and level at the camera), eyes open, distance between the eyes in pixels, percent of the face obstructed, the existence of face coverings, apparent distance from individual to the camera B, 12 that acquired the image, and signal to noise ratio in image. In the illustrated embodiment, the factors used in the determination correspond to those measured by scorers 18-25 (or their alternatives) used in nodes A, i.e., in connection with execution of step 62 or otherwise. The individual scores (or "metrics") may be used as such and/or they may be combined to form one or more composite metrics, e.g., by way of a sum, average, weighted average or otherwise, all as is within the ken of those skilled in the art in view of the teachings hereof. For example, each score can be scaled from 0 to 1, and all the metrics multiplied together, and a minimum threshold can be set for any particular metric. An image can be chosen as a potential candidate based on the individual and/or composite scores, e.g., determined as discussed above.

Conversely, the scores can be evaluated using a machine learning based quality metrics as is within the ken of those skilled in the art. For example, one can use machine learning and standard training mechanism to compute the expected cosine similarity between a face and it's central embedding. Even though the central embedding for a face may be unknown at evaluation time, the expected cosine similarity can be computed. This score is effectively a measure of quality.

Instead of or in addition to using explicit score-based metrics, the controller 28, MatchPublisher H or other node functionality can make the determination of whether an image acquired by a node A, 10 is a potential candidate to update the respective known person's entries in the central KP database N can be made by applying the image to a neural network to make a prediction of its suitability as a potential candidate.

In the illustrated embodiment, if a potential candidate for inclusion in the central KP database N is identified in step 64, it is sent in step 66 to the server J for further consideration in that regard. This can be effected by the controller 28 of FIG. 5 or MatchPublisher H of FIG. 1 and discussed above in connection therewith or otherwise, all as is within the ken of those skilled in the art in view of the teachings hereof.

In some embodiments, the image is sent along with (i) the metrics generated in steps 62, 64 and/or any other quality metric (e.g., a composite score) determined in connection with recognition of the face; and/or (ii) a GUID or other identifier associated with the (closest) matching entry (or entries) for that image in the local KP database 26A and/or of the known person represented thereby, and/or (iii) the cosine distance or other similarity measure between the face in the image and that of the matching entry (or entries) in the local KP database 26A.

Registration Image Acceptance Step

The text below details steps in determining whether a candidate image identified as discussed above should, in fact, actually be included in the central KP database N. Although in the illustrated embodiment, these steps are executed by server J, in other embodiments, one or more of the steps may be executed by the node A, 10 that designated the image as such a candidate and/or by another such node in the system 5. Conversely, although step 66 (i.e., for identifying whether an facial image acquired by a node A, 10 is indeed a candidate for inclusion in the central database N) is discussed above as being executed on the node A, 10 that captured the facial image, in other embodiments that step may be carried out by the server J and/or one or more of the other nodes A.

In step 68, the server J determines whether a candidate image received from a node A, 10 should, in fact, be included in the central KP database N. This can be effected by the MatchConsumer L (FIG. 1), module 57 (FIG. 5) or other functionality executing within server J, as is within the ken of those skilled in the art in view of the teachings hereof.

In the illustrated embodiment, the server takes three factors into account in making determination (though, other embodiments may vary in this regard, e.g., using fewer than the three factors below and/or other factors instead or in addition):

1. the quality of the received image, (and, more particularly, of the facial image therein);
2. the similarity of the face shown in the received image with that of a known person in the central KP database N; and,
3. the extent to which the face in the received image reflects a permissible or expected change in that known individual relative to images of him/her in that database. Such a change is referred to, here, as a "life change" and includes such changes as:
    weight gain/loss (which generally reveal themselves, e.g., in facial images, in the shape of the cheeks);
    beard or mustache or other facial hair that has been grown or removed;
    changes in the eyeglasses (e.g., addition or absence of them; thickness of the eyeglass frames); and/or
    changes to facial ornamentation, such as tattoos, jewelry such as nose or cheek rings,
    aging.

With respect to the first factor, inclusion in the central KP database N typically requires that a candidate image (and, specifically, that of the facial image therein) be of an image quality that is above a threshold, in some embodiments. Referring to the factors (or metrics) discussed above under the heading "Quality Metrics," by way of non-limiting example, that threshold can be on a per-metric basis and/or an overall composite metric. The threshold can be selected empirically or otherwise to insure that images (and, more particularly, facial images) that added to the central database N are of at least sufficient quality for reliable use in facial matching by Recognizer G, 26.

This first factor can be implicitly or explicitly applied by the server J. In embodiments which rely on the former, the server J assumes that the fact of image transmission in step 66 is indicative that it meets the quality standard. With respect to the latter, the server J can explicitly determine (facial) image quality based on (i) scores and/or any other quality metrics sent by the node in step 66, and/or on re-evaluation of those (or other) measures of image/face quality discerned from the image and/or a recalculation of metrics therefrom, all as is within the ken of those skilled in the art in view of the teachings hereof.

With respect to the second factor, the server J (and, more particularly, for example, the module 57, the MatchConsumer L or other functionality associated with the server) can determine the degree of similarity of the face shown in the received candidate image and that of a known person in the central KP database N based on the cosine distance or other similarity measure, if any, received in step 66 from the node A, 10 along with the candidate image. Alternatively, and/or in addition, the server J can determine the degree of similarity through a comparison of a face shown in the candidate image and that in images associated with the GUID or other identifier, if any, received in step 66 from the node A, 10 that found the match—or, it can match the face in the received image against a portion or the entire central database N, e.g., using a methodology like that discussed above in connection with facial recognition by the nodes A, 10 or otherwise.

The second factor is dependent on the degree of match with the identified or closest-matching face in the central database N. If the degree of match is very high, there is minimal additional information from adding the new image to the central KP database N. For example, cosine distance scores vary from −1.0 to 1.0, where 1.0 is the best. Scores near 1.0 indicate that the facial image is adequately captured by the existing system. Scores near a threshold or between two thresholds, e.g., high and low, might indicate that some information has not been captured and that an update of the central KP database N is in order. Those images make good candidates. If, for example with a cosine distance, the threshold to recognize a person is 0.4, the serve J might accept images as candidates between 0.4 and 0.8—or, if only one threshold is provided for, if the cosine distance is within 0.2 of that threshold—all by way of non-limiting example.

In some embodiments, the second factor is also dependent on the degree to which the face in the received image is an outlier vis-à-vis other images of the same person in the central KP database. In this regard, for example, the server J may apply a clustering algorithm against the set of those images (i.e., the newly received image and the prior ones of the same individual in the database) and, if the newly received image is an outlier, its similarity scoring can be zeroed or otherwise adjusted to reflect the possibility that it is of an entirely different person.

With respect to the third factor, i.e., the extent to which the face in the received image reflects a permissible or expected change in a known person in the central database N, the server J (and, more particularly, for example, the module 57, the MatchConsumer L or other functionality associated with the server) compares that image with those in the database for the matching known person (e.g., determined as discussed above in connection with the second factor). Changes with respect to weight gain/loss, addition or removal of facial hair and changes in eyeglasses can be discerned by standard machine learning algorithms as is within the ken to those skilled in the art. For example, there are numerous algorithms that take an image of a face and return an estimate of age. Or, more simply, one can use time-stamps within the images from which one can compute the passage of time. Additionally, there are numerous detectors that can determine the absence or presence of facial hair, nose rings and other piercing, and the presence of absence of tattoos. These algorithms can all be trained using real and/or synthetic data. Furthermore, large changes in weight can affect the cheek to jaw width ratio, and other measures, subsequently making face detection challenging. Standard algorithms machine learning algorithms can be trained to detect such ratios. And, standard machine learning algorithms using synthetic data can be used to detect the effect of the life changes, such as the measurement of the jaw/cheek width ratios, on face recognition scores.

With respect to the third factor, note that aging and time are effectively the same concepts. Experiments have shown that an individual is more likely to match to a more recent image than an older image, when both images are of the same quality. Thus, it is advantageous to obtain more recent images, or equivalently to obtain images where the individual has aged a small amount of time.

As with the second factor, the third factor is dependent on the degree to which the face in the received image reflects a permissible or expected change in a known person in the central database N. If the degree of change is small, there is minimal additional information from adding the new image to the central KP database. If the degree of change is high—yet, still reflects a change in the same person (and, not, a different person altogether)—an update of the database may be appropriate, assuming the first and second factors augur in favor of that. Thus, for example, measurements returned of jaw/cheek width ratio that are near a threshold or between two thresholds, e.g., high and low, might indicate that these are good candidate for inclusion in the database for that person.

Alternatively, or in addition to comparing images, the server J can compare information about the person depicted in the received image and/or about that image itself with corresponding information about the person and/or image for the matching known person. Such comparisons can be useful in determining, for example, whether the person has aged substantially since the time images of him/her were last acquired for the central KP database N. Thus, for example, if metadata associated with the received image indicates that it was recently acquired and that associated with the most recent matching image in the central database indicates that it was acquired five years earlier, an update of the database may be appropriate, again, assuming the first and second factors augur in favor of that. This can be effected by applying thresholds to differences in ages of the compared images, such that differences near a threshold or between two thresholds, e.g., high and low, might indicate that these are good candidate for inclusion in the database for that person. Note that the time elapsed since the previous registration images was taken can be age-dependent. Individuals in their teenage years tend to change their facial appearance much faster than those in their third or fourth decade of life; hence, in addition to metadata regarding when the respective images were capture, some embodiments take into account the actual or predicted age of the person in those images.

A determination by server J in step 68 on whether a candidate image received from a node A, 10 should, in fact, be included in the central KP database N can be based on the following mathematical relation, by way of non-limiting example:

$$I=(k_1*F_1)*(k_2*F_2)*(k_3*F_3)$$

where,
   $F_1$ is a measure of the quality of the image received from node A, 10;
   $k_1$ is a weighting factor for the quality measure. In embodiments, like that illustrated here, that apply a threshold quality, $k_1$ can be zero if $F_1$ is below that threshold and, otherwise, it can be one or some other weighting factor that is dependent on the significance of image quality and on the expected range of values of $F_1$;
   $F_2$ is a measure of the degree of similarity of the face in the image received from node A, 10 with that of a face in the central KP database N;
   $k_2$ is a weighting factor for the similarity measure. In embodiments that apply a threshold similarity or range, $k_2$ can be zero if $F_2$ is too far from that threshold or falls outside the designated range and, otherwise, it can be one or some other weighting factor that is dependent on the significance of facial similarity and on the expected range of values $F_2$;
   $F_3$ is a measure of the degree to which the face in the received image reflects a permissible or expected change—i.e., a life change—in a known person in the central database N;
   $k_3$ is a weighting factor for the life-change measure. In embodiments that apply a threshold similarity or range, $k_3$ can be zero if $F_2$ is too far from that threshold or falls outside the designated range and, otherwise, it can be one or some other weighting factor that is dependent on the significance of life change measure and on the expected range of values $F_3$;

The mathematical relation above is provided by way of example. Those skilled in the art will appreciate that other relations that take in to account the various factors discussed above may be used instead or in addition.

Implementation of code for operation of the server J in the foregoing regards is within the ken of those skilled in the art in view of the teachings hereof.

Depending on the value, I, returned by the mathematical relation employed, the server J can accept the newly received image for inclusion in the central KP database N, in addition to those already stored there for the same person or in lieu of one or more prior images of that same person (e.g., in embodiments that cap the number of images per KP and/or where replaced images are old, of low quality and/or otherwise less desirable and/or necessary in view of addition of the new image). If accepted, the image is stored to the central KP database N (though, in some embodiments, segregated logically or otherwise from the previously-stored images there, e.g., to facilitate processing and/or further review by security personnel or others, all by way of non-limiting example). Step 70. At the same time, as noted above, one or more existing images of the same KP individual may be removed from the database.

Each such update is disseminated to the node's ECDs C, as discussed above, and more particularly to their respective local KP databases 26A. See step 72 In some embodiments, the newly received and accepted images are sent to the respective ECDs; while, in other embodiments, embedding vectors or other representations generated from each accepted image are sent in addition or instead. This is accomplished in like manner to that discussed above in connection with the discussion of the functions of server J and, more particularly, its dissemination of KPs images or vector or other representations thereof to the nodes A, 10.

Additional Embodiments

A person's face is more likely to change at a certain periods in their lifetime. Those periods may include infants whose entire body is changing quickly, children undergoing puberty or growth-spurts, older adults whose faces are starting to wrinkle. In general, the youngest and oldest should have their images updated most often. In step 64, one of the elements that may be used to decide to upload an image for possible inclusion is the age of the individual. Without limitation, the compositing of scores can more heavily weight the amount of time since the last collected images for the youngest and oldest individuals then for other ages.

Another element that may be used in step 64 is the expected frequency of use of the access point or an access control system of which it is a part by an individual. An access control system that is used infrequently by a single individual may be configured to upload images more frequently. For example, an access control system controlling entrance to a stadium may determine based on an individual's prior history of access or other factors that it is relatively unlikely that she will present herself again soon, and thus may by configured to upload images to be include in the central KP database. An access control system to an office that is used every day, might upload images less often.

In Step 68, determining if a candidate image should actually be included in the KP database, if an existing image is of approximately equal quality to the uploaded image, a newer image may be more valuable as newer images are more likely to lead to a match. That is, a metric for inclusion might replace in image with a slightly lower quality one in exchange for getting a newer image. Effectively, a composite score can be chosen to allow small changes in quality in exchange for newness of image.

In some embodiments, the system may be configured to accommodate facial changes associated with the seasons. Such systems may be configured to acquire facial images of known individuals seasonally and/or to download to the local stores previously acquired such images or representations thereof. Thus, steps 64 and 68 may take into account the last season an image was collected, and how recent the image is from the current season. Similarly, a user may have multiple hair styles, or glasses, and it can improve the likelihood of a match by sending representations of all of those images to the device, to effectively match somewhat better if the hairstyle of the day happens to match the known hairstyle.

In some embodiments, a goal of the Server (J), which includes the Central KP DB (N), is to form an embedding or other representation that makes it most likely to identify a known individual's face correctly, while minimizing compute on the edge device. The Central KP DB can be optimized to accomplish that goal in several ways. One way is to keep a single image, or a very small number of images of very high quality for each known individual, where that small number is typically under ten images and, in some embodiments, under five images. A different way is to store to the Central KP DB a large number of lower quality images for each individual (e.g., more than ten images and, potentially, twenty or more images) but to compute what the representation of high-quality images, or a small number of images, would be. That computation can be done in a variety of ways. Without limitation, one such way is to use a weighted average of image scores. The weights of each of those scores can be determined by running regression style experiments based on access attempt data collected. The weights can alternatively be formed from quality metrics in face recognition, which are well known in the art. In one instantiation, a Central KP database might consist of thousands of images based on lower quality images. In another, it could consist of tens of images based on higher quality images. In general, the higher the quality image, the smaller number of images that need to be kept in the Central KP to achieve a high likelihood of correctly identifying the person.

In some embodiments, the number of representations of facial images, or embedding vectors or other values derived from facial images, sent to the edge device vary based on the individual. For example, in some cases, two individuals who look similar are in the database. (As well known to those skilled in the art, similar people are often relatives of the same gender.) In that circumstance, the Central KP may choose to keep more vectors of such individuals. The goal is to improve the likelihood of differentiation of the two individuals at access time. In such circumstances, more representations, or derived representations, from the Central KP may be sent to the edge device to improve the likelihood of differentiation of the two similar individuals. For example, representations may be chosen from each individual that are most similar to the other, to more finely define a boundary between them. As a separate example, if the quality and quantity of facial images in the central KP is lower for an individual, the Central KP may send more representations in an attempt to compensate.

Step 70, the update of the central KP database, may include the removal of existing images. When new images are actually added to the Central KP database, Step 68, they are compared to the existing images. Because of the cost of storage, or just to limit compute required for future steps 68, it is desirable to limit the number of images in the Central KP database. If a maximum of images per person is used across the system, when that maximum is reached, and an image is decided to be added, an image must be dropped. This image will generally be the lowest quality image, and/or the oldest image. That decision can be made similar to the decision to add images, looking for minimal scores in quality metrics, or composite metrics.

In some instantiations, controller 28 is designed to obtain better quality images for the Central KP Database (N). In this regard, for example, the controller 28 can be adapted to determine when a known individual is present at a node A (e.g., via the Recognizer and/or liveness detection, in embodiments that include such) and to send messages to a display (e.g., in the manner described in Step 5G) directing the individual to take to increase the quality of the images, e.g., by re-positioning, adjusting their pose, opening their eyes, standing still, removing hats, sunglasses or other items obstructing the view of their face, and so forth. The controller can, moreover, send messages that updated images are being collected for the Central KP DB. The controller normally attempts to grant access as quickly as possible, but when specifically trying to collect images for the Central KP DB, may use more time.

In some instantiations, the controller is aware of the time elapsed since the last collection images in the Central KP Database and requests more images periodically, such as once a year. In other instantiations, the expected frequency of a user being seen is sufficiently small that the controller requests high quality images at every access attempt. In some instantiations, the variation is lighting across the face produces images that are sufficiently low quality, that it is not worth messaging the user to produce higher quality images because the user cannot fix the lighting. That is, if the quality of the images cannot be improved sufficiently to meet a threshold for the Central KP database, no messaging is done to the user.

In the Central KP Database, one stores images of faces, or some part of them, so that if the algorithms change over time, the algorithms can re-compute the outputs from the original images. Those images can be losslessly compressed. They can also be stored in representations such as jpeg which introduce loss. They can also be stored in other representations. For example, there are numerous methods to encode and decode a face using modern day machine learning methods as is within the ken of those skilled in the state of the art.

EXAMPLE

A more complete understanding of the illustrated embodiments of FIGS. 1-4 may be attained by reference to the code excerpts below, in which construction and operation of the modules shown in FIG. 1 is expressed in the Python programming language and comments embedded therein.

The DataSource is a base class to collect frames of video from the camera. It is also # structured to be able to collect frames of video from a file for testing purpose. The # VideoStreamDataSource includes a buffer of frames that can be accessed in a thread-safe # way.

```
class Invalid FrameException(Exception):
    pass
class BufferTimeoutException(Exception):
    pass
class InvalidSourceException(Exception):
    pass
class DataSource(object):
    """Abstract data source class.
    Data sources are used to feed frames to whatever needs them.
    """
    def __init__(self, source):
        self.source = source
    @abstractmethod
    def get_next_frame(self):
        """Gets the next available frame from the data source."""
        pass
    @abstractmethod
    def get_frame_number_of_last_captured_frame(self) -> int:
        """Gets the current frame number"""
        return 0
    @abstractmethod
    def stop(self):
        """Stops any running process the data source may be doing."""
        pass
    @abstractmethod
    def start(self):
        """Starts any running process the data source may be doing."""
        pass
    @staticmethod
    def get_processed_source_id(source_name) -> Union[int, str]:
        # A string in an integer refers to a local camera. Typically 0.
        try:
            a = int(source_name)
            logger.info("Source name is an integer: { }".format(a))
            return a
        except (ValueError, TypeError):
            return source_name
    @abstractmethod
    def update_source(self, source_name: str):
        """ Changes the source"""
        pass
class UpdatingDataSource(DataSource):
    """ Ability to update a source name"""
    def __init__(self, source):
        super().__init__(source=source)
        self.update_source_queue = Queue()
    def do_the_switch_source(self, source_update, video):
        """For internal use only"""
        video.open(self.get_processed_source_id(source_update))
    def _update_video(self, video):
        while not self.update_source_queue.empty():
            nextq = self.update_source_queue.get_nowait()
            event, data = nextq.popitem()
            if event == 'update_source':
                source_update = data
        if source_update is not None:
            logger.info("Video source has changed! Restarting with source { }".format
                (source_update))
            self._do_the_switch_source(source_update, video)
            self.source = source_update
    def update_source(self, source_name: str):
        """ Changes the source"""
        self.update_source_queue.put({'update_source': source_name})
class LoopingDataSource(UpdatingDataSource):
    def __init__(self, source, number_of_loops=9999999):
        super().__init__(source=source)
        self.number_of_loops = number_of_loops
    def try_to_loop(self, video) -> bool:
        """
        If it is a video file, try to loop.
        If it is a local camera or network camera, don't bother.
        :return: True if trying to loop. False otherwise
        """
        # if local camera or known network camera types
        # These lines not really needed, but since we know them, let's do it.
        if isinstance(self.source, int) or self.source.startswith("rtsp://"):
            return False
```

-continued

```
        # CV_CAP_PROP_POS_FRAMES = 1. Try to get the Frame Pos. If you can, set value to be 0
        if video.get(1) >= 0.0:
            logger.info("Resetting video!")
            video.set(1, 0)
            return True
        return False
    def set_looping(self, number_of_loops: int) -> None:
        """ During testing, we don't want to loop"""
        self.number_of_loops = number_of_loops
class VideoDataSource(LoopingDataSource):
    """ Data source for feeding video frames. By default, do not loop"""
    def __init__(self, source):
        super( ).__init__(source=source, number_of_loops=0)
        self.video = cv2.VideoCapture(self.get_processed_source_id(self.source))
        self._frame_number_of_just_captured_frame = -1
        self._running = False
        logger.info("source { }, working directory { }".format(source, os.getcwd( )))
    def get_next_frame(self):
        # if the source is updated, deal with it.
        if not self.update_source_queue.empty( ):
            self._update_video(self.video)
        ok, frame = self.video.read( )
        # Try to loop video. Only make one try at it.
        if not ok:
            if self.number_of_loops > 0 and self.try_to_loop(self.video):
                ok, frame = self.video.read( )
                print(self.number_of_loops, ' loops left')
                self.number_of_loops -= 1
                # We don't need to throw or log an error from here because whatever
                # listens to the buffer thread
                # should timeout.
                if not ok:
                    raise InvalidFrameException
            else:
                raise InvalidFrameException
        self._frame_number_of_just_captured_frame += 1
        bgr_frame = EncodedImage.cast(frame, BgrImage)
        assert isinstance(bgr_frame, BgrImage)
        return bgr_frame
    def get_frame_number_of_last_captured_frame(self) -> int:
        return self._frame_number_of_just_captured_frame
    def start(self):
        self._running = True
    def stop(self):
        self._running = False
class BufferThread(threading.Thread):
    """Thread that supports a buffering event."""
    def __init__(self, group=None, target=None, name=None,
            args=( ), kwargs=None, *, daemon=None):
        super( ).__init__(group=group, target=target, name=name,
            args=args, kwargs=kwargs, daemon=daemon)
        # Filled event indicates when the buffer is full
        self.filled = threading.Event( )
        self.filled.clear( )
class VideoStreamDataSource(LoopingDataSource):
    """Data source for feeding video stream frames."""
    def __init__(self, source):
        super( ).__init__(source=self.get_processed_source_id(source))
        self.buffer_size = 30
        self.rate_limit = 1000 / 30
        # ToDo: Consider using a large contiguous buffer for speed optimization.
        # It does not currently appear this is our limit, so I am going to hold off.
        self.frame_buffer_bgr = [ ]
        self.video = None
        self.buffer_thread = None
        self._running = False
        self._frame_number_of_just_captured_frame = -1
        logger.info("Video source: { }".format(source))
    def capture(self):
        last_frame = current_milli_time( )
        self._running = True
        while self._running:
            now = current_milli_time( )
            delta = now - last_frame
            last_frame = now
            # Rate limit to 30 frames a second
```

-continued

```
        if delta < self.rate_limit:
            time.sleep((self.rate_limit – delta) / 1000)
        # if the source is updated, deal with it.
        if not self.update_source_queue.empty( ):
            self._update_video(self.video)
        ok, frame = self.video.read( )
        # Possibly try to loop
        if not ok:
            if self.number_of_loops > 0 and self.try_to_loop(self.video):
                ok, frame = self.video.read( )
                # We don't need to throw or log an error from here because whatever listens to
                # the
                # buffer thread
                # should timeout.
                self.number_of_loops –= 1
                if not ok:
                    break
            else:
                break
        frame = EncodedImage.cast(frame, BgrImage)
        self.frame_buffer_bgr.append(frame)
        if len(self.frame_buffer_bgr) >= self.buffer_size:
            # print("filled",len(self.frame_buffer))
            self.buffer_thread.filled.set( )
        else:
            # print("buffering",len(self.frame_buffer))
            self.buffer_thread.filled.clear( )
    def get_next_frame(self):
        if not self.buffer_thread.filled.is_set( ):
            # Wait with a 10 second timeout
            if not self.buffer_thread.filled.wait(10):
                raise BufferTimeoutException
        # Grabs the last frame.
        # Do the conversion here so that we don't have to convert frames we delete
        bgr_frame = self.frame_buffer_bgr.pop( )
        # Code to show frames
        # cv2.imshow("frame",frame)
        # cv2.waitKey(25)
        # Code to see how many frames we are deleting
        if len(self.frame_buffer_bgr) > self.buffer_size:
            del self.frame_buffer_bgr[:-self.buffer_size]
        self.buffer_thread.filled.clear( )
        assert isinstance(bgr_frame, BgrImage)
        self._frame_number_of_just_captured_frame += 1
        return bgr_frame
    def start(self):
        logger.info('Starting the camera with source { }'.format(self.source))
        self.video = cv2.VideoCapture(self.source)
        if not self.video.isOpened( ):
        raise InvalidSourceException
        self.buffer_thread = BufferThread(target=self.capture)
        self.buffer_thread.start( )
        logger.info('Started the camera...{ }'.format(self.source))
    def stop(self):
        logger.info('Stopping camera...')
        self._running = False
        if self.buffer_thread is not None:
            while self.buffer_thread.is_alive( ):
                time.sleep(0.1)
        logger.info('Camera stopped.')
    def get_frame_number_of_last_captured_frame(self) –> int:
        return self._frame_number_of_just_captured_frame
class DataSourceNone(UpdatingDataSource):
    """ Data Source None -- does nothing"""
    def get_next_frame(self):
        """Gets the next available frame from the data source."""
        pass
    def get_frame_number_of_last_captured_frame(self) –> int:
        """Gets the current frame number"""
        return 0
    def stop(self):
        """Stops any running process the data source may be doing."""
        pass
    def start(self):
        """Starts any running process the data source may be doing."""
        pass
```

```
class FaceDetectorNames(Enum):
   none = 'none'
   mtcnn = 'mtcnn'
   find_nothing = 'do_nothing'
   pre_cropped = 'pre_cropped'
class UnknownFaceDectectorException(Exception):
   pass
# The FaceDetector is a abstract class for detecting faces. It takes in an image and returns
# an array of faces
class FaceDetector:
   """"""
   Abstract class -- wrapper around detecting faces
   """"""
   def __init__(self):
      pass
   @abstractmethod
   def detect_first_face(self, img) -> Optional[FrameFace]:
      """"""
      :param img: The image in which to detect faces.
      :return An optional FrameFace.
      """"""
      raise NotImplementedError
   @abstractmethod
   def detect_faces(self, img) -> List[FrameFace]:
      """"""
      :param img: The image in which to detect faces.
      :return A list of optional FrameFaces.
      """"""
      raise NotImplementedError
   @abstractmethod
   def set_margin_percentage(self, mp: float):
      """"""
      Sets margin percentage for the face detector.
      :param mp: desired margin percentage
      """"""
      raise NotImplementedError
   @staticmethod
   def factory(fdname: Union[FaceDetectorNames, str] = FaceDetectorNames.none):
      # the use of lambda is to make mypy happy
      mapping = {
         FaceDetectorNames.mtcnn: lambda: FaceDetectorMtcnn( ),
         FaceDetectorNames.find_nothing: lambda: FaceDetectorFindNothing( ),
         FaceDetectorNames.pre_cropped: lambda: FaceDetectorPrecropped( ),
      }
      face_detector_final: FaceDetectorNames = FaceDetectorNames(fdname)
      if face_detector_final not in mapping or face_detector_final == FaceDetectorNames.none:
         logger.error("unknown embedder requested: { }".format(face_detector_final))
         ReportToTeam.report("unknown embedder requested: { }".format(face_detector_final))
         raise UnknownFaceDectectorException
      logger.info(str(face_detector_final) + " requested")
      return mapping[face_detector_final]( )
class FaceDetectorMtcnn(FaceDetector):
   def __init__(self,
         margin_percentage: Union[float, None] = None,
         min_face_size: int = 60,
         min_dist_between_eyes: int = 20):
      super( ).__init__( )
      self.mtcnn = MtcnnModel(margin_percentage=margin_percentage,
            min_face_size=min_face_size,
            min_dist_between_eyes=min_dist_between_eyes)
   def detect_first_face(self, img: BgrImage) -> Optional[FrameFace]:
      faces = self.detect_faces_exhaustive(img)
      return faces [0] if len(faces) else None
   def detect_faces(self, img: BgrImage) -> List[FrameFace]:
      return self.mtcnn.find_faces(img)
   def detect_faces_exhaustive(self, img: BgrImage, initial_factor: float = 0.35,
         max_factor: float = 0.85,
         step_size: float = 0.15, size_threshold: Optional[int] = None) -> List[
   FrameFace]:
      """"""
```

If a face isn't found, factor is gradually increased (to a maximum threshold) until a face is found.

Images that exceed the size threshold are downscaled before they are processed.

A border is added to the image and the factor is reset if no faces are found on the first pass.

```
:param img: The image in which to search for a face.
:param initial_factor: The mtcnn factor.
:param max_factor: The upper limit for threshold scaling.
:param step_size: the value by which the factor will be incremented on each pass.
:param size_threshold: The maximum X or Y pixel value beyond which images
are downscaled.
:return List of optional FrameFaces.
"""
factor = initial_factor or self.mtcnn.factor
border_size = None
downscaled_ratio = None
if size_threshold:
    if (img.shape[0] > size_threshold) or (img.shape[1] > size_threshold):
        logger.info("Downscaling image for face detection.")
        if img.shape[1] > img.shape[0]:
            downscaled_ratio = size_threshold / img.shape[1]
            x = size_threshold
            y = int(downscaled_ratio * img.shape[0])
        else:
            downscaled_ratio = size_threshold / img.shape[0]
            y = size_threshold
            x = int(downscaled_ratio * img.shape[1])
        downscaled_img = cv2.resize(img, (x, y))
        img = EncodedImage.cast(downscaled_img, BgrImage)
while factor < max_factor:
    self.mtcnn.factor = factor
    faces = self.detect_faces(img)
    if faces:
        if border_size:
            for face in faces:
                b = face.box
                b.top = max(b.top - border_size, 0)
                b.left = max(b.left - border_size, 0)
                b.bottom = min(b.bottom - border_size, img.shape[0] - (border_size * 3))
                b.right = min(b.right - border_size, img.shape[1] - (border_size * 3))
        if downscaled_ratio:
            mult = 1 / downscaled_ratio
            for face in faces:
                b = face.box
                b.top = int(mult * b.top)
                b.left = int(mult * b.left)
                b.bottom = int(mult * b.bottom)
                b.right = int(mult * b.right)
        return faces
    else:
        logger.info("Face not found in image, increasing factor by .15 to { }".format(factor))
        factor += step_size
        factor = min(max_factor, factor)
        if factor == max_factor and not border_size:
            logger.info("Adding border to image for face detection.")
            border_size = int(img.shape[1] / 3)
            img = cv2.copyMakeBorder(img, top=border_size, bottom=border_size,
                left=border_size,
                right=border_size,
                borderType=cv2.BORDER_CONSTANT, value=[0, 0, 0])
            img = EncodedImage.cast(img, BgrImage)
            factor = initial_factor
return []
def set_margin_percentage(self, mp):
    self.mtcnn.set_margin_percentage(mp)

# The following is an implementation of the MTCNN Face Detector

from typing import List, Tuple
from math import hypot, radians, sin, asin, degrees
from core.detect_face import detect_face
from core.libs import RgbImage, Box, Point
from core.mtcnn import create_mtcnn
import numpy as np
import cv2
class FaceLandmarks:
    def __init__(self, left_eye: Point, right_eye: Point, nose: Point, left_mouth: Point,
        right_mouth: Point):
        self.left_eye = left_eye
        self.right_eye = right_eye
        self.nose = nose
        self.left_mouth = left_mouth
        self.right_mouth = right_mouth
    @property
```

-continued

```
def eye_distance(self):
    """"The distance between the eyes."""
    return self.right_eye – self.left_eye
def shift(self, delta_x: int, delta_y: int) -> None:
    """"Shift all of the landmark point positions by the x and y deltas."""
    self.left_eye.shift(delta_x, delta_y)
    self.right_eye.shift(delta_x, delta_y)
    self.nose.shift(delta_x, delta_y)
    self.left_mouth.shift(delta_x, delta_y)
    self.right_mouth.shift(delta_x, delta_y)
class FaceBox(Box):
""""Represents a box surrounding a face."""
    def __init__(self, left: int, right: int, top: int, bottom: int):
        super( ).__init__(int(left), int(right), int(top), int(bottom))
    def box_of_min_size(self, minsize: int, frame_height: int, frame_width: int) -> 'FaceBox':
        """"Resizes the box to a minimum size on the smallest dimension (width or height),
            maintaining aspect ratio.
```

This method will always attempt to put a face in the center of the box, however, if the box is pushed up against an edge, it will not be centered but will still maintain minimum size and aspect ratio requirements.

```
:param minsize: The minimum size for the smaller dimension.
:param frame_height: The height of the enclosing frame.
:param frame_width: The width of the enclosing frame.
:return A new FaceBox of min size.
"""""
width = self.width
height = self.height
ratio = self.ratio
left = self.left
right = self.right
top = self.top
bottom = self.bottom
# Exit out if we don't need to resize
if width >= minsize and height >= minsize:
    return FaceBox(self.left, self.right, self.top, self.bottom)
# Tech Debt: Below isn't dry, and would be nice to make succinct.
if width < minsize:
    # Resize width and adjust height based on aspect ratio
    diff = (minsize – width) // 2
    left -= diff
    right += diff
    diff = round(diff * ratio)
    top -= diff
    bottom += diff
else:
    # Resize height and adjust width based on aspect ratio
    diff = (minsize – height) // 2
    top -= diff
    bottom += diff
    diff = round(diff * ratio)
    left -= diff
    right += diff
# Do the edge detection adjustments
if left < 0:
    # Move to the right
    diff = 0 – left
    left = 0
    right += diff
elif right > frame_width:
    # Move to the left
    diff = right – frame_width
    right = frame_width
    left -= diff
if top < 0:
    # Move down
    diff = 0 – top
    top = 0
    bottom += diff
elif bottom > frame_height:
    # Move up
    diff = bottom – frame_height
    bottom = frame_height
    top -= diff
return FaceBox(left, right, top, bottom)
```

-continued

```
class FrameFace:
    """"Represents a face in a frame.""""
    def __init__(self, box: FaceBox, landmarks: FaceLandmarks, confidence: float,
            frame_shape: Tuple[int, int]):
        self.box = box
        self.landmarks = landmarks
        self.confidence = confidence
        self.frame_shape = frame_shape # (height, width)
    def crop(self, img: np.ndarray) -> np.ndarray:
        """"
        A wrapper for Box.crop_image
        :param img: The image to crop.
        :return A cropped image.
        """"
        return self.box.crop_image(img)
    def shift(self, delta_x: int, delta_y: int) -> None:
        """"Shift the FaceBox and FaceLandmarks positions by the x and y deltas.""""
        self.box.shift(delta_x, delta_y)
        self.landmarks.shift(delta_x, delta_y)
    @property
    def eye_distance(self):
        """"Convenience method for the landmarks eye_distance method.""""
        return self.landmarks.eye_distance
    # TODO: review for speed optimization.
    @property
    def nose_offset(self):
        """"
        :return offset: A float between 0 and 1 representing the distance between the nose and the
        center of the mouth.
        """"
        nose = self.landmarks.nose
        left_mouth = self.landmarks.left_mouth
        right_mouth = self.landmarks.right_mouth
        x1, y1 = left_mouth.x, left_mouth.y # left mouth points
        x2, y2 = right_mouth.x, right_mouth.y # right mouth points
        x3, y3 = nose.x, nose.y # nose points
        dx = x2 - x1 # mouth horizontal width
        dy = y2 - y1 # mouth vertical height
        mag = hypot(dx, dy) # mouth distance from corners
        # making dx, dy a unit vector pointing from left mouth to right mouth
        dx /= mag
        dy /= mag
        # dot product of (dx, dy) and vector from left mouth to nose
        # value is the component of left mouth to nose in the left mouth to right mouth direction
        dot = (dx * (x3 - x1)) + (dy * (y3 - y1))
        # making (x4, y4), a vector pointing in left mouth to right mouth
        # with magnitude equal to the dot product above
        x4 = dx * dot
        y4 = dy * dot
        # if the nose is to the left of left mouth, or to the right of
        # right mouth, we are at max
        h = hypot(x4, y4)
        if x4 <= 0 or h >= mag:
            offset = 1.0
        else:
            # if nose falls between mouth points
            # set 0 to mean its in the middle, and 1 to
            # be nose is above mouth point, changing linearly
            offset = abs(mag - (h * 2)) / mag
        return offset
    def get_tracking_box_and_center(self, scale) -> Tuple[
            Tuple [float, float, float, float], Tuple[int, int]]:
        width = self.box.width
        height = self.box.height
        adj_width = width * scale
        adj_height = height * scale
        adj_x = self.box.left + ((width - adj_width) / 2)
        adj_y = self.box.top + ((height - adj_height) / 2)
        t_box = (adj_x, adj_y, adj_width, adj_height)
        t_center = (int(adj_x + (adj_width / 2)), int(adj_y + (adj_height / 2)))
        return t_box, t_center
    # TODO: review for speed optimization.
    def pitch_yaw_roll(self) -> Tuple[float, float, float]:
        """"
```

57

This method employs OpenCV's solvePnP function, which requires us to make some educated guesses in the absence of information about the camera used by the client:
1) We must use a heuristic to determine its focal length (a function of the frame width).
2) By default we assume no lens distortion.

If the corresponding real-world values can be passed to this method (perhaps stored in the sensor config?) we can improve the accuracy of the pose estimation.

This function also relies on a reasonable 3-dimensional representation of the average human face (whose points correspond to the detected face landmarks). It is possible that fine-tuning these values could improve overall accuracy (and faces that widely deviate from this representation will yield less accurate estimates).

:return: a tuple of 3 signed floats: the estimated angles in degrees for pitch, yaw, and roll.

```
"""
frame_height = self.frame_shape[0]
frame_width = self.frame_shape[1]
nose = self.landmarks.nose
left_eye = self.landmarks.left_eye
right_eye = self.landmarks.right_eye
left_mouth = self.landmarks.left_mouth
right_mouth = self.landmarks.right_mouth
image_points = np.array([
    (nose.x, nose.y), # Nose tip
    (left_eye.x, left_eye.y), # Left eye center
    (right_eye.x, right_eye.y), # Right eye center
    (left_mouth.x, left_mouth.y), # Left Mouth corner
    (right_mouth.x, right_mouth.y) # Right mouth corner
], dtype="double")
# Our model of the average human face
object_points = np.array([
    (0.0, 0.0, 0.0), # Nose tip
    (-110.0, 170.0, -135.0), # Left eye center
    (110.0, 170.0, -135.0), # Right eye center
    (-105.0, -150.0, -125.0), # Left Mouth corner
    (105.0, -150.0, -125.0) # Right mouth corner
], dtype="double")
center = (frame_width / 2, frame_height / 2)
# np.tan(np.pi / 6), a heuristic - ideally matches camera spec
focal_length = center[
        0] / 0.5773502691896256
camera_matrix = np.array(
    [focal_length, 0, center[0]],
    [0, focal_length, center[1]],
    [0, 0, 1]], dtype="double"
)
dist_coeffs = np.zeros((4, 1)) # We're assuming no lens distortion - this might need to
change
(success, rotation_vector, translation_vector) = cv2.solvePnP(objectPoints=object_points,
                rvec=np.asarray([[0], [0], [0]],
                    dtype="double"),
                tvec=np.asarray([0], [0], [0]],
                    dtype="double"),
                imagePoints=image_points,
                cameraMatrix=camera_matrix,
                distCoeffs=dist_coeffs,
                useExtrinsicGuess=True,
                flags=cv2.SOLVEPNP_ITERATIVE)
rvec_matrix = cv2.Rodrigues(rotation_vector) [0]
proj_matrix = np.hstack((rvec_matrix, translation_vector))
euler_angles = cv2.decomposeProjectionMatrix(proj_matrix) [6]
pitch, yaw, roll = [radians(angle) for angle in euler_angles]
pitch = degrees(asin(sin(pitch)))
yaw = degrees(asin(sin(yaw)))
roll = degrees(asin(sin(roll)))
return pitch, yaw, roll
class MtcnnModel:
    def __init__(self,
            min_face_size=60,
            threshold=(0.6, 0.8, 0.9),
            margin_percentage=None, # needs to be set when we have the data to set it.
            min_dist_between_eyes=20,
            min_face_confidence=0.97,
            additional_downsample=1.0,
            factor=0.35,
            min_image_length_override=30,
            use_tensorrt=False):
        """
        :param min_face_size: the minimum face size to find, a length or width in pixels
        :param threshold: the thresholds for finding faces.
        :param margin_percentage: How much extra to add around the face. MUST BE SET.
        :param min_dist_between_eyes: At 20 pixels eye to eye, it is tough to do anything.
        30 is poor. 40 is pretty good
```

-continued

```
:param min_face_confidence: What's the minimum probability of a face we need?
:param additional_downsample: do we want to downsample the image before we start?
:param min_image_length_override: We may not want to go down to look at the smallest
faces.
This is an override. It is typically set to keep the number of layers in the pyramid one layer
smaller. This actually affect the biggest faces.
:parma use_tensorrt Should we use tensorrt if it is available?
"""
# This should be a function of the image resolution
# and the distance between farthest face and camera.
self.minsize = min_face_size
self.threshold = threshold
self.margin_percentage = margin_percentage
self._min_dist_between_eyes = min_dist_between_eyes
self.min_face_confidence = min_face_confidence
self.required_image_encoding = RgbImage
# Start by downsampling the image, this saves a lot of time, but makes it harder to find
small
# faces.
self.additional_downsample = additional_downsample
self.min_image_length_override = min_image_length_override
# This should be a function of the image resolution
# and the distance between farthest face and camera.
self.factor = factor
self.pnet, self.rnet, self.onet = create_mtcnn(use_tensorrt=use_tensorrt)
def find_faces(self, img) -> List[FrameFace]:
    """Finds faces in the image.
    :param img: The image to find faces in.
    :return A tuple of face boxes and landmarks.
    """
    img = img.encoded_in(self.required_image_encoding)
    mtcnn_boxes, mtcnn_points = detect_face(img=img,
                    minimum_face_size=self.minsize,
                    pnet=self.pnet, rnet=self.rnet, onet=self.onet,
                    threshold=self.threshold,
                    pyramid_factor=self.factor,
                    min_image_length_override=self.min_image_length_override,
                    additional_downsample=self.additional_downsample)
    mtcnn_points = self._format_mtcnn_points(mtcnn_points)
    faces = [ ]
    num_faces = mtcnn_boxes.shape[0]
    if num_faces > 0:
        padded_boxes = [ ]
        img_size = np.asarray(img.shape)[0:2]
        if num_faces > 1:
            for i in range(num_faces):
                padded_boxes.append(np.squeeze(mtcnn_boxes[i]))
        else:
            padded_boxes.append(np.squeeze(mtcnn_boxes))
        for i, box in enumerate(padded_boxes):
            p_width = (box[2] – box[0]) * self.margin_percentage
            p_height = (box[3] – box[1]) * self.margin_percentage
            box[0] = np.maximum(box[0] – p_width / 2, 0)
            box[1] = np.maximum(box[1] – p_height / 2, 0)
            box[2] = np.minimum(box[2] + p_width / 2, img_size[1])
            box[3] = np.minimum(box[3] + p_height / 2, img_size[0])
            f_box = FaceBox(left=box[0], top=box[1], right=box[2], bottom=box[3])
            points = mtcnn_points [i]
            landmarks = FaceLandmarks(left_eye=Point(x=int(points[0][0]), y=int(points[0][1])),
                    right_eye=Point(x=int(points[1][0]), y=int(points[1][1])),
                    nose=Point(x=int(points[2][0]), y=int(points[2][1])),
                    left_mouth=Point(x=int(points[3][0]), y=int(points[3][1])),
                    right_mouth=Point(x=int(points[4][0]), y=int(points[4][1])))
            confidence = float(box[4])
            # Only accept a face if the confidence anf minimum distance requirements are met
            if confidence >= self.min_face_confidence and landmarks.eye_distance >=\
                    self._min_dist_between_eyes:
                faces.append(FrameFace(box=f_box,
                        landmarks=landmarks,
                        confidence=confidence,
                        frame_shape=img.shape))
    return faces
@staticmethod
def_format_mtcnn_points(mtcnn_points):
    """
    Formats mtcnn points into a friendlier format.
    :param mtcnn_points
    :return: Friendly points.
    """
```

```
# So what's happening here?
# We have mtcnn_points in the form of a 10 element array, with the first 5 elements
# being x positions of
# landmarks (left eye, right eye, nose, left mouth, right mouth), and the last 5 elements
# being y positions
# of landmarks.
# Inside each of those are each face detected.
# Example: mtcnn_points[0][0] would be the x position of the left eye, face 1 value.

# We need this in a different format..

# Group all the x, y values together to avoid the weird 10 element array.
points = np.dstack((mtcnn_points[:5], mtcnn_points[5:]))
# It's still in a weird format, with each face being deep inside the multidimensional array.
# Transpose the array so that it is in the following format:
# Face -> Landmark -> Value
# Example: landmarks[0][0][0] would be the first face, left eye, x value.
# Example: landmarks[0][0][1] would be the first face, left eye, y value.
return np.transpose(points, (1, 0, 2))
    def set_margin_percentage(self, mp: float):
        self.margin_percentage = mp
# The FaceTracker and MultiFaceTracker are examples of classes to track faces in time
# At their core, they track if the center of a new face in time is within a threshold of the old face
# in time. These tracker use a Kernalized Correlation Filter (KCF) tracker, which is known in the
# state of the art.
SecurityTrackerMessage = namedtuple('SecurityTrackerMessage',
                  ['duration_in_sec',
                   'tracking_sequence'])
class FaceTracker:
    @staticmethod
    def get_new_tracker(frame: np.ndarray, face: FrameFace):
        """

:param frame: frame
        :return:
        """

t_box, t_center = face.get_tracking_box_and_center(TrackerContainer.tracking_box_scale)
        new_tracker = cv2.TrackerKCF_create( )
        new_tracker.init(frame, t_box)
        return new_tracker, t_center
    @staticmethod
    def update_trackers(tracker_container: TrackerContainer, frame: np.ndarray,
                enumerated_faces: List[Tuple[int, FrameFace]],
                frame_number: int):
        """
```

For each tracker container, this method iterates through the enumerated faces and checks if the center of any of their bounding boxes falls within a distance threshold of the tracking box's position. If so, the tracker container is associated with this face using its index. Any face index that do not wind up associated with a tracker container will have a new one created for it in create_new_trackers.

```
        :param tracker_container: TrackerContainer
        :param frame: numpy.array
        :param enumerated_faces: A list of tuples containing an index int and a FrameFace.
        :param frame_number: the frame number
        :return: A tuple containing a bool indicating if the tracker container's face is still seen
        in thenew frame, and the tracker container.
        """

tracker_container.update(frame, enumerated_faces, frame_number)
class MultifaceTracker(FaceTracker):
    def __init__(self):
        self.tracker_containers = [ ]
        self.pool = Pool(THREAD_COUNT)
    def draw_trackers(self, frame) -> None:
        for tracker_container in self.tracker_containers:
            cv2.circle(frame, tracker_container.last_position, 10, (255, 0, 0), 10)
    def create_new_trackers(self, frame: np.ndarray, enumerated_faces: List[Tuple[int,
FrameFace]],
                frame_number: int) -> None:
        # If this face box is not already attached to a tracker, create a new tracker.
        face_indices = [tc.box_index for tc in self.tracker_containers]
```

-continued

```
    for face_index, face in enumerated_faces:
        if face_index not in face_indices:
            tracker = self.create_tracker(frame, face, frame_number)
            self.tracker_containers.append(tracker)
def process_detected_faces(self, faces: List[FrameFace], frame: np.ndarray,
            frame_number: int) -> List[SecurityTrackerMessage]:
    """
    Process the new frame and batch of detected faces, update the tracking boxes with
    the new data,
    and return the IdentifierItems of any tracking boxes that are destroyed.
    :param frame: numpy.array
    :param faces: A list of detected FrameFaces
    :param frame_number frame number
    :return: A list of IdentifierItems
    """
    enumerated_faces: List[Tuple[int, FrameFace]] = list(enumerate(faces))
    # Update all of our trackers.
    self.pool.starmap(self.update_trackers, zip(self.tracker_containers,
                    repeat(frame),
                    repeat(enumerated_faces),
                    repeat(frame_number)))
    # If the tracker has been still for a while and has no face, then submit its face and kill it.
    to_be_submitted: List[SecurityTrackerMessage] = [ ]
    tracker_containers: List[TrackerContainer] = [ ]
    for tracker_container in self.tracker_containers:
        tracker_container.produce_tracker_message(frame_number, to_be_submitted,
            tracker_containers)
    self.tracker_containers = tracker_containers
    self.create_new_trackers(frame, enumerated_faces, frame_number)
    if TrackerContainer.show_trackers:
        self.draw_trackers(frame)
    return to_be_submitted
@staticmethod
@abstractmethod
def create_tracker(frame: np.ndarray, face: FrameFace, frame_number: int) ->
TrackerContainer:
    pass
class SecurityTracker(MultifaceTracker):
    def __init__(self):
        super( ).__init__( )
    @staticmethod
    def create_tracker(frame: np.ndarray, face: FrameFace, frame_number: int) ->
TrackerContainer:
        new_tracker, t_center = FaceTracker.get_new_tracker(frame, face)
        return SecurityTrackerContainer(tracker=new_tracker, box_index=None,
last_position=t_center,
                    inception_time=time.time( ),
                    inception_frame=frame_number,
                    identifier_items=[
                        IdentifierItem(face=face, frame=frame, score=1,
                            frame_number=frame_number)])
    def dump_all_trackers(self, frame_number) -> List[SecurityTrackerMessage]:
        """
        :param frame_number:
        :return: list of tracks for identification
        """
        to_be_submitted = [ ]
        for tracker_container in self.tracker_containers:
            to_be_submitted.append(
                SecurityTrackerMessage(duration_in_sec=time.time( ) -
                            tracker_container.inception_time,
                    tracking_sequence=tracker_container.identifier_items))
        self.tracker_containers.clear( )
        return to_be_submitted
class AccessControlFaceTracker(FaceTracker):
    def __init__(self):
        """
        Responsible for tracking submitted faces and returning IdentifierItems.
        :param n_faces # of faces from a single track to be submitted
        :param use_pose_scoring whether to use pose scoring for selecting faces to be submitted
        """
        self.tracker_container = None
    def draw_trackers(self, frame) -> None:
        cv2.circle(frame, self.tracker_container.last_position, 10, (255, 0, 0), 10)
    def reset(self):
        self.tracker_container = None
    def get_tracker_info(self):
        return self.tracker_container
    def create_new_tracker(self, frame: np.ndarray, face: FrameFace, frame_number: int) ->
```

-continued

```
None:
        self.tracker_container = self.create_tracker(frame, face, frame_number)
    def process_detected_faces(self, faces: List[FrameFace], frame: np.ndarray,
                frame_number: int):
        enumerated_faces: List[Tuple[int, FrameFace]] = list(enumerate(faces))
        self.update_trackers(tracker_container=self.tracker_container,
                frame=frame,
                enumerated_faces=enumerated_faces,
                frame_number=frame_number)
    @staticmethod
    def create_tracker(frame: np.ndarray, face: FrameFace,
                frame_number: int) -> AccessControlTrackerContainer:
        """
        :param frame: frame
        :param face: face
        :param frame_number: frame number
        :return:
        """
        new_tracker, t_center = FaceTracker.get_new_tracker(frame, face)
        return AccessControlTrackerContainer(tracker=new_tracker, box_index=None,
                    last_position=t_center,
                    inception_time=time.time( ),
                    inception_frame=frame_number,
                    identifier_items=[
                        IdentifierItem(face=face, frame=frame, score=1,
                            frame_number=frame_number)])
class AgeGenderFaceTracker(MultifaceTracker):
    yaw_range = (0, 1)
    pitch_range = (0, 1)
    def_init_(self):
        super( ).__init__( )
    @staticmethod
    def create_tracker(frame: np.ndarray, face: FrameFace,
                frame_number: int) -> AgeGenderTrackerContainer:
        """
        :param frame: frame
        :param face: face
        :param frame_number: frame number
        :return:
        """
        new_tracker, t_center = FaceTracker.get_new_tracker(frame, face)
        return AgeGenderTrackerContainer(tracker=new_tracker, box_index=None,
last_position=t_center,
                    inception_time=time.time( ),
                    inception_frame=frame_number,
                    identifier_items=[
                        IdentifierItem(face=face, frame=frame, score=1,
                            frame_number=frame_number)])
# The VideoPreprocessor is a base class takes in a video source (source_manager), and runs a
# face detector to find faces, and a tracker to track those faces in time. The end result is a group
# of tracks, where each track consists of a number of images of the same person., and those
# images can be processed by an identifier or recognizer to determine if the identity of the
# person is known.
class VideoPreprocessor(PipelineClient):
    def __init__(self,
                source_manager: DataSourceManager,
                input_queue: Queue,
                output_queue: Queue,
                show_detections: bool = False,
                state_handlers=None,
                face_detector_name: Union[str, FaceDetectorNames] = FaceDetectorNames.mtcnn):
        """
        Responsible for preprocessing input from a DataSource by detecting faces.
        These faces can then be tracked or immediately submitted for recognition.
        :param source_manager: source of video data
        :param output_queue: output queue to submit results
        :param input_queue: to receive commands
        :param state_handlers dictionary of event handlers for each state
        :param show_detections: whether to show detected faces on the screen
        """
        super( ).__init__(output_queue=output_queue, input_queue=input_queue,
                state_handlers=state_handlers)
        # The margin_percentage MUST be set when the embedder is running.
        # We set it to a number that will cause it to function, but not work at All.
        self.face_detector = FaceDetector.factory(face_detector_name)
        self.face_detector.set_margin_percentage(-0.75)
        self.source_manager = source_manager
        self.stat = VideoFaceDetectionStat( )
        self.show_detections = show_detections
```

```
        # States
        self.latest_frame = None
        self._stop_reason = StopReason.NONE
        self.num_faces_submitted_this_frame = 0
        self.frame_number_of_last_captured_frame = -1
    def stop(self):
        super( ).stop( )
        self.source_manager.source.stop( )
    def start_internal(self) -> None:
        """
        Starts the video preprocessor.
        :return: None
        """
        self._stop_reason = StopReason.NONE
        # Check if we need to update the source. Since the source also has a queue, just pass along
        # all messages
        while not self.input_queue.empty( ):
            nextq = self.input_queue.get_nowait( )
            event, data = nextq.popitem( )
            if event == 'change_source' and data is not None:
                self.process_change_source(data)
        try:
            # This is an attempt to get the face detector called once, so that it is much faster
            # the second time through.
            temp_frame = np.zeros((1920, 1080, 3), dtype=np.uint8)
            temp_frame = EncodedImage.cast(temp_frame, BgrImage)
            self.face_detector.detect_faces(temp_frame)
            self.source_manager.source.start( )
        except InvalidSourceException as e:
            logger.error('Invalid source! Cannot start tracking!')
            ReportToTeam.report(e)
            self._stop_reason = StopReason.SOURCE_UNAVAILABLE
            return
        except Exception as e:
            ReportToTeam.report(e)
            logger.error(e, e.args)
            return
        self._running = True
        logger.info('Video preprocessor run loop started. Ref ID { }'.format(id(self)))
        self.run_asynchronous_message_pump( )
    def process_change_source(self, sensor_source: str):
        """
        restart video data source
        :param sensor_source: new video source
        :return:
        """
        self.source_manager.update_source(sensor_source)
    def default_event_handler(self):
        try:
            # Read a new Frame.
            frame = self.source_manager.source.get_next_frame( )
            self.frame_number_of_last_captured_frame += 1
        except (InvalidFrameException, BufferTimeoutException):
            self._stop_reason = StopReason.SOURCE_UNAVAILABLE
            return False
        # Start The timer.
        self.stat.start( )
        try:
            self.latest_frame = \
                self.process_frame(frame=frame,
                    frame_number=self.frame_number_of_last_captured_frame)
        except Exception as e:
            # This is a programmer error
            self.loop_running = False
            raise e
        # Calculate statistics for reporting
        self.stat.calculate_frame_stat( )
        return True
    def process_frame(self, frame, frame_number: int) -> np.ndarray:
        """
        After reading a video frame, process it.
        Find Faces.
        If faces, send them to the identifier.
        Records the frame as the latest_frame.
        :param frame: numpy.array
```

-continued

```
    :param frame_number: The frame number if using VideoDataSource, else None.
    :return: The modified frame.
    """
    # Update Counters
    self.num_faces_submitted_this_frame = 0
    self.stat.update_face_detection_stat( )
    self.stat.update_face_submission_stat( )
    # Grab a new batch of faces
    faces = self.get_faces_from_frame(frame)
    self.stat.update_face_detection_stat(nfaces=len(faces))
    self.process_detected_faces(faces, frame, frame_number)
    if self.show_detections:
        self.draw_faces_on_frame(frame, faces)
    self.stat.update_face_submission_stat(self.num_faces_submitted_this_frame)
    return frame
def get_faces_from_frame(self, frame: BgrImage) -> List[FrameFace]:
    return self.face_detector.detect_faces(img=frame)
@abstractmethod
def process_detected_faces(self, faces: List[FrameFace], frame: np.ndarray,
        frame_number: int):
    raise NotImplementedError("process_detected_faces must be implemented.")
def set_margin_percentage(self, margin_percentage):
    self.face_detector.set_margin_percentage(margin_percentage)
@staticmethod
def draw_faces_on_frame(frame: np.ndarray, faces: List[FrameFace]):
    """
    Draw the faces on a frame
    :param frame: numpy.ndarray
    :param faces: List[FrameFace]
    :return:
    """
    # Draw bounding boxes for all detected faces
    for face in faces:
        cv2.rectangle(frame,
                (face.box.left, face.box.top),
                (face.box.right, face.box.bottom),
                (0, 255, 0), 2, 1)
    cv2.imshow('frame', frame)
    cv2.waitKey(25)
@property
def stop_reason(self) -> Optional[StopReason]:
    return self._stop_reason

# The FaceEmbedder converts faces to vectors of numbers.
# The first step is to pre-process the incoming face to the correct resolution and scale.
# A Convolution Neural Network (CNN) is a preferred method to convert the pre-processed
# face to a vector.

class NoFaceDetected(Exception):
    pass
class UnknownEmbedderException(Exception):
    pass
# This is really for testing and to have a nice place to go in the code to figure
# out what name to put in the database
class EmbedderNames(Enum):
    none = 'none'
    facenet = 'facenet'
    resnet50_2048d_v0 = 'resnet50_2048d_v0'
    resnet50_128d = 'resnet50_128d'
    resnet50_128d_v1 = 'resnet50_128d_v1'
    resnet50_128d_v2 = 'resnet50_128d_v2'
class FaceEmbedder:
    """"""Base class for face embedding.
```

55

```
    Sub classes should override abstract methods to generate
the embeddings based on the images sent in.
```

```
    """
    def __init__(self, name, face_crop_size, required_image_encoding,
mtcnn_margin_percentage,
            batch_size):
        self.face_crop_size = face_crop_size
        self.embedder_name = name
        self.required_image_encoding = required_image_encoding
```

-continued

```
    self.mtcnn_margin_percentage = mtcnn_margin_percentage
    self.batch_size = batch_size
@abstractmethod
def normalized_embeddings(self, imgs: list):
    """Generates a face embedding from an image.
    @:param imgs: A list of RGB numpy array images.
    @:return A list of face encodings, typically (1, 512) dimensional, but more generally
    is the range be 32...4096.
    """
    raise NotImplementedError
@staticmethod
def factory(ename: Union[EmbedderNames, str] = EmbedderNames.none): # ->
FaceEmbedder
    """
```

Choose the embedder you want (facenet, resnet50_orig,
etc.)

In production, don't send a string, and you get what is in
the database.

In dev, testing, you can send a string to get the one you   [20]
want.

```
    :param ename: the embedder you want (e.g. facenet). If blank, get the answer from the
ModelDb
    :return: an instance of an FaceEmbedder
    """
    # the use of lambda is to make mypy happy
    mapping = {
        EmbedderNames.facenet: lambda: FaceNetFaceEmbedder( ),
        EmbedderNames.resnet50_2048d_v0: lambda: ResNet50_2048D_v0_FaceEmbedder( ),
        EmbedderNames.resnet50_128d: lambda: ResNet50_128D_FaceEmbedder( ),
        EmbedderNames.resnet50_128d_v1: lambda: ResNet50_128D_FaceEmbedder_v1( ),
        EmbedderNames.resnet50_128d_v2: lambda: ResNet50_128D_FaceEmbedder_v2( )
    }
    ename_final: EmbedderNames = EmbedderNames(ename)
    if ename_final not in mapping:
        logger.error("unknown embedder requested: { }".format(ename_final))
        ReportToTeam.report("unknown embedder requested: { }".format(ename_final))
        raise UnknownEmbedderException
    if ename_final == EmbedderNames.none:
        logger.error("Embedder None requested")
        ReportToTeam.report("Embedder None requested")
        raise UnknownEmbedderException
    logger.info(str(ename_final) + " requested")
    return mapping[ename_final]( )
def normalized_embeddings_from_batch(self, image_gen: Generator[np.array, None, None],
length: int):
    """
    Take an image generator and produce embeddings. Need Length for possible
pytorch/tensorflow
    implementations
    """
    # In practice, this has not worked because of running out of memory in numpy.
    # Make we'll fix
    # someday?
    # if self.batch_size == 1:
    #   return self.normalized_embeddings([i for i in image_gen])
    batch_img = [ ]
    results = [ ]
    try:
        while True:
            for i in range(self.batch_size):
                batch_img.append(image_gen.__next__( ))
            results.append(self.normalized_embeddings(batch_img))
            batch_img = [ ]
    except StopIteration:
        if len(batch_img) != 0:
            results.append(self.normalized_embeddings(batch_img))
    length
    return (np.concatenate(results))
def correct_encoding_image_generator(self, image_gen: Generator[np.array, None, None]) \
        -> Generator[np.array, None, None]:
    """Take a generator and returns a new generator with all the images converted properly
    """
    return (img.encoded_in(self.required_image_encoding) for img in image_gen)
```

-continued

```
class FaceNetFaceEmbedder(FaceEmbedder):
    def __init__(self):
        # batch size selected by looking at running out of memory.
        super( ).__init__(EmbedderNames.facenet, 160, RgbImage, 0.4, batch_size=16)
        self.model = FaceNetModel(ModelDb.facenet_model_file)
    def normalized_embeddings(self, imgs: list) -> np.ndarray:
        """Face encoder using Facenet to generate face embeddings."""
        size = self.face_crop_size
        mod_imgs = [ ]
        for img in imgs:
            img = img.encoded_in(self.required_image_encoding)
            resized = cv2.resize(img, (size, size))
            whitened = embedders.prewhiten(resized)
            mod_imgs.append(whitened)
        return self.model.raw_embeddings(np.array(mod_imgs))
class ResNet50_2048D_v0_FaceEmbedder(FaceEmbedder):
    def __init__(self):
        super( ).__init__(EmbedderNames.resnet50_2048d_v0, 224, BgrImage, 0.4, batch_size=1)
        self.model = ResNet50_2048D_v0(ModelDb.resnet50_2048d_v0_model_file)
    def normalized_embeddings(self, imgs: list) -> np.ndarray:
        """Use ResNet50 to generate face embeddings"""
        size = self.face_crop_size
        results = [ ]
        for img in imgs:
            img = img.encoded_in(self.required_image_encoding)
            resized = cv2.resize(img, (size, size))
            res = self.model.raw_embeddings(np.expand_dims(resized, axis=0))
            res = res[0, 0, :, :]
            results.append(preprocessing.normalize(res, norm='l2'))
        return np.concatenate(results)
def crop_center(img: np.array, cropx: int, cropy: int) -> np.ndarray:
    startx = img.shape[1] // 2 - (cropx // 2)
    starty = img.shape[0] // 2 - (cropy // 2)
    return img[starty:starty + cropy, startx:startx + cropx]
class ResNet50_128D_FaceEmbedder(FaceEmbedder):
    def __init__(self, mtcnn_margin_percentage: float = 0.4, use_caffe=False,
            use_trt=False):
        """
        This one dealt with a 0.4 margin percentage, which is what it did not expect
        :param mtcnn_margin_percentage:
        :param use_caffe: if caffe is available, should we use it?
        :param use_trt: if tensor rt is available, should we use it?
        """
        #
        batch_size = 7 if have_tensorrt( ) else 1
        super( ).__init__(EmbedderNames.resnet50_128d, 224, BgrImage,
                mtcnn_margin_percentage=mtcnn_margin_percentage,
                batch_size=batch_size)
        if have_caffe( ) and use_caffe:
            self.model: Union[ResNet50_128D_Model, Any] = \
                ResNet50_128D_Model_Caffe(ModelDb.resnet50_128d_model_file)
        elif have_tensorrt( ) and use_trt:
            self.model: Union[ResNet50_128D_Model, Any] = \
                ResNet50_128D_Model_Trt(ModelDb.resnet50_128d_model_file,
                                        max_batch=batch_size)
        else:
            self.model = ResNet50_128D_Model(ModelDb.resnet50_128d_model_file)
    def normalized_embeddings(self, imgs: list) -> np.ndarray:
        """Use ResNet50 to generate face embeddings"""
        # Rule: Take enlarged bounding box of MTCNN by 30% (1.3x). Scale to 256.
        # Then take the 224 center crop.
        # That's equivalent to enlarging MTCNN by 1.1375x, and scaling to 224 pixels
        # ToDo: Check on the scaling. Check on the whether we need to normalize.
        size = self.face_crop_size
        mod_imgs = [ ]
        for img in imgs:
            img = img.encoded_in(self.required_image_encoding)
            img = np.subtract(img, (91.4953, 103.8827, 131.0912),
                    dtype=np.float32) # From the caffe file.
            # NOTE: The current margin_percentage on mtcnn is 0.4.
            # This embedder expects 1.3x -> then rescale to 224x224.
            # equivalent to 1.4x -> that rescales to 241.23x241.23. Then take the center-crop.
            # TODO: Crop-first, then rescale. Much less computation. (though, edge effects?)
            # NOTE! This looks like an error -- should be int(round). Not a huge deal.
            # With fix in subsequent versions
            img = cv2.resize(img, (int(size * 1.4 / 1.3), int(size * 1.4 / 1.3)))
            img = crop_center(img, size, size)
            img = img.transpose(2, 0, 1) # Switch to CWH from HWC
            mod_imgs.append(img)
```

```
        results = self.model.raw_embeddings(np.array(mod_imgs))
        return preprocessing.normalize(results.reshape(len(mod_imgs), -1), '12')

# The Classifier takes vectors produced from images of faces, and determines if they are similar
# to the vectors in the POI list. One method below is the cosine similarity which is effectively a
# a dot product of normalized vectors

class ClassifierItem:
    def __init__(self, watchlist_id, person_id, photo_guid, embedding,
            personal_attributes=None, confidence_threshold=0.5):
        self.watchlist_id = watchlist_id
        self.person_guid = person_id
        self.person_photo_guid = photo_guid
        self.embedding = embedding
        self.confidence_threshold = confidence_threshold
        self.personal_attributes = personal_attributes if personal_attributes else dict( )
    def __str__(self):
        return self.person_guid
    def __eq__(self, other):
        return self.person_photo_guid == other.person_photo_guid
class ClassifierItemsContainer:
    def __init__(self, embedder_name: Enum, items: List[ClassifierItem]):
        self.embedder_name = embedder_name
        self.items = items
    @classmethod
    def from_paths(cls, path: str):
        """Constructs a classifier from one or many files.
        :param path: path to saved embeddings.
        :return ClassifierItemsContainer
        """
        if not os.path.exists(path):
            logger.info('Watchlist path does not exist: ' + path)
            return None
        try:
            with open(path, 'rb') as f:
                elements = pickle.loads(f.read( ))
                items = elements.items
                embedder_name = elements.embedder_name
        except (TypeError, pickle. UnpicklingError):
            return None
        assert (embedder_name is not None)
        assert (len(items) > 0)
        return ClassifierItemsContainer(items=items, embedder_name=embedder_name)
class Classifier:
    duplicate_threshold = 0.8
    def __init__(self, items: List[ClassifierItem], embedder_name: Union[EmbedderNames, str]):
        """
        Base Classifier initializer.
        :param items: The items used by this classifier.
        :param embedder_name: The embedder name to use.
        """
        self.items = items
        self.embedder_name = embedder_name
    @abstractmethod
    def evaluate(self, normalized_embeddings: np.ndarray) -> List[Match]:
        """Evaluates the embeddings. Children class must implement this function!
        :param embeddings: The face embeddings to compare against.
        :return: A list of matches which will equal in length the number of embeddings.
                Each item will consist of a Match or None.
        """
        raise NotImplementedError
    def compute_personal_attributes(self, attribute_classifiers: List[CategoricalClassifier]):
        """
        :param attribute_classifiers: list of personal attribute classifiers
        :return:
        """
        for item in self.items:
            for classifier in attribute_classifiers:
                # the commented out code presumes that personal attributes can be stored at the
backend
                # we will ignore that posibility for now and compute personal attributes
unconditionally
                # if classifier.name in item.personal_attributes
                # and item.personal_attributes[classifier.name] != 'NaN':
                #    continue
                item.personal_attributes[classifier.name] = \
                    classifier.classify(np.array([item.embedding]))[1].category_class
    @abstractmethod
```

78

-continued

```
def detect_duplicates(self):
    raise NotImplementedError
def item_from_photo_guid(self, guid) -> Optional[ClassifierItem]:
    """ Returns the item for which the photo guid matches against.
    :param guid: The photo guid.
    :return: A WatchlistItem.
    """
    for item in self.items:
        if item.person_photo_guid == guid:
            return item
    return None
def item_from_person_guid(self, guid) -> Optional[ClassifierItem]:
    """ Returns the item for which the person guid matches against.
    Note: This will return the first item the guid matches against.
    :param guid: The person guid.
    :return: A WatchlistItem.
    """
    for item in self.items:
        if item.person_guid == guid:
            return item
    return None
def json_encode(self):
    """Custom encoder to serialize classifiers.
    :return a JSON formatted string containing the necessary Classifier information
    """
    data_dict = {
        "embedderName": self.embedder_name.name,
        "items": [ ],
    }
    for item in self.items:
        item_data = {
            "watchlistId": item.watchlist_id,
            "personId": item.person_guid,
            "personPhotoId": item.person_photo_guid,
            "embedding": item.embedding.tolist( ), # 1d array
            "confidenceThreshold":item.confidence_threshold
        }
        data_dict["items"].append(item_data)
    return data_dict
@staticmethod
def factory(items: List[ClassifierItem], classifier_name: str, embedder_name:
EmbedderNames,
        confidence_threshold: float = 0.5):
    """
    Construct classifier object that was previously saved from binary source.
    or reconstruct a new one
    :param items: List of watchlist items.
    :param classifier_name: Name of the classifier to be constructed.
    :param confidence_threshold: Classifier confidence threshold.
    :param embedder_name: Name of embedder used to produce embeddings
    :return: an instance of a Classifier.
    """
    if classifier_name == "CosineSimilarityClassifier":
        return CosineSimilarityClassifier.from_elements(items=items,
                            confidence_threshold=confidence_threshold,
                            embedder_name=embedder_name)
    elif classifier_name == "DoNothing":
        return DoNothing(embedder_name=embedder_name)
    else:
        logger.info('classifier_name not valid: ' + classifier_name)
        raise NameError
@classmethod
def from_paths(cls, paths: List, classifier_name: str = 'CosineSimilarityClassifier',
        confidence_threshold: float = .5):
    """Constructs a classifier from one or many files.
    :param paths: List of paths to the files.
    :param classifier_name
    :param confidence_threshold
    """
    for path in paths:
        if not os.path.exists(path):
            logger.info('Watchlist path does not exist: ' + path)
            return None
    items: List[ClassifierItem] = [ ]
    embedder_names = [ ]
```

-continued

```
    for path in paths:
        try:
            with open(path, 'rb') as f:
                elements = pickle.loads(f.read( ))
                items += elements.items
                embedder_names.append(elements.embedder_name)
        except (TypeError, pickle.UnpicklingError):
            with open(path, 'rb') as f:
                elements = json.loads(f.read( ), object_hook=cls.json_decode)
                items += elements.items
                embedder_names.append(elements.embedder_name)
    assert len(set(embedder_names)) == 1
    embedder_name = embedder_names[0]
    return cls.factory(items=items,
                classifier_name=classifier_name,
                embedder_name=embedder_name,
                confidence_threshold=confidence_threshold)
@classmethod
def to_json_file(cls, items: List[ClassifierItem], embedder_name: EmbedderNames):
    """Creates a model from a list of watchlist items as a JSON formatted string
    and saves it to a file.
    :param items: A list of WatchlistItem.
    :param embedder_name
    """
    obj = cls(items, embedder_name)
    json_data = json.dumps(obj,
                default=cls.json_encode) # add indent if desired for pretty printing
    with open('models/resnet50_128d_embeddings.json', 'w') as f:
        f.write(json_data)
@classmethod
def json_decode(cls, data):
    """Custom decoder to deserialize classifiers
    :param data: Json formatted string
    """
    if "embedderName" in data: # make classifier
        return Classifier(items=data["items"],
embedder_name=EmbedderNames(data["embedderName"]))
    elif "watchlistId" in data: # item
        return ClassifierItem(data["watchlistId"], data["personId"], data["personPhotoId"],
                data["embedding"])
    else:
        raise TypeError
def show(self):
    for item in self.items:
        logger.info("label { }, photo_id { }".format(item.person_guid, item.person_photo_guid))
class CosineSimilarityClassifier(Classifier):
    def __init__(self, items: List[ClassifierItem], embeddings: np.array, embedder_name:
EmbedderNames,
                confidence_threshold=0.5):
        """
        A cosine similarity classifier.
        :param items: classifier items
        :param embeddings embeddings
        :param confidence_threshold datasetwise confidence threshold
        """
        super( ).__init__(items, embedder_name)
        self.embeddings = embeddings
        self.confidence_threshold = confidence_threshold
        self.duplicates: Dict = { }
    def evaluate(self, normalized_embeddings: np.ndarray) -> List[Match]:
        """Evaluates the embeddings.
        We are attempting to use numpy optimized loops in this one.
        :param normalized_embeddings: The face embeddings to compare against. np.ndarray
        :return: A list of matches which will equal in length the number of embeddings
                Each item will represent a Match.
        """
        matches = [ ]
        # Each column is a normalized_embedding
        similarity_mat = np.dot(self.embeddings, np.transpose(normalized_embeddings))
        arg_sorted_similarity = np.argsort(similarity_mat,
                            axis=0) # Each column sorted from smallest to largest
        best_match_index = arg_sorted_similarity[-1] # Bottom row are the best matches
        emb_similarity = similarity_mat[best_match_index,
np.ogrid[:arg_sorted_similarity.shape[1]]]
        # get best max value
        for emb_index in range(normalized_embeddings.shape[0]):
            item = self.items[best_match_index[emb_index]]
            best_guid = item.person_guid
            best_person_photo_guid = item.person_photo_guid
```

```
        watchlist_id = item.watchlist_id
        best_attributes = item.personal_attributes
        confidence = 1.0
        # deal with multiple images of the same person Being close.
        other_neigbors_index = arg_sorted_similarity.shape[0] - 2
        while other_neigbors_index >= 0:
            # if the best_guid is no the same as the guid currently being examined
            # AND ( either the best person photo guid is not in duplicates,
            # or the currently examined person_photo_guid is not in self.duplicates)
            next_max_emd_index = arg_sorted_similarity[other_neigbors_index, emb_index]
            if best_guid != self.items[next_max_emd_index].person_guid and \
                    (best_person_photo_guid not in self.duplicates or
                    self.items[next_max_emd_index].person_photo_guid not in
                    self.duplicates[best_person_photo_guid]):
                # Then the confidence is decreased.
                confidence = emb_similarity[emb_index] / \
                    (emb_similarity[emb_index] + similarity_mat[
                    next_max_emd_index, emb_index])
                # Stop after we find the first other neighbor.
                break
            other_neigbors_index -= 1
        matches.append(Match(person_guid=best_guid, photo_guid=best_person_photo_guid,
                watchlist_id=watchlist_id,
                attributes=best_attributes, score=emb_similarity[emb_index],
                confidence=confidence, threshold=item.confidence_threshold))
    return matches
def evaluate_slow(self, normalized_embeddings: np.ndarray) -> List[Match]:
    """Evaluates the embeddings. This method is a bit easier to understand, but SLOW
    :param normalized_embeddings: The face embeddings to compare against.
    :return: A list of matches which will equal in length the number of embeddings.
            Each item will represent a Match.
    """

matches = [ ]
    for embedding in normalized_embeddings:
        sets = cosine_similarity(self.embeddings, [embedding])
        s = sets.flatten( )
        sorted_index_pos = [index for index, num in
                sorted(enumerate(s), key=lambda x: x[-1], reverse=True)]
        best_match_index = sorted_index_pos[0]
        similarity = s[best_match_index]
        item = self.items[best_match_index]
        guid = item.person_guid
        photo_guid = item.person_photo_guid
        attributes = item.personal_attributes
        watchlist_id = item.watchlist_id
        confidence = 1.0
        for index in sorted_index_pos:
            # if the best_guid is not the same as the guid currently being examined
            # AND ( either the best person photo guid is not in duplicates,
            # or the currently examined person_photo_guid is not in self.duplicates)
            if guid != self.items[index].person_guid and \
                    (photo_guid not in self.duplicates or
                    self.items[index].person_photo_guid not in self.duplicates[photo_guid]):
                # Then the confidence is decreased.
                confidence = similarity / (similarity + s[index])
                break
        matches.append(Match(person_guid=guid, photo_guid=photo_guid,
watchlist_id=watchlist_id,
                attributes=attributes, score=similarity, confidence=confidence,
                threshold=item.confidence_threshold))
    return matches
def detect_duplicates(self) -> None:
    """

Modifies items to disable similar items competition
    """

embeddings = np.asarray([x.embedding for x in self.items])
    for item in self.items:
        guid = item.person_guid
        photo_guid = item.person_photo_guid
        similarities = cosine_similarity(embeddings, [item.embedding])
        suspected_duplicates = [self.items[index].person_photo_guid for index, similarity
                in enumerate(similarities) if
                similarity >= Classifier.duplicate_threshold and
                self.items[index].person_guid != guid]
        if len(suspected_duplicates) > 0:
            self.duplicates[photo_guid] = suspected_duplicates
            logger.info("photos identified as duplicates for { } { } : { }".
                format(guid, photo_guid,
                suspected_duplicates))
```

-continued

```
@staticmethod
def from_elements(items, embedder_name: EmbedderNames, confidence_threshold: float):
    """create classifier from ClassifierItems
    :param items: The items.
    :param embedder_name: the embedder_name
    :param confidence_threshold datasetwise confidence threshold
    """
    try:
        embeddings = np.array([item.embedding for item in items])
        return CosineSimilarityClassifier(items=items,
                        embeddings=embeddings,
                        confidence_threshold=confidence_threshold,
                        embedder_name=embedder_name)
    except ValueError:
        # Invalid data
        raise ValueError
@staticmethod
def from_embeddings_and_labels(embeddings, labels,
embedder_name=EmbedderNames.none,
                 confidence_threshold=0.5) \
    -> Classifier:
    """
```

If all we have is embeddings and labels, then use this function. This is for research only, and not for use in our main product.

```
    returns a classifier based on face embeddings and corresponding labels
    :param embeddings: list of embeddings
    :param labels: list of corresponding labels
    :param embedder_name embedder name
    :param confidence_threshold confidence threshold
    :return: a cosine classifier
    """
    items = [ ]
    # make classifier items
    for i in range(len(embeddings)):
        item = ClassifierItem(0, labels[i], i, embeddings[i],
                    confidence_threshold=confidence_threshold)
        items.append(item)
    # make cosine classifier
    classifier = Classifier.factory(items=items,
                    classifier_name='CosineSimilarityClassifier',
                    embedder_name=embedder_name)
    assert classifier
    return classifier
class DoNothing(Classifier):
    def init_(self, embedder_name: EmbedderNames = EmbedderNames.resnet50_128d):
        super( )._init_(items=[ ], embedder_name=embedder_name)
    def evaluate(self, normalized_embeddings) -> List[Match]:
        return [ ]
    def detect_duplicates(self):
        Pass

# When an alert (a match) is found, send an alert to the server

class AlertingIdentifier(IdentifierBase):
    """
    This class is responsible for handling Identifier events
    """
def init_(self, api: Api, input_queue: Queue, classifier: Classifier, embedder:
        FaceEmbedder,
        diagnostics_enabled: bool = False, diagnostic_alert_threshold: float = 0.5,
        repeat_alert_interval_in_sec: int = 120):
    """
    :param api: api to produce alerts
    :param input_queue: incoming event queue
    :param classifier: classifier
    :param embedder: embedder (constructed)
    :param diagnostics_enabled: whether to produce diagnostic alerts/save face crops
    :param diagnostic_alert_threshold: the threshold qualifying score for diagnostic alert
    :param repeat_alert_interval_in_sec: the interval within which multiple alerts for the same
    person suppressed
    """
    # state event handlers one dictionary per event for each state
    working_state_handlers = {'message': self.process_stop_message,
```

-continued

```
                    'update': self.update,
                    'FacialIdentificationDataReady': self.do_facial_identification,
                    'set_diagnostics_enabled': self.set_diagnostics_enabled}
        # state machine one event_handler dictionary per state
        state_handlers = {'WorkingState': working_state_handlers}
        super( )._ init_(api=api, embedder=embedder, input_queue=input_queue,
                    state_handlers=state_handlers,
                        diagnostics_enabled=diagnostics_enabled)
        self.diagnostic_alert_threshold = diagnostic_alert_threshold
        # The interval (in seconds) in which a repeated alert will be sent again.
        self.repeat_alert_interval = repeat_alert_interval_in_sec
        # The alerted persons in the form of Person_guid: time.
        self.alerted: dict = { }
        self.classifier = classifier
        self.matcher = FaceSequenceMatcher( )
        self.validation_threshold = 1
        self.embedder = embedder
        self.transition_to('WorkingState')
    def update(self, data):
        """"""

update watchlist handler
        :param data (classifiers, embedder)
        :return:
        """"""

classifier, embedder = data
        self.classifier = classifier
        self.embedder = embedder
        def do_facial_identification(self, data):
    """"""
        process event FacialIdentificationDataReady received from video/image preprocessor
        :param data: contains information submitted for facial identification
        :return:
        """"""
        tracker_message, send_time = data
        logger.info(f'Received message from tracker: duration {tracker_message.duration_in_sec}')
        identifier_items = tracker_message.tracking_sequence
        crops = [item.face.crop(item.frame) for item in identifier_items]
        assert identifier_items
        normalized_embeddings = self.embedder.normalized_embeddings(crops)
        if self.matcher:
            all_matches: List[Match] = self.classifier.evaluate(
                normalized_embeddings=normalized_embeddings)
            results: List[Tuple[bool, List[Tuple[int, Match]]]] = self.matcher.evaluate_matches(
                all_matches)
            # selecting one image to be reported with the alert
        # choosing the image with the highest recognition score
        for accepted, frame in results:
            photo_indices = [guid_match[0] for guid_match in frame]
            matches = [guid_match[1] for guid_match in frame]
            max_similarity_index = \
                np.argmax([match.score for match in matches])
            score = matches[max_similarity_index].score
            photo_guid = matches[max_similarity_index].photo_guid
            watchlist_id = matches[max_similarity_index].watchlist_id
            person_guid = matches[max_similarity_index].person_guid
            logger.info('{ }: { } score { }'.format('IDENTIFIED' if accepted else 'REJECTED',
                                        person_guid, [match.score for match in matches]))
            photo_index = photo_indices[max_similarity_index]
            photo = crops[photo_index]
            if accepted or score >= self.diagnostic_alert_threshold:
                invalidity = self.validate(normalized_embeddings, all_matches[photo_index])
                self.alert(person_guid=person_guid,
                    photo_guid=photo_guid,
                    watchlist_id=watchlist_id,
                    score=score,
                    face_img=photo,
                    frame_img=identifier_items[photo_index].frame,
                    frame_time=send_time,
                    frame_ref=identifier_items[photo_index].frame_number,
                    matched_on=datetime.datetime.now(datetime.timezone.utc).isoformat( ),
                    is_diagnostic=not accepted or self.is_invalid(invalidity))
                    if self.diagnostics_enabled:
                    face_ids = [str(uuid.uuid4( )) for _ in identifier_items]
                    save_faces(identifier_items, face_ids, accepted, photo_indices)
                    save_faces_meta_data(all_matches, face_ids, accepted, photo_indices)
            del identifier_items
    def validate(self, normalized_embeddings: np.ndarray, photo_matches: Match) -> int:
        """"""
        validate match against personal attributes
```

-continued

```
        :param normalized_embeddings:
        :param photo_matches: matches to be validated
        :return: discrepancy
        """
        return 0
    def is_invalid(self, invalidity: int) -> bool:
        """
        whether personal attributes are invalide
        :param invalidity: discrepancy in personal attributes
        :return:
        """
        return invalidity != 0
    def alert(self, person_guid: str, photo_guid: str, watchlist_id: str, score: float,
            face_img: BgrImage, frame_img: BgrImage, frame_time, frame_ref, matched_on,
            is_diagnostic: bool = False):
        """"""Sends an alert to the server.
        :param person_guid: The person guid.
        :param photo_guid: The photo guid.
        :param watchlist_id: The watchlist id.
        :param score: The score of the match.
        :param face_img: The face image.
        :param frame_img: The full frame camera image.
        :param frame_time: The time the frame was captured.
        :param frame_ref: Frame number
        :param matched_on: The time this face was matched on.
        :param is_diagnostic: Whether or not this alert is a diagnostic alert.
        """
        assert isinstance(face_img, BgrImage)
        assert isinstance(frame_img, BgrImage)
        if is_diagnostic and not self.diagnostics_enabled:
            # Back out if diagnostics isn't enabled and this is a diagnostic alert
            return
        # Check for repeated alert
        if person_guid in self.alerted and time.time( ) - self.alerted[
            person_guid] < self.repeat_alert_interval:
            logger.info(
                "Alert for person { } not being sent because it is within the repeated alert threshold."
                .format(person_guid))
            return
        if not is_diagnostic:
            self.alerted[person_guid] = time.time( )
        self.api.alert(person_guid, photo_guid, watchlist_id, score,
                face_img, frame_img, frame_time, frame_ref, matched_on,
                is_diagnostic=is_diagnostic)
        self.clean_alerted( )
    def clean_alerted(self) -> None:
        """"""Cleans alerted persons array by removing all keys that have surpassed
        their repeat Alert interval."""""
        self.alerted = {k: v for k, v in self.alerted.items( ) if
                v > time.time( ) - self.repeat_alert_interval}
# The HealthChecker reports parameters to the server. That includes frame rate,
# memory usage, cpu usage, number of faces found in the last time interval, etc.
class HealthChecker(Runnable):
    class Status(Enum):
        unknown = 'Unknown'
        ok = 'Ok'
        camera_down = 'CameraDown'
        video_preprocessor_down = 'VideoPreprocessorDown'
        identifier_down = 'IdentifierDown'
        all_down = 'AllDown'
    def init_(self, config_version: str, api: Api,
            video_preprocessor: Optional[VideoPreprocessor] = None,
            identifier: Optional[PipelineClient] = None, dumper: Optional[PipelineClient] = None,
            interval=15):
        super( ) .__ init __ ( )
        self.config_version = config_version
        self.api = api
        self.interval = interval
        self.video_preprocessor = video_preprocessor
        self.identifier = identifier
        self.dumper = dumper
@property
def status(self):
    """"""The status of the health checker."""""
        if self.video_preprocessor and StopReason.SOURCE_UNAVAILABLE in [
            self.video_preprocessor.stop_reason]:
            return HealthChecker.Status.camera_down.value
        if self.identifier and StopReason.SOURCE_UNAVAILABLE in [self.identifier.stop_reason]:
            return HealthChecker.Status.camera_down.value
```

```
        if self.video_preprocessor and not self.video_preprocessor.running:
            return HealthChecker.Status.video_preprocessor_down.value
        if self.identifier and not self.identifier.running:
            return HealthChecker.Status.identifier_down.value
        return HealthChecker.Status.ok.value
@property
def running(self):
        return self ._running
def start_internal(self):
"""""Starts the Health checker."""""
self ._ running = True
while self ._running:
        index = watchlist.read_index( ) or [ ]
        virtual_memory = psutil.virtual_memory ( )
        disk_space = psutil.disk_usage('/')
        self.api.health_check(config_version=self.config_version,
                status=self.status,
                fps=self.video_preprocessor.stat.fps( ),
                cpu_percent=psutil.cpu_percent( ),
                memory_total=virtual_memory.total,
                memory_used=virtual_memory.used,
                disk_space_total=disk_space.total,
                disk_space_used=disk_space.used,
                num_faces_found=self.video_preprocessor.stat.num_faces_found( ),
                num_faces_submitted=
                self.video_preprocessor.stat.num_faces_submitted( ),
                ip_address=environ.ip_addresses,
                watchlists=[item.to_json( ) for item in index])
        time.sleep(self.interval)
@property
def stop_reason(self) -> Optional[StopReason]:
    return None
# The CloudWatchSensorObserver recieves heartbeat messages from the HealthChecker on
# the device. It can listen to events, and store the data for graphing. Amazon Web Servers
# (AWS) CloudWatch where alarms can be set based on the values of parameters, and
# messages can be set to infrastructure managers at an installation

        if (_sensorObservers.Any( )) {
            foreach (var sensorObserver in _sensorObservers) {
                sensorObserver.OnNext(sensor);
            }
        }
    }
    public class CloudWatchSensorObserver : IObserver<Sensor> {
        private readonly IMetricPublisherFactory _metricPublisherFactory;
        public CloudWatchSensorObserver(IMetricPublisherFactory metricPublisherFactory) {
            _metricPublisherFactory = metricPublisherFactory;
        }
        public void OnCompleted( ) { }
        public void OnError(Exception error) { }
        public void OnNext(Sensor sensor) {
            using (var metricPublisher = _ metricPublisherFactory.Create("Sensor", sensor.Client,
sensor.Name, sensor.Id)) {
                metricPublisher.Publish("CPU Utilization", sensor.LatestBeat.CpuUtilization,
MetricUnitEnum.Percent, sensor.LatestBeat.Timestamp);
                metricPublisher.Publish("Memory Utilization", sensor.LatestBeat.MemoryUtilization,
MetricUnitEnum.Percent, sensor.LatestBeat.Timestamp);
                metricPublisher.Publish("Memory Used",
sensor.LatestBeat.MemoryUsed.GetValueOrDefault( ), MetricUnitEnum.Bytes,
sensor.LatestBeat.Timestamp);
                metricPublisher. Publish("Disk Space Utilization",
sensor.LatestBeat. DiskSpaceUtilization, MetricUnitEnum.Percent,
sensor.LatestBeat.Timestamp);
                metricPublisher.Publish("Disk Space Used",
sensor.LatestBeat.DiskSpaceUsed.GetValueOrDefault( ), MetricUnitEnum.Bytes,
sensor.LatestBeat.Timestamp);
                metricPublisher.Publish("Frames Per Second", sensor.LatestBeat.Fps,
MetricUnitEnum.CountSecond, sensor.LatestBeat.Timestamp);
                metricPublisher.Publish("Status", sensor.Status == SensorStatusEnum.online ? 1 : 0,
MetricUnitEnum.Count, sensor.LatestBeat.Timestamp);
            foreach (var latestBeatMetric in sensor.LatestBeat. Metrics) {
                metricPublisher.Publish(latestBeatMetric.Name, latestBeatMetric.Value,
MetricUnitEnum.Count, sensor.LatestBeat.Timestamp);
                }
            }
        }
    }
Collapse
    public class CloudWatchMetricPublisher : IMetricPublisher {
        private readonly Dimension _dimension;
```

-continued

```
    private readonly ILogger<CloudWatchMetricPublisher> _logger;
    private List<MetricDatum> _metrics;
    private readonly IAmazonCloudWatch _cloudWatch;
    public CloudWatchMetricPublisher(string category, string client, string name, string id,
ILogger<CloudWatchMetricPublisher> logger, IAmazonCloudWatch cloudWatch) {
        var dimensionValue = ! client.IsNullOrWhitespace( ) && !id.IsNullOrWhitespace( ) ?
$"{client}-{name}-{id}".StripUnicodeCharacters( ) : name.StripUnicodeCharacters( );
        _logger = logger;
        _cloudWatch = cloudWatch;
        _dimension = new Dimension {
            Name = category,
            Value = dimensionValue
        };
        _metrics = new List<MetricDatum>( );
        _logger.LogInformation($"Start publishing metrics for ({_dimension.Value})");
    }
    public void Publish(string name, double value, MetricUnitEnum unit, DateTime
timestampUtc) {
        var metricDatum = new MetricDatum {
            Dimensions = new List<Dimension> {_dimension},
            MetricName = name,
            Unit = Convert(unit),
            Value = value,
            TimestampUtc = timestampUtc
        };
        _metrics.Add(metricDatum);
    }
    public void Dispose( ) {
        var request = new PutMetricDataRequest {
            Namespace = "Fanguard Metrics",
            MetricData = _ metrics
        };
        PutMetricDataResponse response = null;
        try {
            response = AsyncHelper.RunSync(( ) => _cloudWatch.PutMetricDataAsync(request,
CancellationToken.None));
        } catch (Exception ex) {
            _logger. LogError(ex,$"Unhandled exception occurred while sending Cloudwatch
metrics for ({_dimension.Name})");
            return;
        }
        if (response == null || response.HttpStatusCode != HttpStatusCode.OK) {
            _logger. LogError($"Unhandled exception occurred while sending Cloudwatch metrics
for ({_dimension.Name})");
            return;
        }
        _logger.LogInformation($"Recorded {_metrics.Count} metrics for {_dimension.Name}
{_dimension.Value}");
    }
    private StandardUnit Convert(MetricUnitEnum unit) {
        switch (unit) {
            case MetricUnitEnum.Count:
                return StandardUnit.Count;
            case MetricUnitEnum.CountSecond:
                return StandardUnit.CountSecond;
            case MetricUnitEnum.Percent:
                return StandardUnit.Percent;
            case MetricUnitEnum.Bytes:
                return StandardUnit.Bytes;
            case MetricUnitEnum.Seconds:
                return StandardUnit.Seconds;
            case MetricUnitEnum.Milliseconds:
                return StandardUnit.Milliseconds;
            default:
                throw new ArgumentOutOfRangeException(nameof(unit), unit, null);
        }
    }
}
```

Described herein are embodiments of the invention meeting the objects set forth above. It will be appreciated that these are merely examples of the invention and that other embodiments may incorporate changes to those herein within the ken of those skilled in the art. Thus, for example, it will be appreciated that although displays 30 and 32 for messaging the candidate individual and operator, respectively, are shown here separately, they may, in fact, comprise one and the same display. Moreover, although, those displays 30, 32 are used in the illustrated embodiment for messaging, alternate embodiments may perform messaging through bells, lights, whistles, and so forth.

In view of the foregoing, what we claim is:

1. A system for access control comprising
   A. one or more nodes, each of which nodes includes a camera and an associated processing device, and each of which nodes performs facial recognition on individuals imaged by its respective camera and, based thereon, generates messaging and/or control signals to permit or deny access to a resource secured by that node, B. a server that is in communications coupling with the nodes and that includes a central store of facial images of known individuals, C. at least a given one of said nodes including a respective local store representing at least some of the facial images in the central store and performing said facial recognition using the images so represented in that respective local store, D. if such facial recognition identifies a match between an individual in an image acquired by the camera of the given node and a facial image of a said known individual represented in the local store of that node, that node determining whether that camera-acquired image is a candidate to update a facial image of that known individual in the central store and, if so, uploading that camera-acquired image to the server, where such determination is based on numerical or other characterizations of a quality of the camera-acquired image and a face depicted therein, E. the server selecting a candidate image received from the given node for actual inclusion in the central store to update the facial image of the known individual in that image based on a mathematical relation of values of $F_1$, a measure of the quality of that candidate image; $F_2$, a measure of the degree of similarity of the face in that candidate image and a said facial image of a known individual in the central store; and $F_3$, a measure of the degree to which the face in the candidate image reflects a permissible or expected change in that known individual, wherein the permissible or expected change in the known individual is a change such as aging, weight gain/loss, changes or addition of eyewear, changes in facial ornamentation such as facial hair, tattoos, and jewelry.

2. The system of claim 1, wherein
the selection of step (E) is based on the mathematical relation:

$$I=(k_1*F_1)*(k_2*F_2)*(k_3*F_3)$$

where, $F_1$ is the measure of the quality of the candidate image;

$k_1$ is a weighting factor for the quality measure;

$F_2$ is the measure of the degree of similarity of the face in that candidate image and the said facial image of a known individual in the central store;

$k_2$ is a weighting factor for the similarity measure;

$F_3$ is the measure of the degree to which the face in the candidate image reflects the permissible or expected change in that known individual;

$k_3$ is a weighting factor for the permissible or expected change.

3. The system of claim 1, wherein, following selection of a candidate image for actual inclusion in the central store, the server downloads to one or more nodes information representing one or more facial images in the central store for the known individual depicted in the candidate image.

4. The system of claim 1, wherein the nodes are situated in a vicinity of the respective resource that is secured by that node, and wherein the server is disposed remotely from at least one of the nodes.

5. The system of claim 1, wherein the given node determines whether images acquired by its camera of candidates for inclusion in the central store based on scores of any of the uniformity of lighting of the image, contrast of the image, blur of the image, intensity of the image, pose of a face depicted in the image, whether eyes of the individual depicted in the image are open, distance between the eyes of the individual depicted in the image, whether the individual's face is obstructed, apparent distance from individual depicted in the image to a camera that acquired the image, signal to noise ratio in image, and an expected frequency of use of the system for access control and/or a respective node thereof by the individual.

6. The system of claim 1, wherein the given node uploads the camera-acquired image determined to be a candidate to update the central store along with any of (i) scores of qualities of that image, (ii) an identifier associated with a matching entry for that image in the local store and/or of the known individual represented thereby, and/or (iii) a measure of similarity between the face in the image and that of the matching entry in the local store.

7. The system of claim 1, wherein the central store is updated to include a said candidate image of a known individual that is selected for inclusion therein, and wherein at least a representation of one or more facial images of that known individual is downloaded to one or more of the nodes.

8. The system of claim 7, wherein different numbers of representations of facial images are any of maintained in the central store and downloaded to the one or more nodes for different known individuals.

9. The system of claim 8, wherein greater numbers of representations of facial images of known individuals who look similar to one another are any of maintained in the central store and downloaded to the one or more nodes than are maintained or downloaded for knowns individuals who do not look similar to one another.

10. The system of claim 7, wherein a said representation downloaded to one or more nodes is a said facial image.

11. The system of claim 10, wherein a said representation downloaded to one or more nodes is a vector or other representation generated from a said facial image.

12. The system of claim 11, wherein the vector or other representation is generated from multiple facial images of a same known individual.

13. The system of claim 12, wherein the vector or other representation is generated from a small number of high-quality facial images of a same known individual.

14. The system of claim 12, wherein the vector or other representation is generated from a large number of low-quality facial images of a same known individual, where a contribution to the vector or other representation by each of the low-quality images is based on a weighting factor.

15. The system of claim 7, wherein the server downloads to the nodes at least a representation of a candidate image that is added to the central store.

16. A method for access control comprising

A. performing facial recognition with one or more nodes, each of which includes a camera and an associated processing device, and, based on such facial recognition, generating messaging and/or control signals to permit or deny access to a resource secured by that node, B. maintaining, in a server that is remote from at least one of the nodes, a central store of facial images of known individuals, C. performing the facial recognition of step (A) on at last a given one of said nodes using a store that is local that node and that represents at least some of the facial images in the central store, D. if the facial recognition performed in step (C) identifies a match between an individual in an image acquired by the camera of the given node and a facial image of a said known individual represented in the local store of that node, determining whether that camera-acquired image is a candidate to update a facial image of that known individual in the central store and, if so, uploading that camera-acquired image to the server, where such determination is based on numerical or other characterizations of a quality of the camera-acquired image and a face depicted therein, E. with the server, selecting a candidate image received from the given node for actual inclusion in the central store to update the facial image of the known individual in that image based on a mathematical relation of values of $F_1$, a measure of the quality of that candidate image; $F_2$, a measure of the degree of similarity of the face in that candidate image and a said facial image of a known individual in the central store; and $F_3$, a measure of the degree to which the face in the candidate image reflects a permissible or expected change in that known individual, wherein the permissible or expected change in the known individual is a change such as aging, weight gain/loss, changes or addition of eyewear, changes in facial ornamentation such as facial hair, tattoos, and jewelry.

17. The method of claim 16, wherein the selection of step (E) is based on the mathematical relation:

$$I=(k_1{}^*F_1)^*(k_2{}^*F_2)^*(k_3{}^*F_3)$$

where, $F_1$ is the measure of the quality of the candidate image;

$k_1$ is a weighting factor for the quality measure;

$F_2$ is the measure of the degree of similarity of the face in that candidate image and the said facial image of a known individual in the central store;

$k_2$ is a weighting factor for the similarity measure;

$F_3$ is the measure of the degree to which the face in the candidate image reflects the permissible or expected change in that known individual;

$k_3$ is a weighting factor for the permissible or expected change.

\* \* \* \* \*